United States Patent
Murakami et al.

(10) Patent No.: US 9,800,378 B2
(45) Date of Patent: *Oct. 24, 2017

(54) OFDM FRAME TRANSMISSION METHOD AND APPARATUS

(71) Applicant: Optis Wireless Technology, LLC, Plano, TX (US)

(72) Inventors: Yutaka Murakami, Osaka (JP); Masayuki Orihashi, Kanagawa (JP); Akihiko Matsuoka, Kanagawa (JP); Yoichi Nakagawa, Tokyo (JP)

(73) Assignee: Optis Wireless Technology, LLC, Plano, TX (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/751,658

(22) Filed: Jun. 26, 2015

(65) Prior Publication Data

US 2015/0295687 A1 Oct. 15, 2015

Related U.S. Application Data

(63) Continuation of application No. 13/770,199, filed on Feb. 19, 2013, now Pat. No. 9,083,480, which is a (Continued)

(30) Foreign Application Priority Data

Jul. 16, 2002 (JP) .................................. 2002-206799
Sep. 5, 2002 (JP) .................................. 2002-259791

(51) Int. Cl.
*H04W 4/00* (2009.01)
*H04L 5/00* (2006.01)
(Continued)

(52) U.S. Cl.
CPC ......... *H04L 5/0048* (2013.01); *H04B 7/0413* (2013.01); *H04B 7/0417* (2013.01); (Continued)

(58) Field of Classification Search
CPC ....... H04J 11/00; H04B 7/0417; H04L 5/0048 (Continued)

(56) References Cited

U.S. PATENT DOCUMENTS 5,319,672 A 6/1994 Sumiya et al.
5,682,376 A 10/1997 Hayashino et al.
(Continued)

FOREIGN PATENT DOCUMENTS

CN 1345493 4/2002
EP 1083719 3/2001
(Continued)

OTHER PUBLICATIONS

Chinese Notice of Reexamination issued Aug. 12, 2016 in CN 201210247631.4 and English translation, 7 pages.
(Continued)

*Primary Examiner* — Chi H Pham
*Assistant Examiner* — Alexander O Boakye
(74) *Attorney, Agent, or Firm* — Nixon & Vanderhye P.C.

(57) ABSTRACT

A first orthogonal frequency division multiplexing (OFDM) frame signal is generated that includes a grid of multiple frequency subcarriers and multiple time periods. An OFDM symbol is transmitted using multiple frequency subcarriers during a time period and includes known reference OFDM symbols assigned to corresponding time-frequency resource elements in the grid, Each resource element is defined by a one of the multiple frequency subcarriers and one of the multiple time periods. A second orthogonal frequency division multiplexing (OFDM) frame signal is generated that includes a grid of multiple frequency subcarriers and mul-
(Continued)

tiple time periods and includes known reference OFDM symbols assigned to corresponding time-frequency resource elements in the grid. The time-frequency resource elements in the grid assigned to the known reference OFDM symbols in the first OFDM frame signal are different from the time-frequency resource elements in the grid assigned to the known reference OFDM symbols in the second OFDM frame signal. The first OFDM frame signal is converted to a first radio signal and the second OFDM frame signal to a second radio signal. The first radio signal is transmitted from a first antenna and the second radio signal from a second, different antenna.

18 Claims, 53 Drawing Sheets

Related U.S. Application Data continuation of application No. 13/433,577, filed on Mar. 29, 2012, now Pat. No. 8,400,996, which is a continuation of application No. 13/010,150, filed on Jan. 20, 2011, now Pat. No. 8,175,070, which is a continuation of application No. 12/541,400, filed on Aug. 14, 2009, now Pat. No. 7,907,587, which is a continuation of application No. 12/417,284, filed on Apr. 2, 2009, now Pat. No. 7,787,432, which is a continuation of application No. 10/516,937, filed as application No. PCT/JP03/09011 on Jul. 16, 2003, now Pat. No. 7,570,626.

(51) Int. Cl.
*H04B 7/0417* (2017.01)
*H04L 27/26* (2006.01)
*H04J 11/00* (2006.01)
*H04B 7/0413* (2017.01)
*H04W 72/04* (2009.01)
*H04B 7/06* (2006.01)
*H04B 7/08* (2006.01)
*H04L 25/02* (2006.01)

(52) U.S. Cl.
CPC ............ *H04J 11/00* (2013.01); *H04L 5/0007* (2013.01); *H04L 27/2647* (2013.01); *H04W 72/0453* (2013.01); *H04B 7/0613* (2013.01); *H04B 7/0837* (2013.01); *H04L 25/0204* (2013.01); *H04L 25/0224* (2013.01); *H04L 27/2657* (2013.01); *H04L 27/2662* (2013.01)

(58) Field of Classification Search
USPC .................................................. 370/329, 328
See application file for complete search history.

(56) References Cited

U.S. PATENT DOCUMENTS

| | | | |
|---|---|---|---|
| 5,771,224 A | 6/1998 | Seki et al. | |
| 5,774,450 A | 6/1998 | Harada et al. | |
| 6,421,333 B1 | 7/2002 | Jalali | |
| 6,643,333 B1 | 11/2003 | Jung et al. | |
| 6,721,569 B1 | 4/2004 | Hashem et al. | |
| 6,785,248 B2 | 8/2004 | Fuke | |
| 6,791,964 B1 | 9/2004 | Hwang et al. | |
| 6,876,672 B1 | 4/2005 | Castelain | |
| 6,888,789 B1 | 5/2005 | Sakoda et al. | |
| 6,941,113 B2 | 9/2005 | Asano | |
| 6,967,997 B2 | 11/2005 | Humphrey | |
| 6,973,118 B1 | 12/2005 | Ikeda et al. | |
| 6,993,092 B1 | 1/2006 | Murakami et al. | |
| 7,002,934 B2 | 2/2006 | Dolgonos et al. | |
| 7,003,050 B2 | 2/2006 | Matsumoto et al. | |
| 7,006,529 B2 | 2/2006 | Alastalo et al. | |
| 7,009,268 B2 | 3/2006 | Yang et al. | |
| 7,020,095 B2 | 3/2006 | Chini et al. | |
| 7,023,933 B2 | 4/2006 | Murakami et al. | |
| 7,058,005 B2 | 6/2006 | Ehrmann-Patin et al. | |
| 7,069,489 B2 | 6/2006 | Murakami et al. | |
| 7,099,265 B2 | 8/2006 | Kuwabara et al. | |
| 7,099,268 B2 | 8/2006 | Ichihara et al. | |
| 7,133,698 B2 | 11/2006 | Miyoshi et al. | |
| 7,164,696 B2 | 1/2007 | Sano et al. | |
| 7,212,793 B2 | 5/2007 | Kogawa et al. | |
| 7,224,741 B1 | 5/2007 | Hadad | |
| 7,570,626 B2 | 8/2009 | Murakami et al. | |
| 7,672,381 B1 | 3/2010 | Kleider et al. | |
| 7,787,432 B2 | 8/2010 | Murakami et al. | |
| 7,907,587 B2 | 3/2011 | Murakami et al. | |
| 8,023,488 B2 | 9/2011 | Murakami et al. | |
| 8,089,945 B2 | 1/2012 | Murakami et al. | |
| 8,175,070 B2 | 5/2012 | Murakami et al. | |
| 8,400,996 B2 | 3/2013 | Murakami et al. | |
| 9,083,480 B2* | 7/2015 | Murakami | H04B 7/0417 |
| 2001/0024427 A1 | 9/2001 | Suzuki | |
| 2001/0053124 A1 | 12/2001 | Ichihara et al. | |
| 2001/0053143 A1 | 12/2001 | Li | |
| 2002/0041635 A1 | 4/2002 | Ma et al. | |
| 2002/0085653 A1 | 7/2002 | Matsuoka et al. | |
| 2003/0125040 A1 | 7/2003 | Walton et al. | |
| 2004/0213144 A1 | 10/2004 | Murakami et al. | |
| 2004/0255040 A1 | 12/2004 | Lopes et al. | |
| 2009/0207929 A1 | 8/2009 | Murakami et al. | |

FOREIGN PATENT DOCUMENTS

| | | |
|---|---|---|
| JP | 8-265293 | 10/1996 |
| JP | 9-307517 | 11/1997 |
| JP | 2001-144724 | 5/2001 |
| JP | 2001-238269 | 8/2001 |
| JP | 2001-268047 | 9/2001 |
| JP | 2002-044051 | 2/2002 |
| KR | 1999-0057167 | 7/1999 |
| WO | 02/05506 | 1/2002 |
| WO | 02/33925 | 4/2002 |
| WO | 02/45329 | 6/2002 |

OTHER PUBLICATIONS

Chinese Third Office Action issued Sep. 2, 2015 in CN 201210247631.4 and English translation, 26 pages.
Hong Zhang et al, "Precoded ofdm with adaptive vector channel allocation for scalable video transmission over frequency-selective fading channels" IEEE Service Center, Los Alamitos, CA, US, vol. 1, No. 2, XP011094939, ISSN: 1536-1233 DOI: 10.1109/TMC.2002.1038349, Jan. 1, 2002, pp. 132-142.
Search report from EPO, mail date Dec. 22, 2011, 5 pages.
China Office Action, mail date May 25, 2011, 5 pages.
Japan Office Action in 2009-191127, mail date Feb. 7, 2012, 2 pages.
Chinese Office Action dated Jul. 3, 2014 in CN 201210247631.4 and English translation, 16 pages.
Chinese Second Office Action issued Apr. 3, 2015 in CN 201210247631.4 and English translation, 12 pages.
U.S. Appl. No. 13/770,199, filed Feb. 19, 2013, Murakai et al.
Office Action mailed Nov. 14, 2014 in co-pending U.S. Appl. No. 13/770,199, 9 pages.
Office Action mailed Jul. 31, 2014 in co-pending U.S. Appl. No. 13/770,199, 12 pages.
Chinese Decision on Rejection issued Feb. 3, 2016 in CN 201210247631.4 and English translation, 24 pages.
European Office Action dated Aug. 3, 2017 in EP 03764205.5, 5 pages.

* cited by examiner

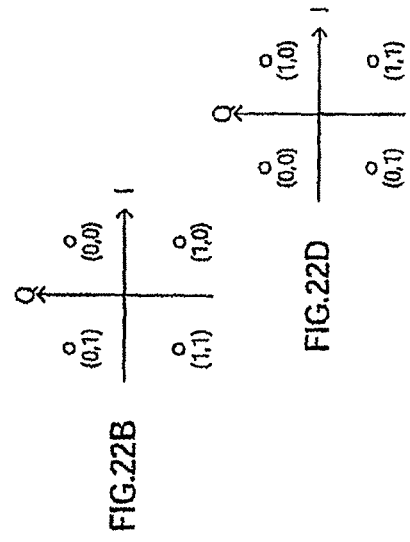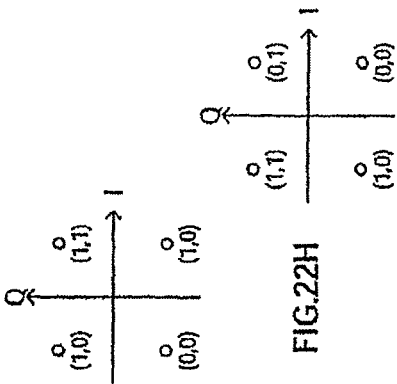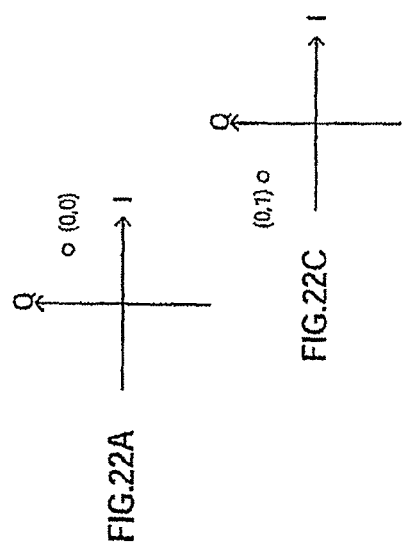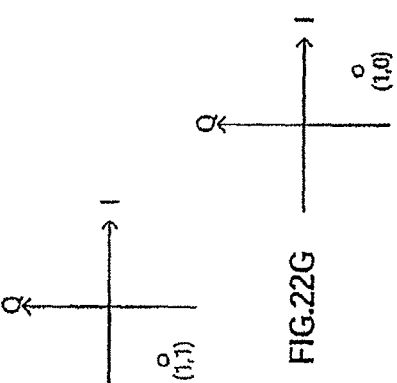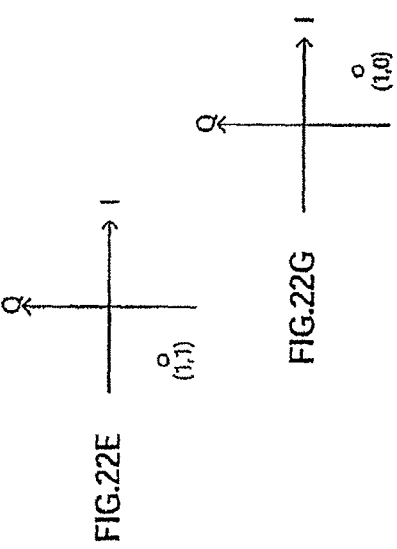

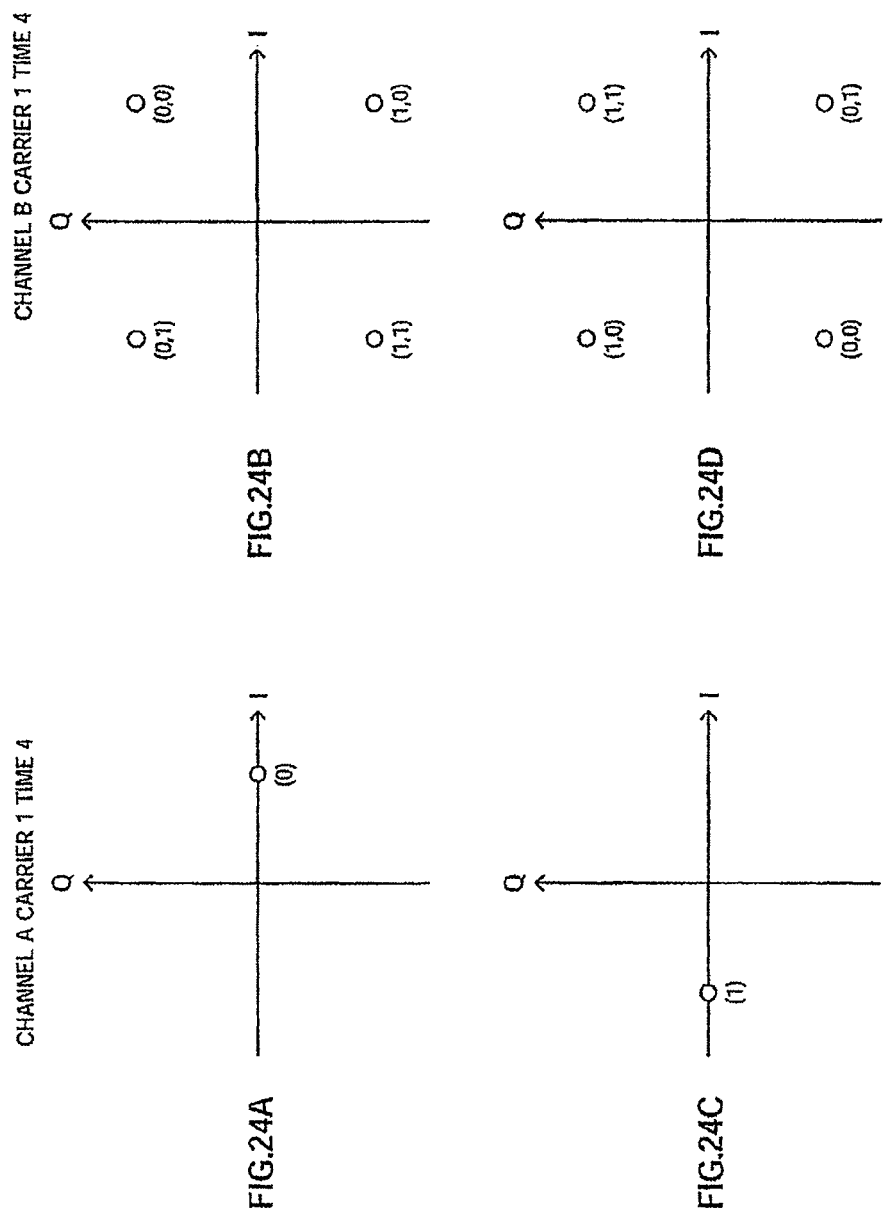

OFDM FRAME TRANSMISSION METHOD AND APPARATUS

CROSS REFERENCE TO RELATED APPLICATIONS

This application is a continuation of U.S. patent application Ser. No. 13/770,199, filed on Feb. 19, 2013 (now U.S. Pat. No. 9,083,480), which is a continuation of U.S. patent application Ser. No. 13/433,577, filed on Mar. 29, 2012 (now U.S. Pat. No. 8,400,996), which is a continuation of U.S. patent application Ser. No. 13/010,150, filed on Jan. 20, 2011 (Now U.S. Pat. No. 8,175,070), which is a continuation of U.S. patent application Ser. No. 12/541,400, filed on Aug. 14, 2009 (now U.S. Pat. No. 7,907,587), which is a continuation of U.S. patent application Ser. No. 12/417,284, filed Apr. 2, 2009 (now U.S. Pat. No. 7,787,432, issued on Aug. 31, 2010), which is continuation of U.S. patent application Ser. No. 10/516,937, filed Dec. 14, 2004 (now U.S. Pat. No. 7,570,626, issued on Aug. 4, 2009), which is a National Stage application of International Application No. PCT/JP03/09011, filed Jul. 16, 2003, and claims priority under 35 U.S.C. §119 of Japan Application No. 2002-206799, filed Jul. 16, 2002, and Japan Application No. 2002-259791, filed Sep. 5, 2002, the disclosure of each of which is expressly incorporated herein by reference in its entirety. The International application was not published in the English Language. This application is also related to U.S. patent application Ser. No. 13/010,146, filed on Jan. 20, 2011 (Now U.S. Pat. No. 8,089,945), which is a continuation of Ser. No. 12/541,400, filed on Aug. 14, 2009 (now U.S. Pat. No. 7,907,587), and to U.S. patent application Ser. No. 12/842,398, filed on Jul. 23, 2010 (Now U.S. Pat. No. 8,023,488), which is a continuation of U.S. patent application Ser. No. 12/417,284, filed Apr. 2, 2009 (now U.S. Pat. No. 7,787,432, issued on Aug. 31, 2010).

TECHNICAL FIELD

The present invention relates to a communication method, and a transmitting apparatus and receiving apparatus that use that communication method.

BACKGROUND

FIG. 1 is a block diagram showing the configuration of a conventional radio transmitting apparatus and receiving apparatus. A modulated signal generation section 02 has a transmit digital signal 01 as input, and outputs a modulated signal 03.

A radio section 04 has a modulated signal as input, and outputs a transmit signal 05.

A power amplification section 06 has transmit signal 05 as input, amplifies transmit signal 05 and outputs amplified transmit signal 07, and then amplified transmit signal 07 is output as a radio wave from an antenna 08.

A radio section 11 has as input a received signal 10 received from an antenna 09, and outputs a received quadrature baseband signal 12.

A demodulation section 13 has received quadrature baseband signal 12 as input, and outputs a received digital signal 14.

Thus, in a conventional apparatus, a plurality of modulated signals are not multiplexed. Also, when a plurality of modulated signals are transmitted and are multiplexed, and the transmitted multiplexed signals are separated and demodulated by the receiving apparatus, it is necessary to perform high-precision separation and demodulation.

DISCLOSURE

It is an object of the present invention to provide a communication method that enables compatibility between data transmission speed and received data quality to be achieved, and a transmitting apparatus and receiving apparatus that use that communication method.

This object is achieved by improving the data transmission speed by having a transmitting apparatus transmit a plurality of modulated signals multiplexed, and a receiving apparatus separate and demodulate the transmitted multiplexed modulated signals. Also, by configuring in accordance with either a method whereby one modulated signal of a communication system is transmitted, or a method whereby a plurality of modulated signals of a communication system are multiplexed and transmitted, by frequency and time, it is possible for a communicating party to obtain information accurately by transmitting information of high importance by means of a method whereby one modulated signal of a communication system is transmitted. Moreover, by performing communication by frequency or time of a method whereby one modulated signal of a communication system is transmitted, and by frequency or time of a method whereby a plurality of modulated signals of a communication system are multiplexed and transmitted, according to the communication conditions, it is possible to make information transmission speed and received data quality compatible.

BRIEF DESCRIPTION OF DRAWINGS

FIG. 22A is a drawing showing an example of the signal point arrangement in the I-Q plane when a channel B signal undergoes differential encoding with respect to a channel A signal;

FIG. 22B is a drawing showing an example of the signal point arrangement in the I-Q plane when a channel B signal undergoes differential encoding with respect to a channel A signal;

FIG. 22C is a drawing showing an example of the signal point arrangement in the I-Q plane when a channel B signal undergoes differential encoding with respect to a channel A signal;

FIG. 22D is a drawing showing an example of the signal point arrangement in the I-Q plane when a channel B signal undergoes differential encoding with respect to a channel A signal;

FIG. 22E is a drawing showing an example of the signal point arrangement in the I-Q plane when a channel B signal undergoes differential encoding with respect to a channel A signal;

FIG. 22F is a drawing showing an example of the signal point arrangement in the I-Q plane when a channel B signal undergoes differential encoding with respect to a channel A signal;

FIG. 22G is a drawing showing an example of the signal point arrangement in the I-Q plane when a channel B signal undergoes differential encoding with respect to a channel A signal;

FIG. 22H is a drawing showing an example of the signal point arrangement in the I-Q plane when a channel B signal undergoes differential encoding with respect to a channel A signal;

FIG. 24A is a drawing showing an example in which channel B M-ary modulation I-Q plane signal point arrangement is performed based on channel A PSK modulation;

FIG. 24B is a drawing showing an example in which channel B M-ary modulation I-Q plane signal point arrangement is performed based on channel A PSK modulation;

FIG. 24C is a drawing showing an example in which channel B M-ary modulation I-Q plane signal point arrangement is performed based on channel A PSK modulation;

FIG. 24D is a drawing showing an example in which channel B M-ary modulation I-Q plane signal point arrangement is performed based on channel A PSK modulation;

EXAMPLE EMBODIMENTS

With reference now to the accompanying drawings, embodiments of the present invention will be explained in detail below.

Embodiment 1

In this embodiment, a description is given of a transmitting apparatus that transmits non-multiplexed and multiplexed carriers in transmit frames in a multicarrier communication system, and a receiving apparatus that can demodulate a modulated signal of either carrier.

Figure 2:
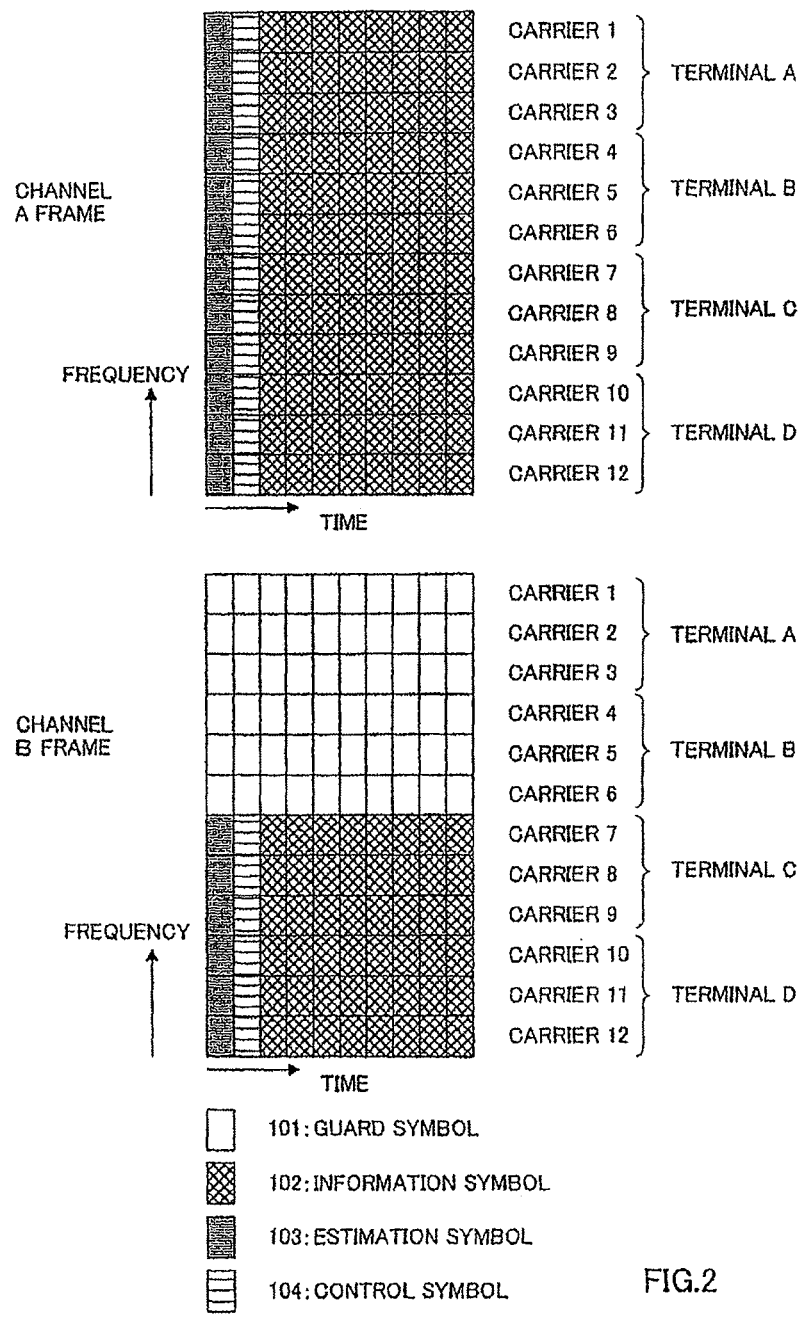
FIG. 2 is a drawing showing an example of the frame configuration on the frequency-time axes of each channel according to Embodiment 1 of the present invention.

FIG. 2 is a drawing showing an example of the frame configuration on the frequency-time axes of each channel according to Embodiment 1 of the present invention. In FIG. 2, the vertical axis indicates frequency and the horizontal axis indicates time. Reference numeral 101 indicates a guard symbol, reference numeral 102 indicates an information symbol, reference numeral 103 indicates an estimation symbol, and reference numeral 104 indicates a control symbol.

In FIG. 2, guard symbols 101 are symbols for which there is no modulated signal. Estimation symbols 103 are pilot symbols for estimating, for example, time synchronization, frequency synchronization, and distortion due to the channel fluctuation, or a unique word or preamble, for which a known signal such as a BPSK modulated signal, for example, is suitable. Control symbols 104 are symbols that transmit information used by a terminal for control, and are symbols for transmitting information by means of information symbols 102.

A feature of the communication method of this embodiment is that, in a particular carrier 1, only symbols of one channel are transmitted, and information symbols of a plurality of channels are transmitted and are multiplexed in other carriers.

That is to say, in FIG. 2, in carrier 1 through carrier 6, only channel A information symbols are transmitted, and in carrier 7 through carrier 12, channel A information symbols and channel B information symbols are transmitted and are multiplexed.

Similarly, in carrier 1 through carrier 6, only channel A estimation symbols are transmitted, and in carrier 7 through carrier 12, channel A estimation symbols and channel B estimation symbols are transmitted and are multiplexed.

Figure 3:
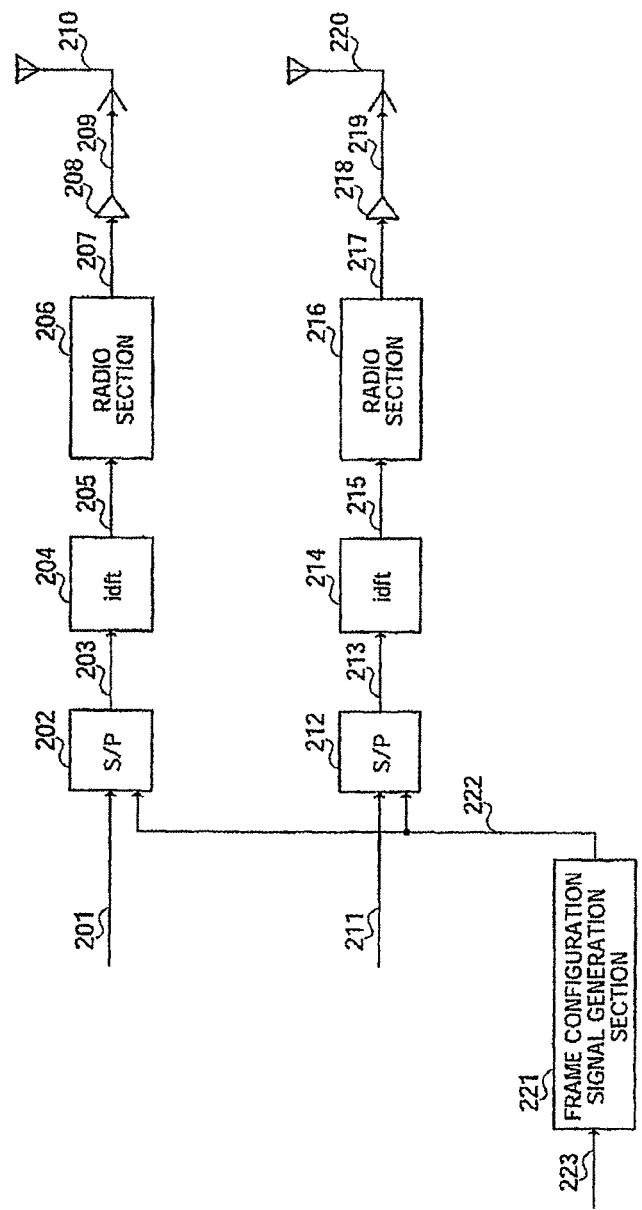
FIG. 3 is a block diagram showing the configuration of a transmitting apparatus of this embodiment.

A transmitting apparatus that transmits signals with the frame configuration in FIG. 2 will now be described. FIG. 3 is a block diagram showing the configuration of a transmitting apparatus of this embodiment.

A frame configuration signal generation section 221 generates frame configuration information based on an input control signal 223, and outputs a frame configuration signal 222 comprising this frame configuration information to a serial/parallel conversion section 202 and serial/parallel conversion section 212.

The part that processes and transmits a FIG. 2 channel A signal by means of serial/parallel conversion section 202, an inverse discrete Fourier transform section 204, radio section 206, power amplification section 208, and antenna 210 is described below. In channel A, a signal is transmitted with information symbols, estimation symbols, and control symbols placed in carriers 1 through 12, as shown in FIG. 2.

Serial/parallel conversion section 202 converts a channel A transmit digital signal 201 to parallel data with an arrangement in accordance with frame configuration signal 222, and outputs a converted parallel signal 203 to inverse discrete Fourier transform section 204. Specifically, serial/parallel conversion section 202 arranges information symbols, estimation symbols, and control symbols in carriers 1 through 12 as shown in FIG. 2.

Inverse discrete Fourier transform section 204 performs inverse discrete Fourier transform processing of channel A parallel signal 203, and outputs a converted signal 205 to radio section 206. Radio section 206 converts signal 205 to radio frequency and creates a transmit signal 207, and outputs transmit signal 207 to power amplification section 208.

Power amplification section 208 amplifies the power of transmit signal 207, and a power-amplified transmit signal 209 is transmitted from antenna 210 as a radio wave.

Next, the part that processes and transmits a FIG. 2 channel B signal by means of serial/parallel conversion section 212, an inverse discrete Fourier transform section 214, radio section 216, power amplification section 218, and antenna 220 will be described. In channel B, a signal is transmitted with guard symbols placed in carriers 1 through 6, and information symbols, estimation symbols, and control symbols placed in carriers 6 through 12, as shown in FIG. 2.

Serial/parallel conversion section 212 converts a channel B transmit digital signal 211 to parallel data with an arrangement in accordance with frame configuration signal 222, and outputs a converted parallel signal 213 to inverse discrete Fourier transform section 214.

Inverse discrete Fourier transform section 214 performs inverse discrete Fourier transform processing of parallel signal 213, and outputs a converted signal 215 to radio section 216.

Radio section 216 converts signal 215 to radio frequency and creates a transmit signal 217, and outputs transmit signal 217 to power amplification section 218.

Power amplification section 218 amplifies the power of transmit signal 217, and a power-amplified transmit signal 219 is transmitted from antenna 220 as a radio wave.

Thus, in a particular channel, carriers are divided into carriers in which guard symbols are placed and carriers in which information symbols are placed, and in another channel, information symbols are done away with in all carriers, and the same carriers are shared (multiplexed) by a plurality of channels.

The operations whereby the transmitting apparatus in FIG. 3 transmits signals with the frame configurations in FIG. 2 will now be described.

Serial/parallel conversion section 202 has transmit digital signal 201 and frame configuration signal 222 as input, and places symbols in accordance with the channel A frame configuration in FIG. 2—that is to say, configures a frame by placing information symbols, control symbols, and estimation symbols in carrier 1 through carrier 12, and generates channel A parallel signal 203.

Channel B serial/parallel conversion section 212 has channel B transmit digital signal 211 and frame configuration signal 222 as input, and places symbols in accordance with the channel B frame configuration in FIG. 2—that is to say, configures a frame by placing information symbols, control symbols, and estimation symbols in carrier 7 through carrier 12, and generates channel B parallel signal 213.

Estimation symbols 103 are inserted for time synchronization and frequency offset estimation. Also, channel A carrier 1 through carrier 6 estimation symbols are used by a receiving apparatus to estimate propagation path distortion and demodulate channel A carrier 1 through carrier 6 information symbols. At this time, estimation symbols are not inserted in carrier 1 through carrier 6 in channel B.

Estimation symbols of channel A and channel B carrier 7 through carrier 12 are symbols for separating information symbols of channel A and channel B carrier 7 through carrier 12. For example, by using mutually orthogonal symbols for estimation symbols comprising channel A carrier 7 through carrier 12 and estimation symbols comprising channel B carrier 7 through carrier 12, it is easy to separate information symbols of channel A and channel B carrier 7 through carrier 12.

When channel A carrier 1 through carrier 6 information symbols and channel A and channel B carrier 7 through carrier 12 information symbols are compared, in the receiving apparatus channel A carrier 1 through carrier 6 information symbols are of better quality than channel A and channel B carrier 7 through carrier 12 information symbols. Considering this fact, it is appropriate for information of high importance to be transmitted in channel A carrier 1 through carrier 6 information symbols. "Importance" here refers to data whose reception quality it is wished to ensure, such as modulation method or error correction method information, or transmitter/receiver procedure related information, for example.

It is also possible to transmit one kind of information medium in channel A in carrier 1 through carrier 6, and transmit one kind of information medium in channel A and channel B in carrier 7 through carrier 12, such as transmitting video information, for example, using carrier 1 through carrier 6 channel A information symbols, and transmitting Hi-Vision video using carrier 7 through carrier 12 channel A and channel B information symbols. Also, the same kind of information medium may by transmitted in carrier 1 through carrier 6 channel A transmission and carrier 7 through carrier 12 channel A and channel B transmission. At this time, the compression ratio when coding, for example, will be different for the same kind of information. Here, the channel A compression ratio is lower than the channel B compression ratio.

It is also possible to transmit information in a hierarchical fashion, with a certain kind of information transmitted by means of carrier 1 through carrier 6 channel A information symbols, and difference information transmitted using carrier 7 through carrier 12 channel A and channel B information symbols.

A receiving apparatus that receives a signal transmitted using the above symbol arrangement is described below.

Figure 4:
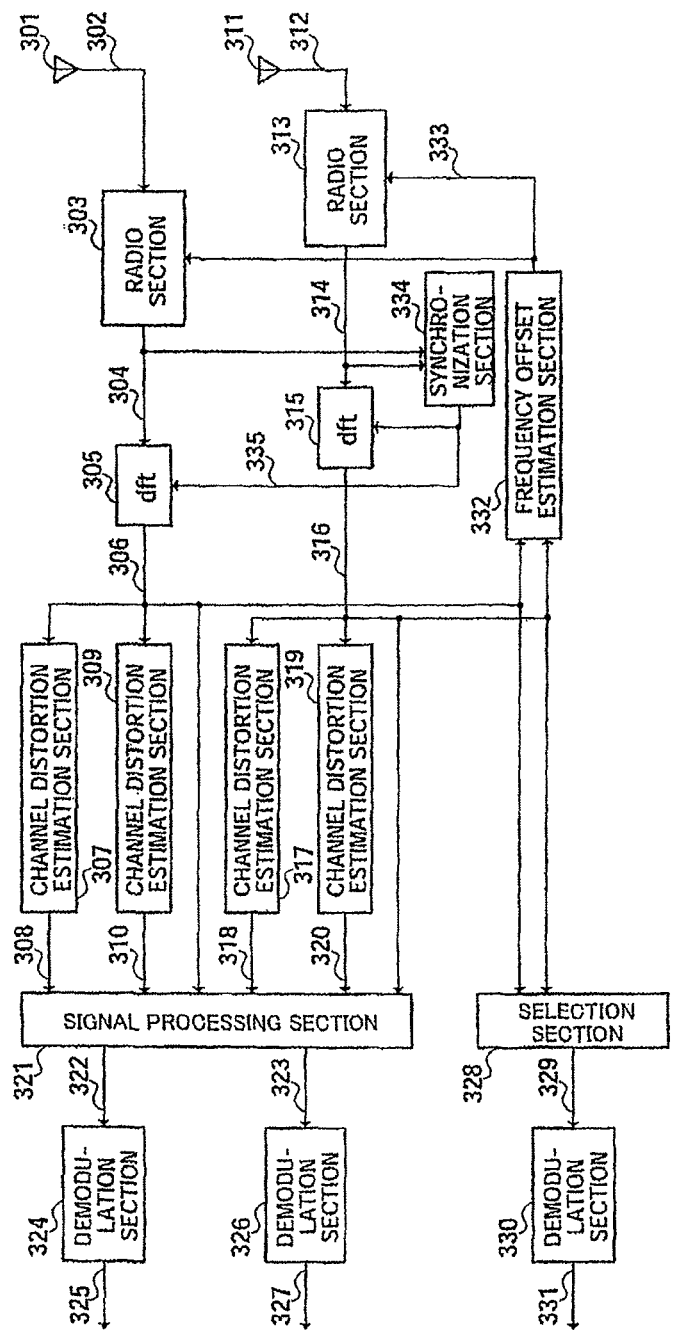
FIG. 4 is a block diagram showing the configuration of a receiving apparatus of this embodiment.

FIG. 4 is a block diagram showing the configuration of a receiving apparatus of this embodiment. FIG. 4 shows one example of a configuration of a receiving apparatus according to this embodiment. In FIG. 4, a radio section 303 converts a received signal 302 received by an antenna 301 to baseband frequency, and outputs received quadrature baseband signal 304 resulting from the conversion to a Fourier transform section 305 and synchronization section 334.

Fourier transform section 305 performs Fourier transform processing on received quadrature baseband signal 304, and outputs resulting parallel signal 306 to a transmission path distortion estimation section 307, transmission path distortion estimation section 309, signal processing section 321, selection section 328, and frequency offset estimation section 332.

Transmission path distortion estimation section 307 estimates channel A transmission path distortion from parallel signal 306 estimation symbols, and outputs a channel A transmission path distortion parallel signal 308 to signal processing section 321.

Transmission path distortion estimation section 309 estimates channel B channel distortion from parallel signal 306 estimation symbols, and outputs a channel B channel distortion parallel signal 310 to signal processing section 321.

A radio section 313 converts a received signal 312 received by an antenna 311 to baseband frequency, and outputs received quadrature baseband signal 314 resulting from the conversion to a Fourier transform section 315 and synchronization section 334.

Fourier transform section 315 performs Fourier transform processing on received quadrature baseband signal 314, and outputs resulting parallel signal 316 to a channel distortion estimation section 317, channel distortion estimation section 319, signal processing section 321, selection section 328, and frequency offset estimation section 332.

Channel distortion estimation section 317 estimates channel A channel distortion from parallel signal 316 estimation symbols, and outputs a channel A channel distortion parallel signal 318 to signal processing section 321.

Channel distortion estimation section 319 estimates channel B channel distortion from parallel signal 316 estimation symbols, and outputs a channel B channel distortion parallel signal 320 to signal processing section 321.

Signal processing section 321 separates parallel signals 306 and 316 into channel A and channel B signals based on channel A channel distortion parallel signals 308 and 318, and channel B channel distortion parallel signals 310 and 320. That is to say, signal processing section 321 separates channel A and channel B signals of carrier 7 through carrier 12 in which channel A and channel B are multiplexed in FIG. 2, outputs carrier 7 through carrier 12 channel A parallel signal 322 to a demodulation section 324, and outputs carrier 7 through carrier 12 channel B parallel signal 323 to a demodulation section 326.

Demodulation section 324 demodulates carrier 7 through carrier 12 channel A parallel signal 322, and outputs a demodulated received digital signal 325.

Demodulation section 326 demodulates carrier 7 through carrier 12 channel B parallel signal 323, and outputs a demodulated received digital signal 327.

Selection section 328 has parallel signals 306 and 316 as input, selects the parallel signal with the greater field strength, for example, and outputs the selected parallel signal to a demodulation section 330 as parallel signal 329.

Demodulation section 330 estimates channel distortion for selected parallel signal 329 from non-multiplexed carrier 1 through carrier 6 estimation symbols 103 in FIG. 2, demodulates the carrier 1 through carrier 6 parallel signal from the estimated channel distortion, and outputs a demodulated received digital signal 331.

Frequency offset estimation section 332 estimates the frequency offset amount from parallel signal 306 and 316 FIG. 2 estimation symbols, and outputs a frequency offset estimation signal 333 to radio section 313. For example, frequency offset estimation section 332 inputs a frequency offset estimation signal to radio sections 303 and 313, and radio sections 303 and 313 eliminate the received signal frequency offset.

Synchronization section 334 acquires time synchronization by means of received quadrature baseband signal 304 and 314 FIG. 2 estimation symbols, and outputs a timing signal 335 to Fourier transform section 305 and Fourier transform section 315. That is to say, the receiving apparatus is able to establish time synchronization with the transmitting apparatus by having synchronization section 334 detect FIG. 2 estimation symbols 103 in received quadrature baseband signal 304 and received quadrature baseband signal 314.

Also, frequency offset estimation section 332 estimates frequency offset from FIG. 2 estimation symbols 103 in parallel signals 306 and 316.

Signal processing section 321 separates channel A and channel B multiplexed signals for carrier 7 through carrier 12 in FIG. 2, and outputs the resulting signals as channel A parallel signal 322 and channel B parallel signal 323 respectively.

Demodulation section 324 demodulates carrier 7 through carrier 12 channel A parallel signal 322, and demodulation section 326 demodulates carrier 7 through carrier 12 channel B parallel signal 323.

Demodulation section 330 estimates channel distortion for selected parallel signal 329 from FIG. 2 non-multiplexed carrier 1 through carrier 6 estimation symbols 103, and demodulates the carrier 1 through carrier 6 parallel signal from the estimated channel distortion.

At this time, received digital signals 325 and 327 obtained from carrier 7 through carrier 12 channel A and channel B are of poor quality in comparison with carrier 1 through carrier 6 channel A received digital signal 331, but can be transmitted at high speed. Therefore, carrier 1 through carrier 6 channel A received digital signal 331 is suitable for transmission of important information and transmission of control information.

Received digital signals 325 and 327 obtained from carrier 7 through carrier 12 channel A and channel B are input to a decoder X (not shown), and decoded. Then carrier 1 through carrier 6 channel A received digital signal 331 is input to a decoder Y (not shown), and decoded. By this means, different information X and Y can be obtained from different decoders X and Y, and although the information is the same in decoders X and Y, it is possible to transmit information with different compression ratios.

It is possible to perform hierarchical transmission in which video is transmitted by means of carrier 1 through carrier 6 channel A received digital signal 331 and difference information for Hi-Vision video is transmitted by received digital signals 325 and 327 obtained from carrier 7 through carrier 12 channel A and channel B.

Thus, according to a transmitting apparatus and receiving apparatus of this embodiment, by creating frames whereby a plurality of modulated signals are transmitted from a plurality of antennas and frames whereby a modulated signal is transmitted from one antenna, and transmitting important information in a modulated signal transmitted from one antenna, it is possible to secure data quality in a receiving apparatus.

Also, according to a transmitting apparatus and receiving apparatus of this embodiment, by transmitting different information in frames whereby a plurality of modulated signals are transmitted from a plurality of antennas and frames whereby a modulated signal is transmitted from one antenna, it is possible to transmit information of different quality and transmission speed.

In FIG. 2, FIG. 3, and FIG. 4, the use of multiplex frames and non-multiplexed frames with two channels and two antennas has been illustrated as an example, but the present invention is not limited to this. For example, it is possible to implement the present invention similarly with multiplex frames using three channels and three antennas, multiplex frames using two channels and two of three antennas, and frames that cause the existence of non-multiplexed frames.

Also, the frame configurations are not limited to those in FIG. 2. Furthermore, an example has been described in which OFDM is used as the communication method, but it is possible to implement the present invention similarly as long as a multicarrier method is used. Moreover, a spread spectrum communication method may be used as the method for each carrier in a multicarrier system. Thus, it is possible to implement the present invention similarly with OFDM-CDM (Orthogonal Frequency Division Multiplexing-Code Division Multiplexing).

Furthermore, there are also cases where one antenna is composed of a plurality of antennas.

Embodiment 2

In Embodiment 2 of the present invention, a description is given of a communication method, transmitting apparatus, and receiving apparatus whereby, when a multicarrier communication system is used in which a base station performs communication with a plurality of terminals, non-multiplexed carriers and multiplexed carriers are provided in base station transmit frames, and a modulated signal is transmitted to a terminal using one or other of these types of carrier.

Figure 5:
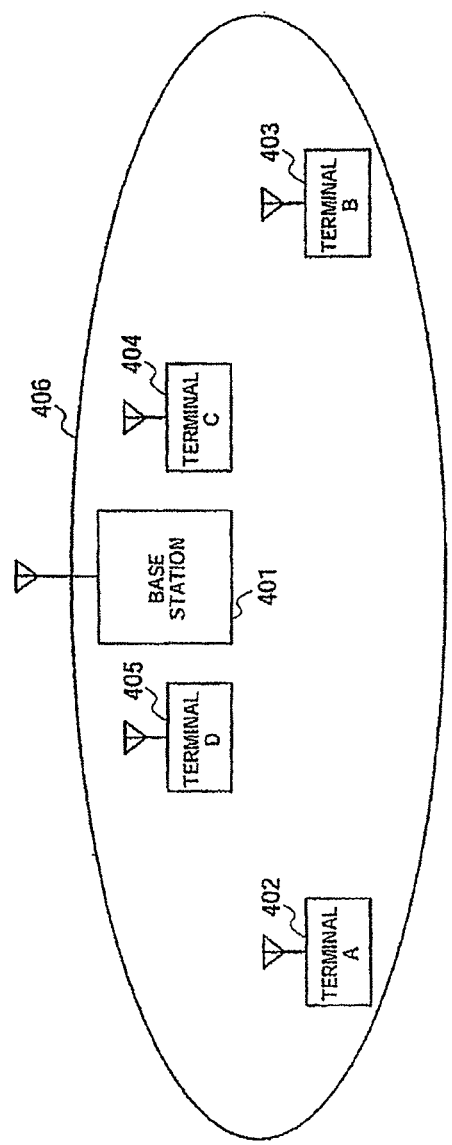
FIG. 5 is a drawing showing an example of the arrangement of a base station and terminals according to Embodiment 2 of the present invention.

In this embodiment, signals are transmitted by the base station apparatus shown in FIG. 3 using the frame configurations shown in FIG. 2. FIG. 5 is a drawing showing an example of the arrangement of a base station and terminals according to Embodiment 2 of the present invention. In FIG. 5, reference numeral 401 indicates a base station, reference numeral 402 indicates terminal A, reference numeral 403 indicates terminal B, reference numeral 404 indicates terminal C, reference numeral 405 indicates terminal D, and reference numeral 406 indicates the communication limit of base station 401 transmit signals.

When the locations of the base station and terminals are as shown in FIG. 5, the reception status of terminal A 402 and terminal B 403 located far from base station 401 is poor, while the reception status of terminal C 404 and terminal D 405 is good as they are near base station 401.

Considering this, it is assumed that a base station equipped with a transmitting apparatus of this embodiment performs assignment to communication terminals in 3-carrier units as shown in FIG. 2, for example.

Figure 15:
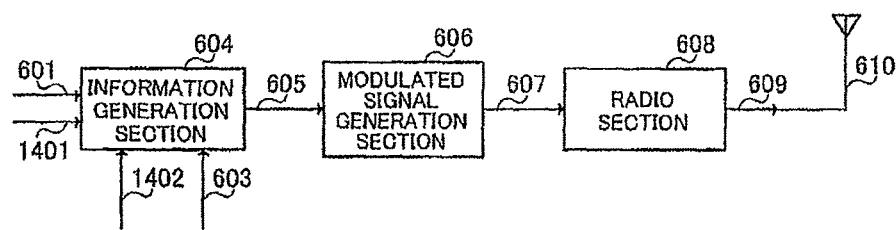
FIG. 15 is a drawing showing an example of the configuration of a transmitting apparatus of a base station according to this embodiment.

In this case, in FIG. 15, carrier 7 through carrier 9 in FIG. 2 are assigned for communication with terminal C 404 and carrier 10 through carrier 12 in FIG. 2 are assigned for communication with terminal C 405, for both of which terminals the reception status is good, and communication is performed on channel A and channel B, so that the transmission speed is high. Also, carrier 1 through carrier 3 in FIG. 2 are assigned for communication with terminal A 402 and carrier 4 through carrier 6 in FIG. 2 are assigned for communication with terminal B 403, for both of which terminals the reception status is poor, and communication is performed on channel A, so that the transmission speed is low but received data quality is good.

At this time, by transmitting information concerning channel assignment by means of control symbols 104 in FIG. 2, and having a terminal demodulate control symbols 104, it is possible to ascertain where in a frame information for that terminal is assigned.

Figure 6:
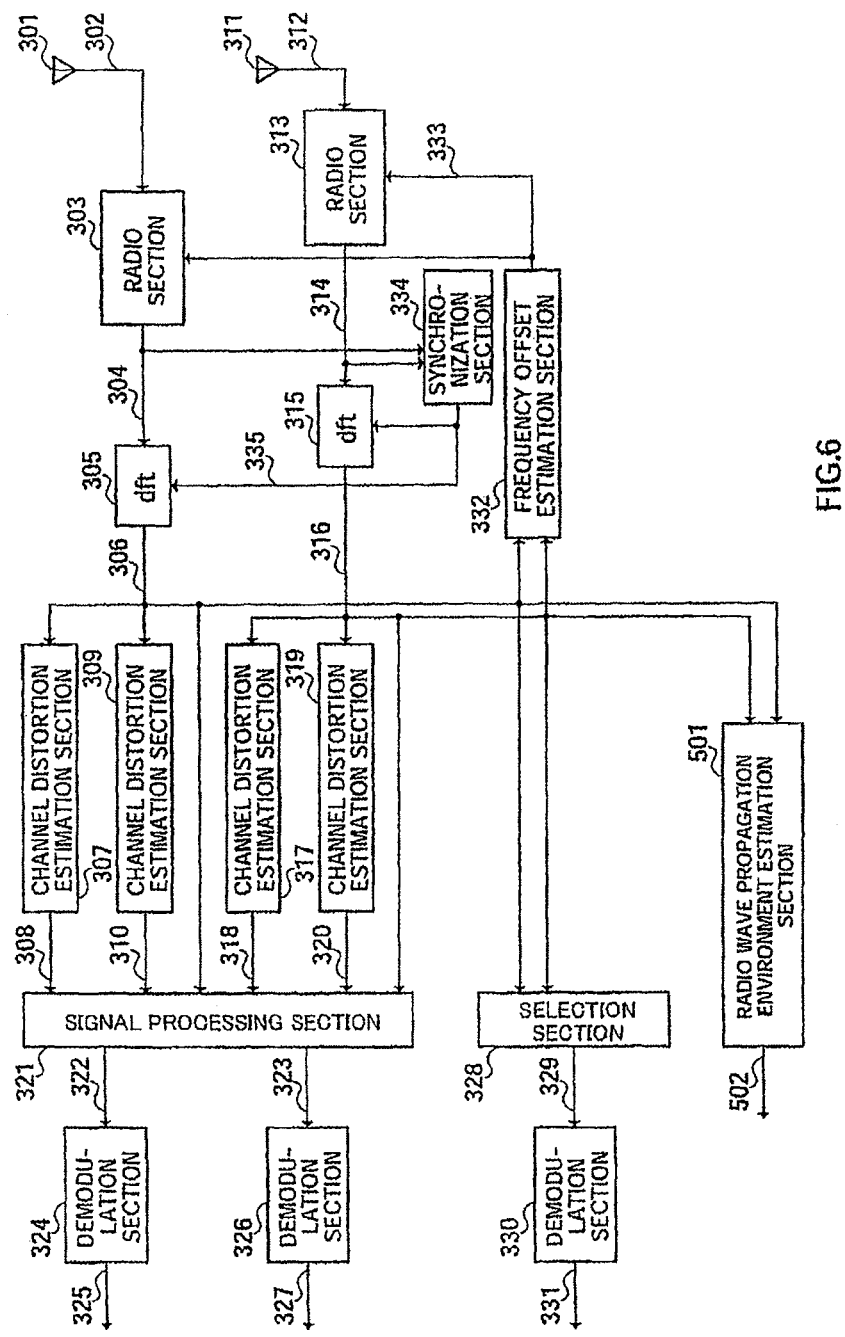
FIG. 6 is a block diagram showing an example of the configuration of a receiving apparatus of this embodiment.

Next, the receiving apparatus side will be described. FIG. 6 is a block diagram showing an example of the configuration of a receiving apparatus of this embodiment. Parts in FIG. 6 identical to those in FIG. 4 are assigned the same reference numerals as in FIG. 4, and detailed descriptions thereof are omitted.

A radio wave propagation environment estimation section 501 estimates the field strength, multipath environment, Doppler frequency, direction of arrival, channel fluctuation, interference intensity, polarized wave state, and delay profile of received signals received by antenna 301 and antenna 311 from parallel signals 306 and 316, and outputs this information as radio wave propagation environment information 502.

Figure 7:
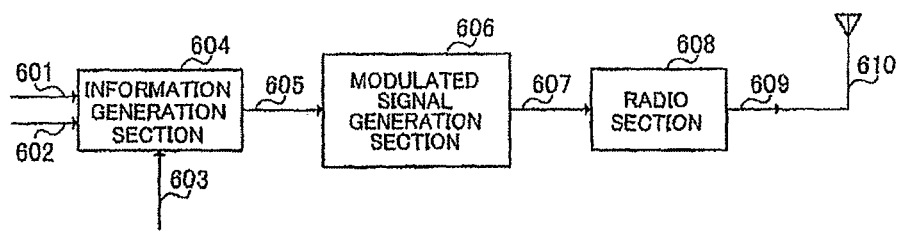
FIG. 7 is a block diagram showing an example of the configuration of a transmitting apparatus of this embodiment.

FIG. 7 is a block diagram showing an example of the configuration of a transmitting apparatus of this embodiment. An information generation section 604 generates a transmit digital signal 605 from data 601 and radio wave propagation environment information 602 in accordance with request information 603 that a user or communication terminal considers necessary, such as transmission speed, modulation method, and received data quality, for example, and outputs transmit digital signal 605 to a modulated signal generation section 606.

Modulated signal generation section 606 modulates transmit digital signal 605, and outputs a transmit quadrature baseband signal 607 to a radio section 608.

Radio section 608 converts transmit quadrature baseband signal 607 to radio frequency and generates a modulated signal 609, which is output as a radio wave from an antenna 610.

The operation of the transmitting apparatus in FIG. 7 will now be described. Radio wave propagation environment information 502 estimated by radio wave propagation environment estimation section 501 of the receiving apparatus in FIG. 6 corresponds to radio wave propagation environment information 602, and is input to information generation section 604.

Information generation section 604 generates transmit digital signal 605 from data 601, radio wave propagation environment information 602, and request information 603 that a user or communication terminal considers necessary, such as transmission speed, modulation method, and received data quality, for example. By this means, a terminal transmits a signal containing the radio wave propagation environment when the terminal receives a modulated signal transmitted from the base station, and request information requested by the user or terminal.

Also, as a separate operation from this, information generation section 604 determines and requests a communication method from request information 603 comprising information the user or terminal considers necessary, such as transmission speed, modulation method, and received data quality, for example, and outputs transmit digital signal 605. At this time, information on the requested communication method is included in transmit digital signal 605. Here, "communication method" is information as to whether communication is performed by means of a multiplex signal or whether communication is performed by means of a non-multiplexed signal.

Figure 8:
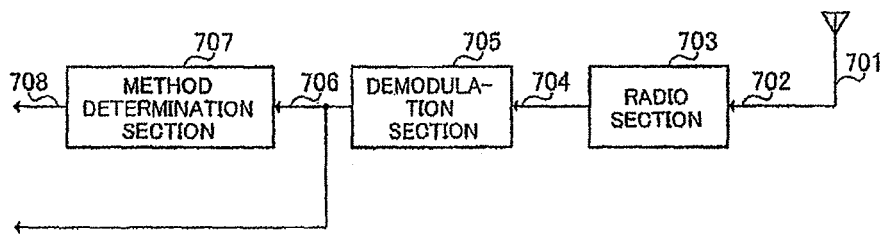
FIG. 8 is a block diagram showing an example of the configuration of a receiving apparatus of this embodiment.

FIG. 8 is a block diagram showing an example of the configuration of a receiving apparatus of this embodiment. In FIG. 8, a radio section 703 converts a received signal 702 received by an antenna 701 to baseband frequency, and outputs a received quadrature baseband signal 704 to a demodulation section 705.

Demodulation section 705 demodulates received quadrature baseband signal 704 and outputs a received digital signal 706 to a method determination section 707.

Method determination section 707 extracts radio wave propagation environment information and request information contained in received digital signal 706, selects the method whereby the base station transmits to a terminal—that is, either a method whereby signals of a plurality of channels are transmitted from a plurality of antennas, or a method whereby signals of a plurality of channels are not multiplexed and a signal of one channel is transmitted—and outputs this as a control signal 708.

Next, the operation of the receiving apparatus in FIG. 8 will be described. Method determination section 707 in FIG. 8 extracts radio wave propagation environment information and request information contained in a signal transmitted by the terminal A transmitting apparatus (FIG. 6), or extracts requested communication method information, selects either a method whereby signals of a plurality of channels are transmitted from a plurality of antennas or a method whereby signals of a plurality of channels are not multiplexed and a signal of one channel is transmitted, and outputs this as control signal 708.

Frame configuration signal generation section 221 in the base station transmitting apparatus in FIG. 3 has control signal 708 from a terminal A, terminal B, terminal C, or terminal D receiving apparatus as input control signal 223, and outputs frame configuration signal 222. By this means, modulated signals conforming to the frame configurations in FIG. 2 can be transmitted by the base station transmitting apparatus.

A description will now be given of the means of setting the communication method at the start of communication when communication is performed by an above-described transmitting apparatus and receiving apparatus.

Considering reception quality with respect to the radio wave propagation environment, the quality of carrier 1 through carrier 6 channel A information symbols is good in comparison with carrier 7 through carrier 12 channel A information symbols and channel B information symbols.

Therefore, when a terminal and base station start communicating, the base station maintains data quality by transmitting information to the terminal in carrier 1 through carrier 6 channel A information symbols, thereby providing system stability.

Alternatively, when a terminal and base station start communicating, the base station first transmits estimation symbols 103 as shown in FIG. 2 to the terminal, the terminal receives the initially transmitted estimation symbols 103, estimates the radio wave propagation environment, and retransmits radio wave propagation environment estimation information and request information.

Then, based on the radio wave propagation environment information and request information from the terminal, the base station selects either transmission of information by means of carrier 1 through carrier 6 channel A information symbols or transmission of information by means of carrier 7 through carrier 12 channel A information symbols and channel B information symbols, and starts communication. By this means, data quality can be maintained and therefore system stability is achieved.

Alternatively, when a terminal and base station start communicating, the base station first transmits estimation symbols 103 as shown in FIG. 2 to the terminal, the terminal receives the initially transmitted estimation symbols 103, estimates the radio wave propagation environment, takes radio wave propagation environment estimation information and request information into consideration, selects either transmission of information by means of carrier 1 through carrier 6 channel A information symbols or transmission of information by means of carrier 7 through carrier 12 channel A information symbols and channel B information symbols, and makes a request to the base station.

Based on the request from the terminal, the base station selects either transmission of information by means of carrier 1 through carrier 6 channel A information symbols or transmission of information by means of carrier 7 through carrier 12 channel A information symbols and channel B information symbols, and starts communication. By this means, data quality can be maintained and therefore system stability is achieved.

Thus, according to a transmitting apparatus and receiving apparatus of this embodiment, when a base station performs communication with a plurality of terminals, by assigning non-multiplexed carriers in base station transmit frames in communication with a terminal whose reception status is poor, and assigning multiplexed carriers in communication with a terminal whose reception quality is good, it is possible for a terminal to achieve compatibility between data transmission speed and received data quality.

In the above description, the use of multiplex frames and non-multiplexed frames with two channels and two antennas has been illustrated in FIG. 2, FIG. 3, and FIG. 4 as an example, but the present invention is not limited to this. For example, it is possible to implement the present invention similarly with multiplex frames using three channels and three antennas, multiplex frames using two channels and two of three antennas, and frames that cause the existence of non-multiplexed frames.

Also, the frame configurations are not limited to those in FIG. 2. Furthermore, an example has been described in which OFDM is used as the communication method, but it is possible to implement the present invention similarly as long as a multicarrier method is used. Moreover, a spread spectrum communication method may be used as the method for each carrier in a multicarrier system. Thus, it is possible to implement the present invention similarly with OFDM-CDM.

Furthermore, there are also cases where one antenna is composed of a plurality of antennas.

Embodiment 3

In Embodiment 3 of the present invention, a description is given of a transmitting apparatus that transmits a frequency of a multiplexed modulated signal and a frequency of a non-multiplexed modulated signal in a transmitting apparatus transmit frame, and a receiving apparatus that can demodulate a modulated signal of either frequency.

Figure 9:
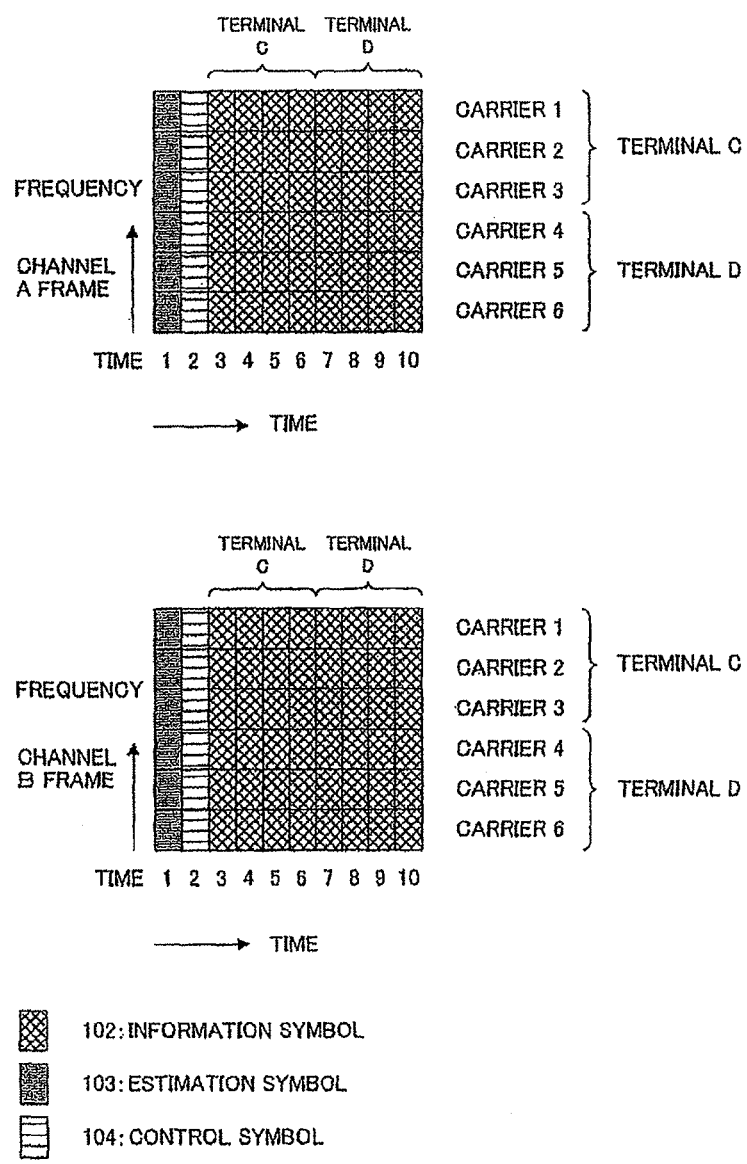
FIG. 9 is a drawing showing communication signal frame configurations according to Embodiment 3 of the present invention.

FIG. 9 is a drawing showing communication signal frame configurations according to Embodiment 3 of the present invention. FIG. 9 shows an example of frame configurations on the frequency-time axes of base station transmit signal channel A and channel B in frequency band f1 according to this embodiment. In FIG. 9, the vertical axis indicates frequency and the horizontal axis indicates time. Reference numeral 102 indicates an information symbol, reference numeral 103 indicates an estimation symbol, and reference numeral 104 indicates a control symbol. Estimation symbols 103 are pilot symbols for estimating time synchronization, frequency synchronization, and distortion due to the channel fluctuation, and control symbols 104 are symbols that transmit information used by a terminal for control, and are symbols for transmitting information by means of information symbols 102.

Channel A and channel B signals are transmitted from two antennas respectively. A transmitting apparatus of this embodiment transmits, separately from channel A and channel B signals, a channel C signal by means of an antenna separate from the channel A and channel B antennas. The channel C signal frame configuration is described below.

Figure 10:
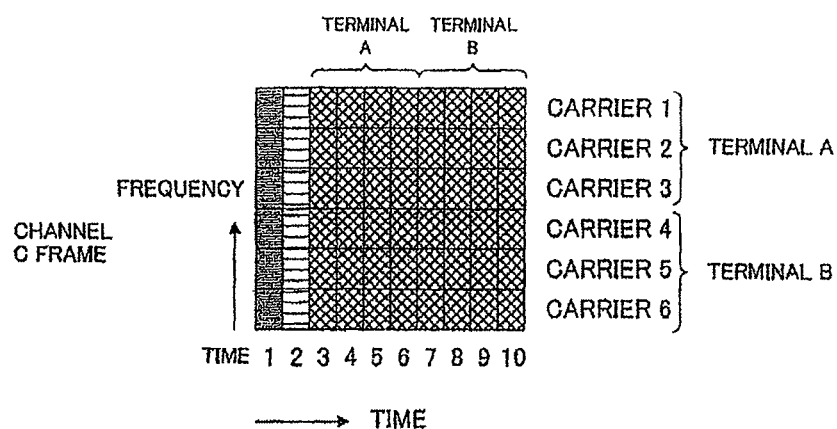
FIG. 10 is a drawing showing a communication signal frame configuration according to Embodiment 3 of the present invention.

FIG. 10 is a drawing showing a communication signal frame configuration according to Embodiment 3 of the present invention. FIG. 10 shows an example of a frame configuration on the frequency-time axes of base station transmit signal channel C in frequency band f2 according to this embodiment. In FIG. 10, the vertical axis indicates frequency and the horizontal axis indicates time. Reference numeral 102 indicates an information symbol, reference numeral 103 indicates an estimation symbol, and reference numeral 104 indicates a control symbol. Estimation symbols 103 are pilot symbols for estimating time synchronization, frequency synchronization, and distortion due to the channel fluctuation, and control symbols 104 are symbols that transmit information used by a terminal for control, and are symbols for transmitting information by means of information symbols 102.

A channel C signal is transmitted from an antenna separate from the antennas for channel A and channel B.

Figure 11:
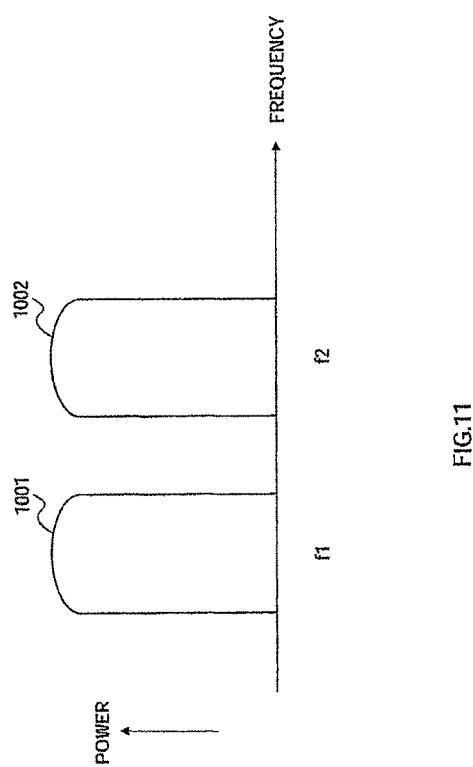
FIG. 11 is a drawing showing the base station transmit signal frequency arrangement according to this embodiment.

Also, a channel C signal is transmitted at a different frequency from channel A and channel B. FIG. 11 is a drawing showing the base station transmit signal frequency arrangement according to this embodiment. In FIG. 11, the vertical axis indicates power and the horizontal axis indicates frequency. Reference numeral 1001 indicates a channel A and channel B multiplex transmit signal, with the frequency band designated f1. Reference numeral 1002 indicates a channel C multiplex transmit signal, with the frequency band designated f2. Thus, a channel C signal is transmitted at a different frequency from channel A and channel B.

Figure 1:
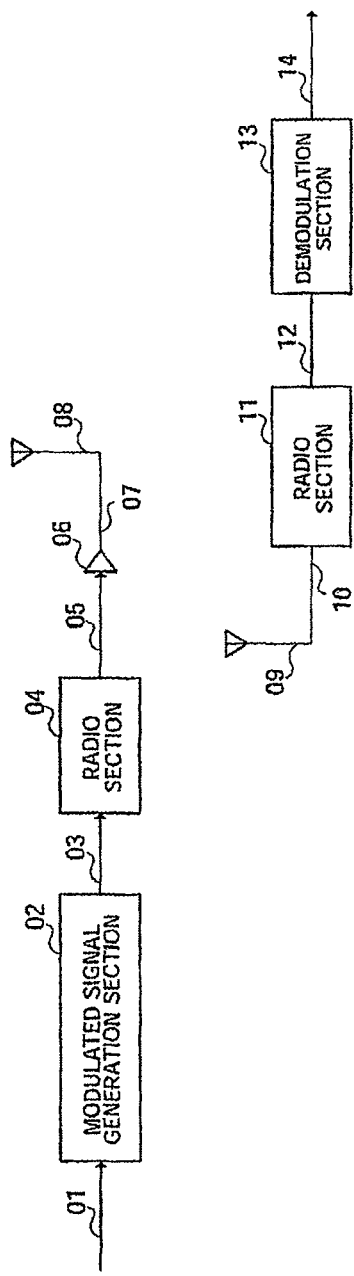
FIG. 1 is a block diagram showing an example of the configuration of a conventional radio transmitting apparatus and receiving apparatus.

In FIG. 11, carriers are arranged in frequency FIG. 1 and frequency f2, and frequency f1 is assigned for base station transmission, the frame configurations at this time being as shown in FIG. 9.

Frequency f2 is assigned for base station transmission, the frame configuration at this time being as shown in FIG. 10. At frequency f1, for example, channel A and channel B are transmitted and are multiplexed, and the transmission speed is high but received data quality is poor. At frequency f2, on the other hand, channel C is transmitted, and as there is no multiplexing, the transmission speed is low but received data quality is good.

A description will now be given of a transmitting apparatus that transmits above-described channel A, channel B, and channel C signals.

Figure 12:
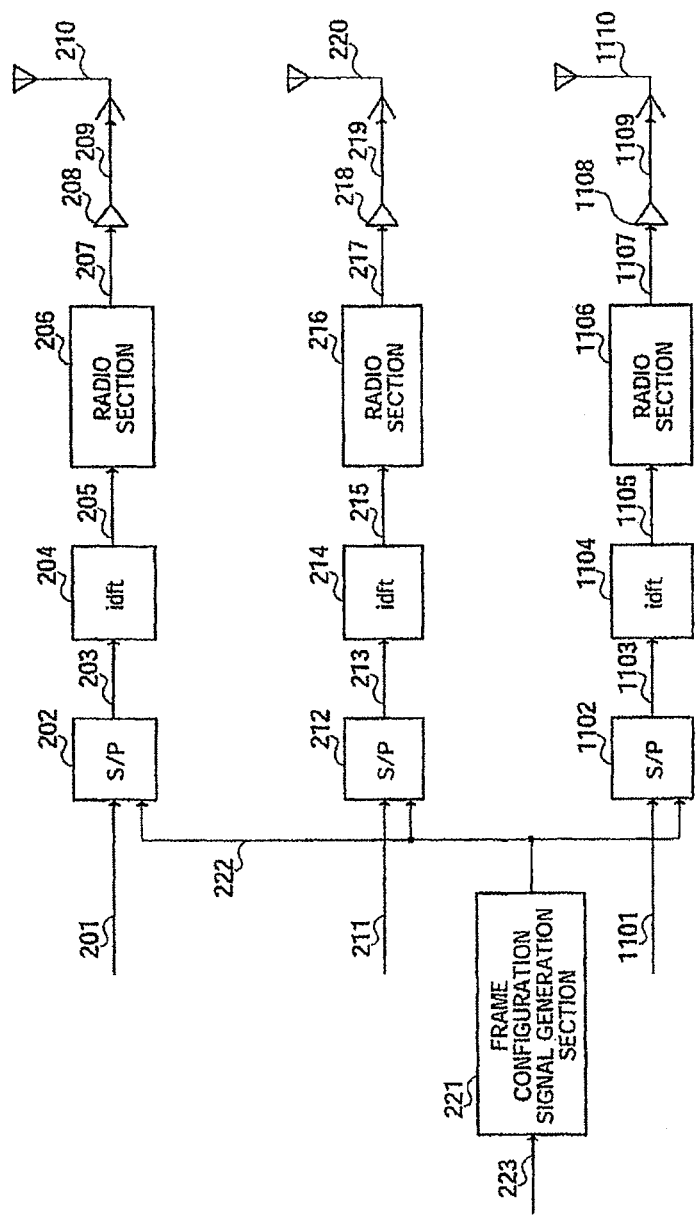
FIG. 12 is a block diagram showing an example of the configuration of a transmitting apparatus of a base station according to this embodiment.

FIG. 12 is a block diagram showing an example of the configuration of a transmitting apparatus of a base station according to this embodiment. Parts in FIG. 12 identical to those in FIG. 3 are assigned the same reference numerals as in FIG. 3, and detailed descriptions thereof are omitted.

In FIG. 12, a serial/parallel conversion section 1102 a channel C transmit digital signal 1101 parallel signal 1103 in accordance with frame configuration signal 222.

An inverse discrete Fourier transform section 1104 performs inverse Fourier transform processing of channel C parallel signal 1103, and outputs a post-inverse-Fourier-transform signal 1105 resulting from to a radio section 1106.

Radio section 1106 converts channel C post-inverse-Fourier-transform signal 1105 to radio frequency, and outputs a channel C transmit signal 1107 to a power amplification section 1108.

Power amplification section 1108 amplifies channel C transmit signal 1107, and an amplified C transmit signal 1109 is output as a radio wave from a channel C antenna 1110.

The operation of the transmitting apparatus in FIG. 12 will now be described.

Channel A serial/parallel conversion section 202 generates channel A parallel signal 203 in which information symbols, control symbols, and estimation symbols are present, in accordance with the channel A frame configuration in FIG. 9, based on channel A transmit digital signal 201 and frame configuration signal 222.

Channel B serial/parallel conversion section 212 generates channel B parallel signal 213 in which information symbols, control symbols, and estimation symbols are present, in accordance with the channel B frame configuration in FIG. 9, based on channel B transmit digital signal 211 and frame configuration signal 222.

Channel A and channel B signals are then transmitted at frequency f1.

Estimation symbols 103 in FIG. 9 are inserted for time synchronization and frequency offset estimation. They are also signals for performing channel estimation for separating channel A and channel B signals.

Channel C serial/parallel conversion section 1102 generates channel C parallel signal 1103 in which information symbols, control symbols, and estimation symbols are present, in accordance with the channel C frame configuration in FIG. 10, based on channel B transmit digital signal 1101 and frame configuration signal 222.

A channel C signal is then transmitted at frequency f2.

Estimation symbols 103 in FIG. 10 are inserted for time synchronization and frequency offset estimation.

When channel A information symbols and channel A and channel B information symbols are compared with channel C information symbols, in the receiving apparatus they are of better quality than channel C information symbols. Considering this fact, it is appropriate for information of high importance to be transmitted in channel C information symbols.

It is possible to transmit one kind of information medium in channel C, and transmit one kind of information medium in channel A and channel B, such as transmitting video information, for example, using channel C information symbols, and transmitting Hi-Vision video using channel A and channel B information symbols. Also, the same kind of information medium may by transmitted in channel C transmission and channel A and channel B transmission. At this time, the compression ratio when coding, for example, will be different for the same kind of information.

It is also possible to transmit information in a hierarchical fashion, with a certain kind of information transmitted by means of channel C information symbols, and difference information transmitted using channel A and channel B information symbols.

Figure 13:
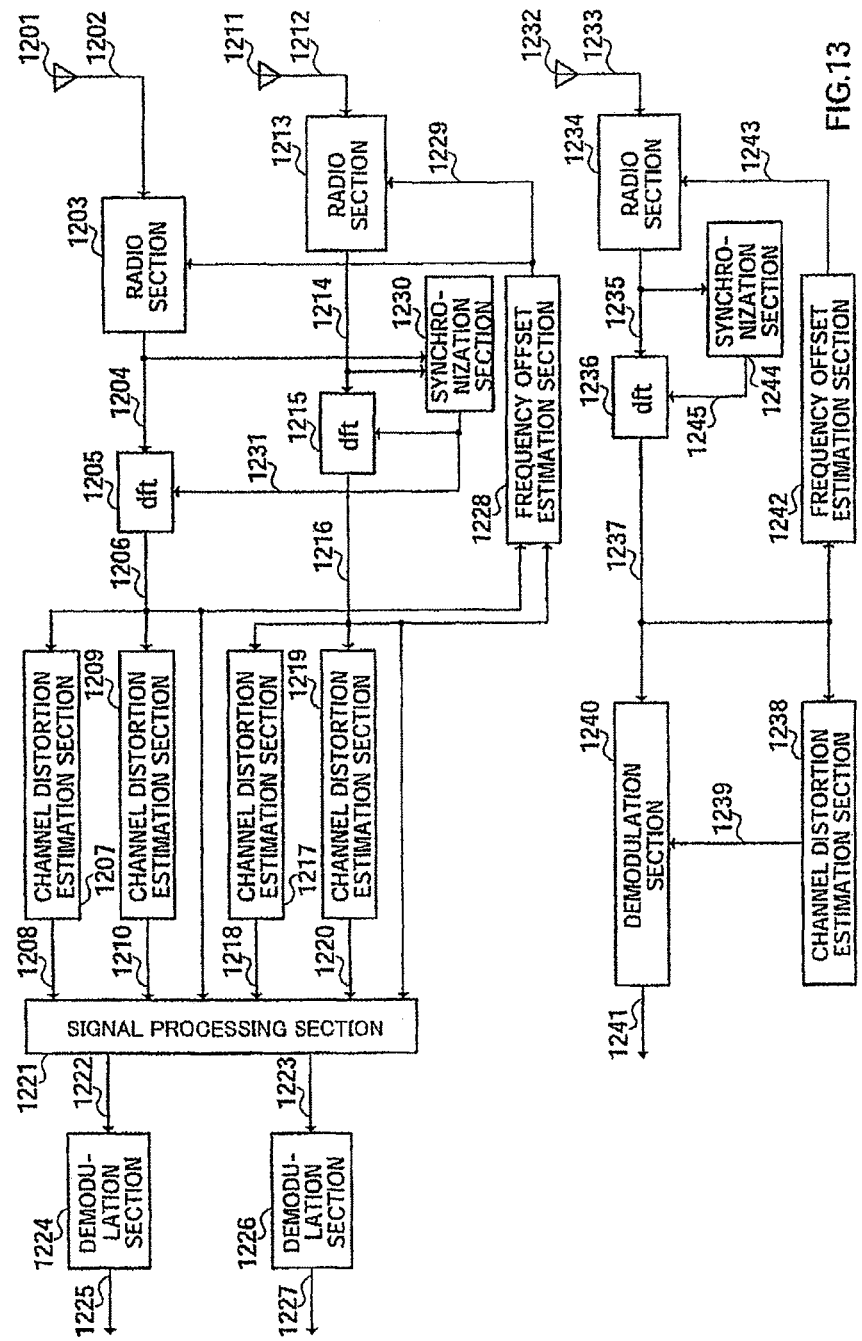
FIG. 13 is a block diagram showing the configuration of a receiving apparatus of a terminal according to this embodiment.

FIG. 13 is a block diagram showing the configuration of a receiving apparatus of a terminal according to this embodiment. In FIG. 13, a radio section 1203 converts a frequency band f1 received signal 1202 received by an antenna 1201 to baseband frequency, and outputs a received quadrature baseband signal 1204 to a Fourier transform section 1205 and synchronization section 1230.

Fourier transform section 1205 performs Fourier transform processing on received quadrature baseband signal 1204, and outputs resulting parallel signal 1206 to a channel distortion estimation section 1207, channel distortion estimation section 1209, signal processing section 1221, and frequency offset estimation section 1228.

Channel distortion estimation section 1207 estimates channel A channel distortion from parallel signal 1206 estimation symbols, and outputs a channel A channel distortion parallel signal 1208 to signal processing section 1221.

Channel distortion estimation section 1209 estimates channel B channel distortion from parallel signal 1206 estimation symbols, and outputs a channel B channel distortion parallel signal 1210 to signal processing section 1221.

A radio section 1213 converts a received signal 1212 received by an antenna 1211 to baseband frequency, and outputs a received quadrature baseband signal 1214 to a Fourier transform section 1215 and synchronization section 1230.

Fourier transform section 1215 performs Fourier transform processing on received quadrature baseband signal 1214, and outputs resulting parallel signal 1216 to a channel distortion estimation section 1217, channel distortion estimation section 1219, signal processing section 1221, and frequency offset estimation section 1228.

Channel distortion estimation section 1217 estimates channel A channel distortion from parallel signal 1216 estimation symbols, and outputs a channel A channel distortion parallel signal 1218 to signal processing section 1221.

Channel distortion estimation section 1219 estimates channel B channel distortion from parallel signal 1216 estimation symbols, and outputs a channel B channel distortion parallel signal 1220 to signal processing section 1221.

Signal processing section 1221 separates parallel signals 1206 and 1216 into channel A and channel B signals based on channel A channel distortion parallel signals 1208 and 1218, and channel B channel distortion parallel signals 1210 and 1220. Of the separated signals, signal processing section 1221 then outputs channel A parallel signal 1222 to a demodulation section 1224, and outputs channel B parallel signal 1223 to a demodulation section 1226.

Demodulation section 1224 demodulates channel A parallel signal 1222, and outputs a received digital signal 1225.

Demodulation section 1226 demodulates channel B parallel signal 1223, and outputs a received digital signal 1227.

Frequency offset estimation section 1228 estimates the frequency offset amount from parallel signal 1206 and 1216 (FIG. 9), and outputs a frequency offset estimation signal 1229. Specifically, frequency offset estimation section 1228 estimates the frequency offset amount from estimation symbols 103 in FIG. 9. Then frequency offset estimation section 1228 outputs a frequency offset estimation signal to radio sections 1203 and 1213, for example, and radio sections 1203 and 1213 eliminate the received signal frequency offset.

Synchronization section 1230 acquires time synchronization using received quadrature baseband signals 1204 and 1214, and outputs a timing signal 1231 to Fourier transform section 1205 and Fourier transform section 1215. Synchronization section 1230 acquires time synchronization by means of estimation symbols 103 in FIG. 9, for example.

A radio section 1234 converts a frequency band f2 received signal 1233 received by an antenna 1232 to baseband frequency, and outputs a received quadrature baseband signal 1235 to a Fourier transform section 1236 and synchronization section 1244.

Fourier transform section 1236 performs Fourier transform processing on received quadrature baseband signal 1235, and outputs resulting parallel signal 1237 to a channel distortion estimation section 1238, demodulation section 1240, and frequency offset estimation section 1242.

Channel distortion estimation section 1238 estimates channel distortion from parallel signal 1237, and outputs a channel distortion parallel signal 1239 to demodulation section 1240.

Based on channel distortion parallel signal 1239, demodulation section 1240 eliminates channel distortion from channel C parallel signal 1237, demodulates the signal, and outputs a channel C received digital signal 1241.

Next, the operation of the receiving apparatus in FIG. 13 will be described.

Synchronization section 1230 detects FIG. 9 estimation symbols 103 in received quadrature baseband signal 1204 and received signal 1214, and the receiving apparatus establishes time synchronization with the transmitting apparatus.

Frequency offset estimation section 1228 estimates frequency offset from FIG. 9 estimation symbols 103 in parallel signals 1206 and 1216.

Signal processing section 1221 separates FIG. 9 multiplexed signals into a channel A signal and channel B signal.

Synchronization section 1244 acquires time synchronization from received quadrature baseband signal 1235 (FIG. 10) estimation symbols.

Channel distortion estimation section 1238 estimates channel distortion from parallel signal 1237 (FIG. 10) estimation symbols.

Channel C demodulation section 1240 has channel distortion parallel signal 1239 as input, and demodulates FIG. 10 parallel signal 1237 information symbols.

At this time, received digital signals 1225 and 1227 obtained from channel A and channel B are of poor quality in comparison with channel C received digital signal 1241, but can be transmitted at high speed. Considering this fact, channel C received digital signal 1241 is suitable for transmission of important information and transmission of control information.

Received digital signals 1225 and 1227 obtained from channel A and channel B are input to a decoder X (not shown), and decoded. Then channel C received digital signal 1241 is input to a decoder Y (not shown), and decoded. By this means, different information X and Y can be obtained from different decoders X and Y, and although the information is the same in decoders X and Y, it is possible to transmit information with different compression ratios.

It is possible to perform hierarchical transmission in which video is transmitted by means of channel C received digital signal 1241 and difference information for Hi-Vision video is transmitted by received digital signals 1225 and 1227 obtained from channel A and channel B.

Thus, according to a transmitting apparatus and receiving apparatus of this embodiment, there is a frequency for transmitting a plurality of modulated signals from a plurality of antennas and a frequency for transmitting a modulated signal from one antenna, and by transmitting important information in a modulated signal transmitted from one antenna, it is possible to secure data quality in a receiving apparatus.

Also, according to a transmitting apparatus and receiving apparatus of this embodiment, by transmitting different information at a frequency for transmitting a plurality of modulated signals from a plurality of antennas and a frequency for transmitting a modulated signal from one antenna, it is possible to transmit information of different quality and transmission speed.

In FIG. 9, the use of multiplex frames on two channels is illustrated, but the present invention is not limited to this. Also, in FIG. 11, an example with two frequency bands is illustrated, but the present invention is not limited to this. For example, it is possible for there to be three frequency bands, and for frequencies to be assigned for 3-channel multiplex transmission, 2-channel multiplex transmission, and single-channel transmission.

A description has been given above that refers to a configuration with two antennas transmitting two channels and one antenna transmitting one channel in the transmitting apparatus in FIG. 12, but the present invention is not limited to this. For example, the transmitting apparatus may be equipped with two or more antennas for transmitting two channels.

Also, in the case where there are three frequency bands, and frequencies are assigned for 3-channel multiplex transmission, 2-channel multiplex transmission, and single-channel transmission, the transmitting apparatus may be equipped with a plurality of antennas for 3-channel multiplex transmission, or may be equipped with a plurality of antennas for 2-channel multiplex transmission, or may be equipped with a plurality of antennas for single-channel transmission. The same applies to the receiving apparatus in FIG. 13.

Furthermore, an example has been described in which OFDM is used as the communication method, but it is possible to implement the present invention similarly as long as a multicarrier method is used. Moreover, a spread spectrum communication method may be used as the method for each carrier in a multicarrier system. Thus, it is possible to implement the present invention similarly with OFDM-CDM (Orthogonal Frequency Division Multiplexing-Code Division Multiplexing).

Furthermore, there are also cases where one antenna is composed of a plurality of antennas.

Embodiment 4

In Embodiment 4 of the present invention, a description is given of a communication method, transmitting apparatus, and receiving apparatus whereby, when a base station performs communication with a plurality of terminals, a frequency of a multiplexed modulated signal and a frequency of a non-multiplexed modulated signal are provided in transmit frames, and a modulated signal is transmitted to a terminal using one or other of these frequencies.

Figure 14:
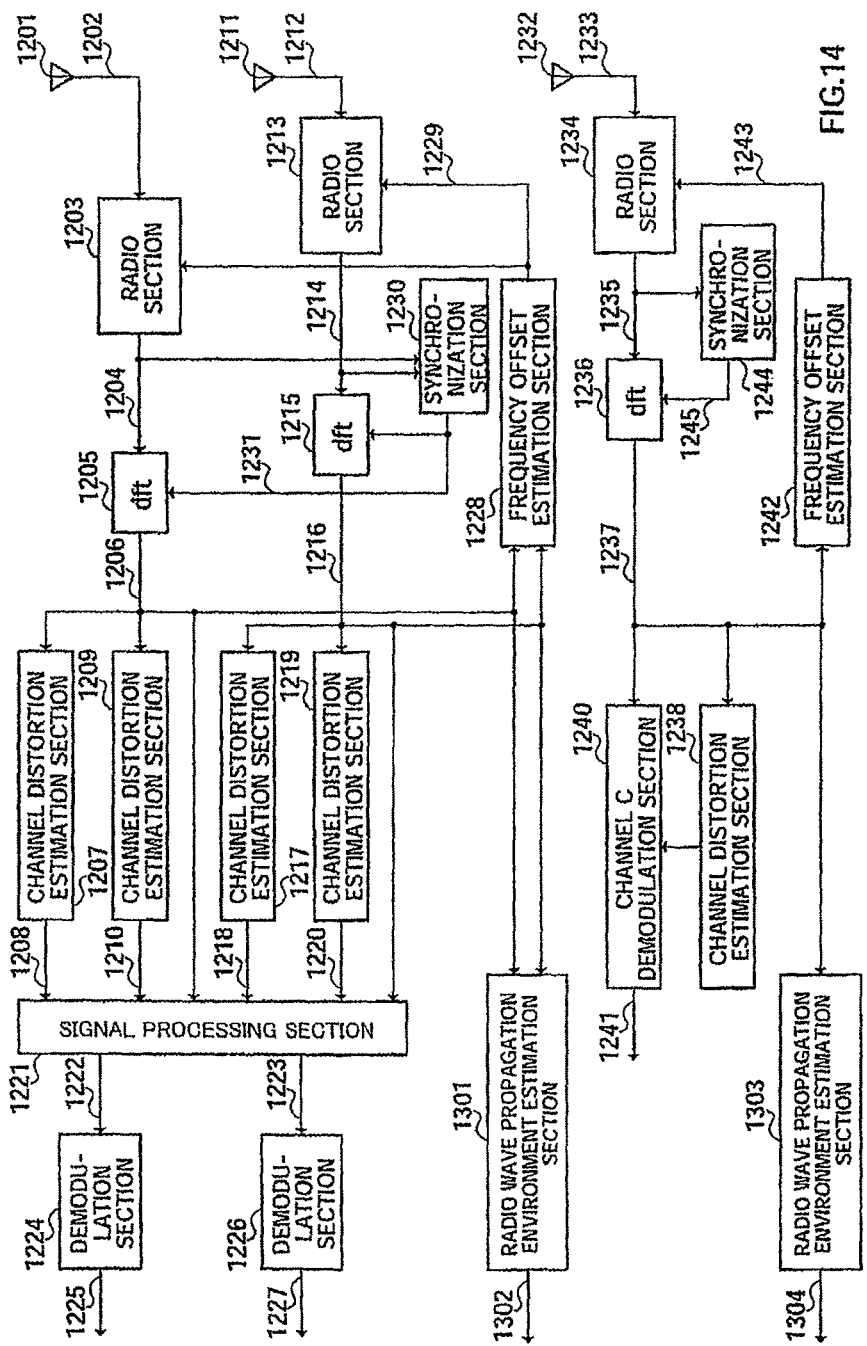
FIG. 14 is drawing showing an example of the configuration of a receiving apparatus of a terminal according to Embodiment 4 of the present invention.

FIG. 14 is drawing showing an example of the configuration of a receiving apparatus of a terminal according to Embodiment 4 of the present invention. Parts in FIG. 14 identical to those in FIG. 13 are assigned the same reference numerals as in FIG. 13, and detailed descriptions thereof are omitted. The receiving apparatus in FIG. 14 differs from the receiving apparatus in FIG. 13 in that a radio wave propagation environment estimation section 1301 and radio wave propagation environment estimation section 1303 are provided, a frequency in the base station is used as assignment information, and the propagation environment is estimated by the receiving apparatus.

Radio wave propagation environment estimation section 1301 estimates the radio wave propagation environments of received signals received by antenna 1201 and antenna 1211, respectively, from parallel signals 1206 and 1216, and outputs radio wave propagation environment estimation information 1302.

Radio wave propagation environment estimation section 1303 estimates the radio wave propagation environment of a received signals received by antenna 1232 from parallel signal 1237, and outputs radio wave propagation environment estimation information 1304.

FIG. 15 is a drawing showing an example of the configuration of a transmitting apparatus of a base station according to this embodiment. Parts in FIG. 15 identical to those in FIG. 6 are assigned the same reference numerals as in FIG. 6, and detailed descriptions thereof are omitted. The transmitting apparatus in FIG. 15 differs from the transmitting apparatus in FIG. 6 in that an information generation section 604 is provided, and based on a propagation environment estimated by the receiving apparatus, a frequency not multiplexed by the base station is assigned to communication with a terminal whose reception status is poor, and a frequency multiplexed by the base station is assigned to communication with a terminal whose reception status is good.

Information generation section 604 generates transmit digital signal 605 from transmit digital signal 601, radio wave propagation environment information 1401 and 1402, and request information 603, and outputs this transmit digital signal 605 to modulated signal generation section 606.

The base station apparatus transmits information concerning channel assignment by means of control symbols 104 in FIG. 9 and FIG. 10, and a terminal can ascertain where in a frame information for that terminal is assigned by demodulating control symbols 104.

The operation of the receiving apparatus and transmitting apparatus of a terminal will now be described in detail.

In FIG. 14, radio wave propagation environment estimation section 1301 has parallel signals 1206 and 1216 as input, and estimates the field strength, multipath environment, Doppler frequency, direction of arrival, channel fluctuation, interference intensity, polarized wave state, and delay profile of a signal received by antenna 1201 and a signal received by antenna 1211 from estimation symbols 103 in FIG. 9, for example.

Radio wave propagation environment estimation section 1303 estimates the field strength, multipath environment, Doppler frequency, direction of arrival, channel fluctuation, interference intensity, polarized wave state, and delay profile of a signal received by antenna 1232 parallel signal 1237 FIG. 10 estimation symbols.

Using radio wave propagation environment estimation information 1302 and radio wave propagation environment estimation information 1304 estimated by the receiving apparatus, the transmitting apparatus in FIG. 15 determines assignment of a non-multiplexed frequency or assignment of a base station multiplexed frequency. Radio wave propagation environment estimation information 1302 estimated by radio wave propagation environment estimation section 1301 of the receiving apparatus in FIG. 14 corresponds to radio wave propagation environment information 1401, and radio wave propagation environment estimation information 1304 estimated by radio wave propagation environment estimation section 1303 corresponds to radio wave propagation environment information 1402, and radio wave propagation environment information 1401 and radio wave propagation environment information 1402 are input to information generation section 604.

Information generation section 604 generates transmit digital signal 605 from data 601, radio wave propagation environment information 1401 and 1402, and request information 603 that a user or communication terminal considers necessary, such as transmission speed, modulation method, and received data quality, for example. By this means, a terminal transmits a signal containing the radio wave propagation environment when the terminal receives a modulated signal transmitted from the base station, and request information requested by the user or terminal.

Also, information generation section 604 has data 601, radio wave propagation environment information 602, and request information 603 that a user or communication terminal considers necessary, such as transmission speed, modulation method, and received data quality, as input, and determines and requests a communication method from radio wave propagation environment information 1401 and 1402 and request information 603. At this time, information on the requested communication method is included in transmit digital signal 605. Here, "communication method" is information as to whether communication is performed by means of a multiplex signal and frequency f1 or whether communication is performed by means of a non-multiplexed signal and frequency f2.

Using this communication method information, the base station apparatus decides whether to perform communication with a multiplex signal and frequency f1 or whether to transmit a signal using a non-multiplexed signal and frequency f2.

For example, in the base station in FIG. 8, method determination section 707 extracts radio wave propagation environment information and request information contained in a signal transmitted by the terminal A transmitting apparatus (FIG. 15), or extracts requested communication method information. Then, based on this communication method information, method determination section 707 selects the frequency f1 method whereby signals of a plurality of channels are transmitted from a plurality of antennas, or the frequency f2 method whereby signals of a plurality of channels are not multiplexed and a signal of one channel is transmitted, and outputs this as control signal 708.

Frame configuration signal generation section 221 in the base station transmitting apparatus in FIG. 12 performs frame configuration with control signal 708 in FIG. 8 from the receiving apparatus for a terminal (for example, terminal A, terminal B, terminal C, or terminal D in FIG. 5) as input control signal 223, and outputs frame configuration signal 222. By this means, modulated signals conforming to the frame configurations in FIG. 9 and FIG. 10 can be transmitted by the base station transmitting apparatus.

A description will now be given of the means of setting the communication method at the start of communication.

Considering reception quality with respect to the radio wave propagation environment, the quality of channel C information symbols is good in comparison with channel A information symbols and channel B information symbols.

Therefore, when a terminal and base station start communicating, the base station maintains data quality by transmitting information to the terminal in channel C information symbols, thereby providing system stability.

Alternatively, when a terminal and base station start communicating, the base station first transmits estimation symbols 103 as shown in the frame configuration in FIG. 9 and FIG. 10 to the terminal. The terminal then receives the initially transmitted estimation symbols 103, estimates the radio wave propagation environment, and transmits radio wave propagation environment estimation information and request information. Then, based on the radio wave propagation environment information and request information from the terminal, the base station selects either transmission of information by means of channel C information symbols or transmission of information by means of channel A information symbols and channel B information symbols, and starts communication. By this means, data quality can be maintained and therefore system stability is achieved.

Alternatively, when a terminal and base station start communicating, the base station first transmits estimation symbols 103 as shown in FIG. 9 and FIG. 10 to the terminal, the terminal receives the initially transmitted estimation symbols 103, estimates the radio wave propagation environment, takes radio wave propagation environment estimation information and request information into consideration, selects either transmission of information by means of channel C information symbols or transmission of information by means of channel A information symbols and channel B information symbols, and makes a request to the base station. Based on the request from the terminal, the base station selects either transmission of information by means of channel C information symbols or transmission of information by means of channel A information symbols and channel B information symbols, and starts communication. By this means, data quality can be maintained and therefore system stability is achieved.

Thus, according to a transmitting apparatus and receiving apparatus of this embodiment, when a base station performs communication with a plurality of terminals, by assigning a non-multiplexed frequency in base station transmit frames in communication with a terminal whose reception status is poor, and assigning a multiplexed frequency in communication with a terminal whose reception quality is good, it is possible for a terminal to achieve compatibility between data transmission speed and received data quality.

In FIG. 9, the use of multiplex frames on two channels is illustrated, but the present invention is not limited to this. Also, in FIG. 11, an example with two frequency bands is illustrated, but the present invention is not limited to this. For example, it is possible for there to be three frequency bands, and for frequencies to be assigned for 3-channel multiplex transmission, 2-channel multiplex transmission, and single-channel transmission. A description has been given above that refers to a configuration with two antennas transmitting two channels and one antenna transmitting one channel in the transmitting apparatus in FIG. 12, but the present invention is not limited to this, and two or more antennas may be provided for transmitting two channels. Also, in the case where there are three frequency bands, and frequencies are assigned for 3-channel multiplex transmission, 2-channel multiplex transmission, and single-channel transmission, it is also possible to provide a plurality of antennas for 3-channel multiplex transmission, to provide a plurality of antennas for 2-channel multiplex transmission, and to provide a plurality of antennas for single-channel transmission. The same applies to the receiving apparatus in FIG. 14. Furthermore, an example has been described in which OFDM is used as the communication method, but it is possible to implement the present invention similarly with either a multicarrier method or a single-carrier method. Moreover, a spread spectrum communication method may be used as the method for each carrier in a multicarrier system. Thus, it is possible to implement the present invention similarly with OFDM-CDM (Orthogonal Frequency Division Multiplexing-Code Division Multiplexing).

Furthermore, there are also cases where one antenna is composed of a plurality of antennas.

Embodiment 5

In Embodiment 5 of the present invention, a description is given of a transmitting apparatus that transmits a non-multiplexed time modulated signal and a multiplexed time modulated signal in transmit frames, and a receiving apparatus that can demodulate a modulated signal of either time.

Figure 16:
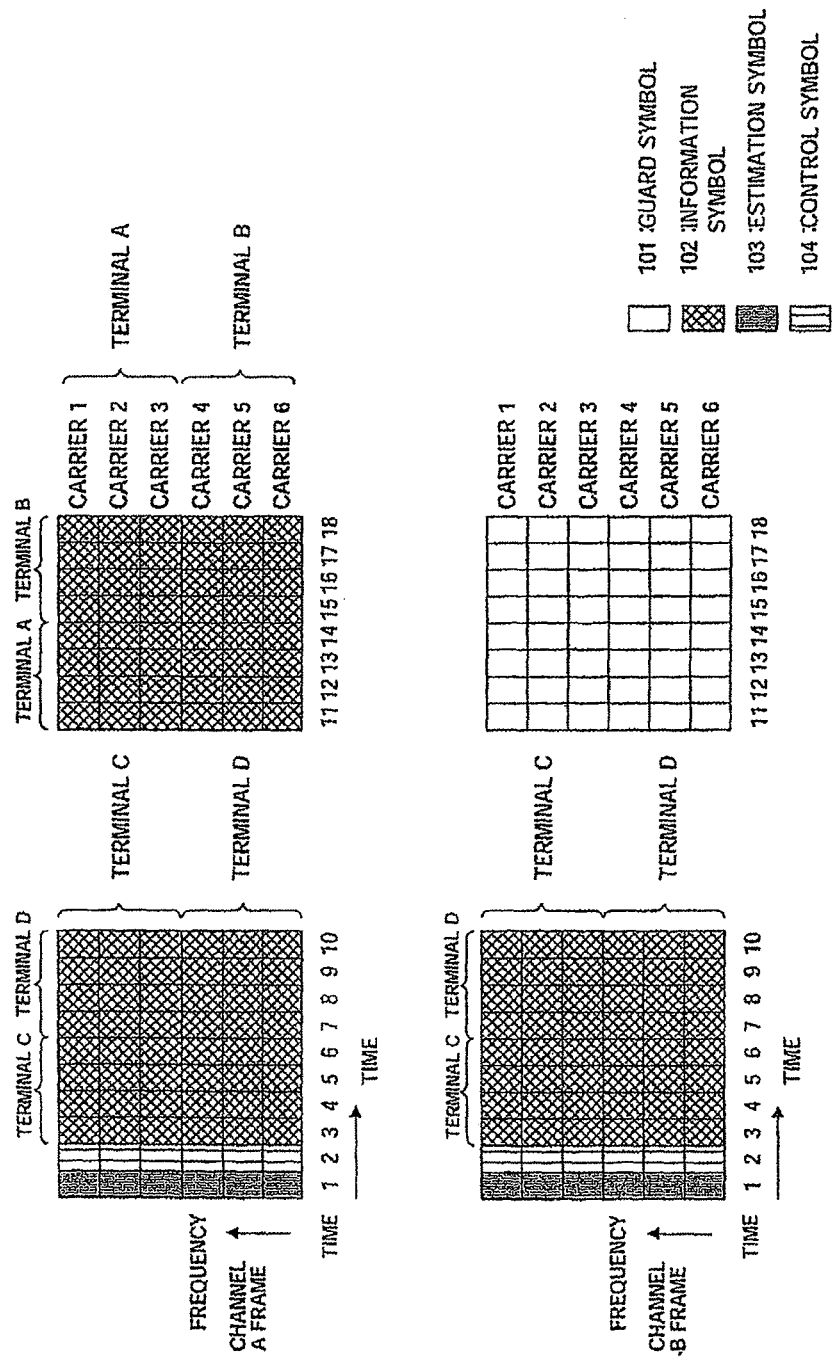
FIG. 16 is a drawing showing an example of the frame configuration on the frequency-time axes of channel A and channel B according to this embodiment.

FIG. 16 is a drawing showing an example of the frame configuration on the frequency-time axes of channel A and channel B according to this embodiment. In FIG. 16, the vertical axis indicates frequency and the horizontal axis indicates time. Reference numeral 101 indicates a guard symbol, reference numeral 102 indicates an information symbol, reference numeral 103 indicates an estimation symbol, and reference numeral 104 indicates a control symbol. Here, guard symbols 101 are symbols for which there is no modulated signal, estimation symbols 103 are pilot symbols for estimating time synchronization, frequency synchronization, and distortion due to the channel fluctuation, and control symbols 104 are symbols that transmit information used by a terminal for control, and are symbols for transmitting information by means of information symbols 102.

In time 3 through time 10, channel A information symbols and channel B information symbols are transmitted, and in time 11 through time 18, only channel A information symbols are transmitted.

The operation of this transmitting apparatus will now be described.

Serial/parallel conversion section 202 takes channel A transmit digital signal 201 and configures a frame in which information symbols, control symbols, and estimation symbols are present, as in the channel A frame configuration in FIG. 16, in accordance with frame configuration signal 222.

Serial/parallel conversion section 212 takes channel B transmit digital signal 211 and outputs channel B parallel signal 213 with time 1 estimation symbols 102 and time 3 through 10 information symbols 102 according to the channel B frame configuration in FIG. 16, in accordance with frame configuration signal 222.

Estimation symbols 103 are inserted for time synchronization and frequency offset estimation. They are also used for signal separation in frames in which channel A and channel B symbols are multiplexed.

When time 11 through 18 channel A information symbols and time 3 through 10 channel A and channel B information symbols are compared, in the receiving apparatus time 11 through 18 channel A information symbols are of better quality than time 3 through 10 channel A and channel B information symbols. Considering this fact, it is appropriate for information of high importance to be transmitted in time 11 through 18 channel A information symbols.

It is possible to transmit one kind of information medium in time 11 through 18 channel A information symbols, and transmit one kind of information medium in time 3 through 10 channel A and channel B information symbols, such as transmitting video information, for example, using time 11 through 18 channel A information symbols, and transmitting Hi-Vision video using time 3 through 10 channel A and channel B information symbols. Also, the same kind of information medium may by transmitted in time 11 through 18 channel A information symbol transmission and time 3 through 10 channel A and channel B information symbol transmission. At this time, the compression ratio when coding, for example, will be different for the same kind of information.

It is also possible to transmit information in a hierarchical fashion, with a certain kind of information transmitted by means of time 11 through 18 channel A information symbols, and difference information transmitted using time 3 through 10 channel A and channel B information symbols.

Figure 17:
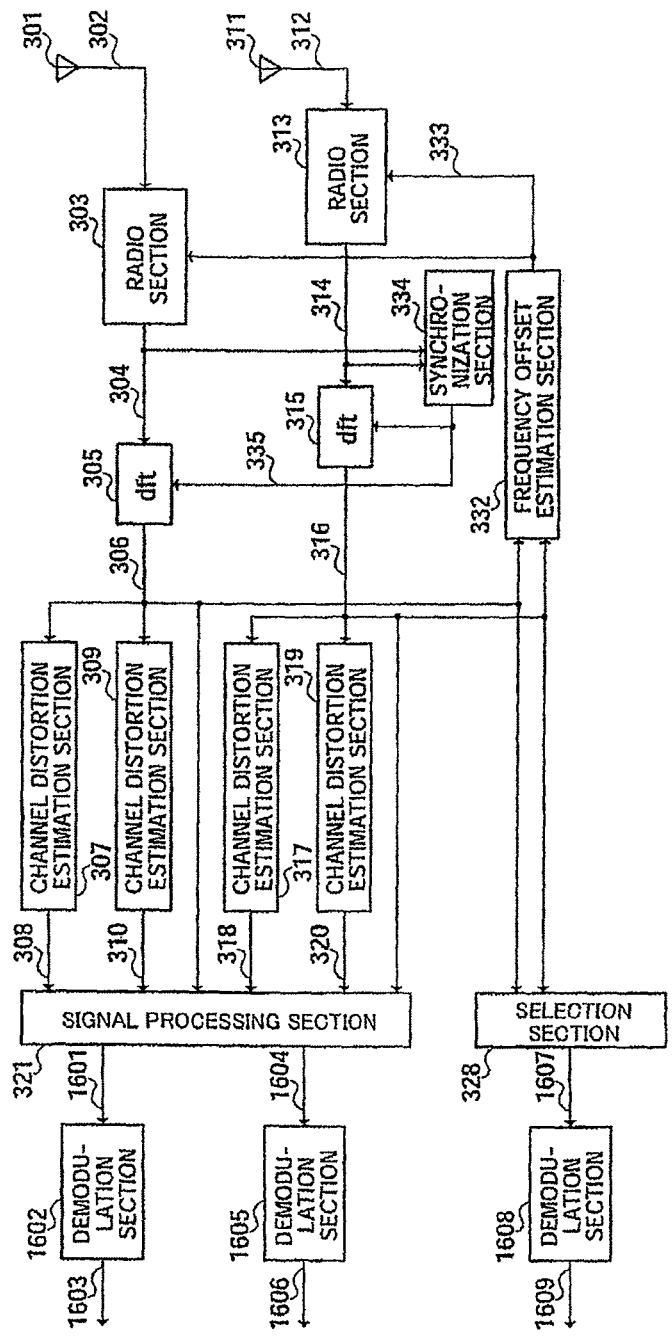
FIG. 17 is a drawing showing an example of the configuration of a receiving apparatus according to Embodiment 5 of the present invention.

A transmitting apparatus of this embodiment generates and transmits signals with the frame configurations shown in FIG. 16 using the configuration in FIG. 3. FIG. 17 is a drawing showing an example of the configuration of a receiving apparatus according to Embodiment 5 of the present invention. Parts in FIG. 17 identical to those in FIG. 4 are assigned the same reference numerals as in FIG. 4, and detailed descriptions thereof are omitted.

Signal processing section 321 separates parallel signals 306 and 316 into multiplexed time channel A parallel signal 1601 and channel B parallel signal 1604 based on channel A channel distortion parallel signals 308 and 318, and channel B channel distortion parallel signals 310 and 320, outputs parallel signal 1601 to a demodulation section 1602, and outputs parallel signal 1604 to a demodulation section 1605.

Demodulation section 1602 demodulates separated channel A parallel signal 1601, and outputs a channel A received digital signal 1603.

Demodulation section 1605 demodulates separated channel B parallel signal 1604, and outputs a channel B received digital signal 1606.

Of parallel signals 306 and 316, selection section 328 selects the parallel signal with the greater field strength, for example, of the times of a channel A signal only in FIG. 2, and outputs a selected parallel signal 1607 to a demodulation section 1608.

Demodulation section 1608 demodulates selected parallel signal 1607, and outputs a channel A received digital signal 1609.

The operation of a transmitting apparatus and receiving apparatus according to this embodiment will now be described in detail using FIG. 3, FIG. 16, and FIG. 17.

The operation of the receiving apparatus is described below.

The receiving apparatus is able to establish time synchronization with the transmitting apparatus by having synchronization section 334 detect FIG. 16 estimation symbols 103 in received quadrature baseband signal 304 and received signal 314.

Frequency offset estimation section 332 can estimate the frequency offset from FIG. 2 estimation symbols 103 in parallel signal 306 and 316.

Signal processing section 321 separates time 3 through 10 channel A and channel B information symbol multiplexed signals in FIG. 16 into a time 3 through 10 channel A signal and a time 3 through 10 channel B signal, and outputs the resulting signals as channel A parallel signal 1601 and channel B parallel signal 1604 respectively.

Channel A demodulation section 1602 has channel A parallel signal 1601 as input, and outputs channel A received digital signal 1603. Channel B demodulation section 1605 has channel B parallel signal 1604 as input, and outputs channel B received digital signal 1606.

Channel A demodulation section 1608 has selected parallel signal 1607 as input, estimates channel distortion from FIG. 16 estimation symbols 103, demodulates the time 11 through 18 channel A parallel signal from the estimated channel distortion, and outputs received digital signal 1609.

At this time, received digital signals 1603 and 1606 obtained from channel A and channel B are of poor quality in comparison with channel A received digital signal 1609, but can be transmitted at high speed. Considering this fact, channel A received digital signal 1609 is suitable for transmission of important information and transmission of control information. Received digital signals 1603 and 1606 obtained from channel A and channel B are input to a decoder X (not shown), and decoded. Then channel A received digital signal 1609 is input to a decoder Y (not shown), and decoded. By this means, different information X and Y can be obtained from different decoders X and Y, and although the information is the same in decoders X and Y, it is possible to transmit information with different compression ratios.

It is possible to perform hierarchical transmission in which video is transmitted by means of channel A received digital signal 1609 and difference information for Hi-Vision video is transmitted by received digital signals 1603 and 1606 obtained from channel A and channel B.

Thus, according to a transmitting apparatus and receiving apparatus of this embodiment, by having frames whereby a plurality of modulated signals are transmitted from a plurality of antennas and frames whereby a modulated signal is transmitted from one antenna, and transmitting important information in a modulated signal transmitted from one antenna, it is possible to secure data quality in a receiving apparatus.

Also, according to a transmitting apparatus and receiving apparatus of this embodiment, by transmitting different information in frames whereby a plurality of modulated signals are transmitted from a plurality of antennas and frames whereby a modulated signal is transmitted from one antenna, it is possible to transmit information of different quality and transmission speed.

In FIG. 3, FIG. 16, and FIG. 17, the use of multiplex frames and non-multiplexed frames with two channels and two antennas has been illustrated as an example, but the present invention is not limited to this. For example, it is possible to implement the present invention similarly with multiplex frames using three channels and three antennas, multiplex frames using two channels and two of three antennas, and frames that cause the existence of non-multiplexed frames.

Also, the frame configurations are not limited to those in FIG. 2. Furthermore, an example has been described in which OFDM is used as the communication method, but it is possible to implement the present invention similarly with either a multicarrier method or a single-carrier method. Moreover, a spread spectrum communication method may be used as the method for each carrier in a multicarrier system. Thus, it is possible to implement the present invention similarly with OFDM-CDM (Orthogonal Frequency Division Multiplexing-Code Division Multiplexing).

Furthermore, there are also cases where one antenna is composed of a plurality of antennas.

Embodiment 6

In Embodiment 6 of the present invention, a description is given of a communication method, transmitting apparatus, and receiving apparatus whereby, when a base station performs communication with a plurality of terminals, non-multiplexed frames and multiplexed frames are provided in base station transmit frames, and a modulated signal is transmitted to a terminal using one or other of these types of frame.

Figure 18:
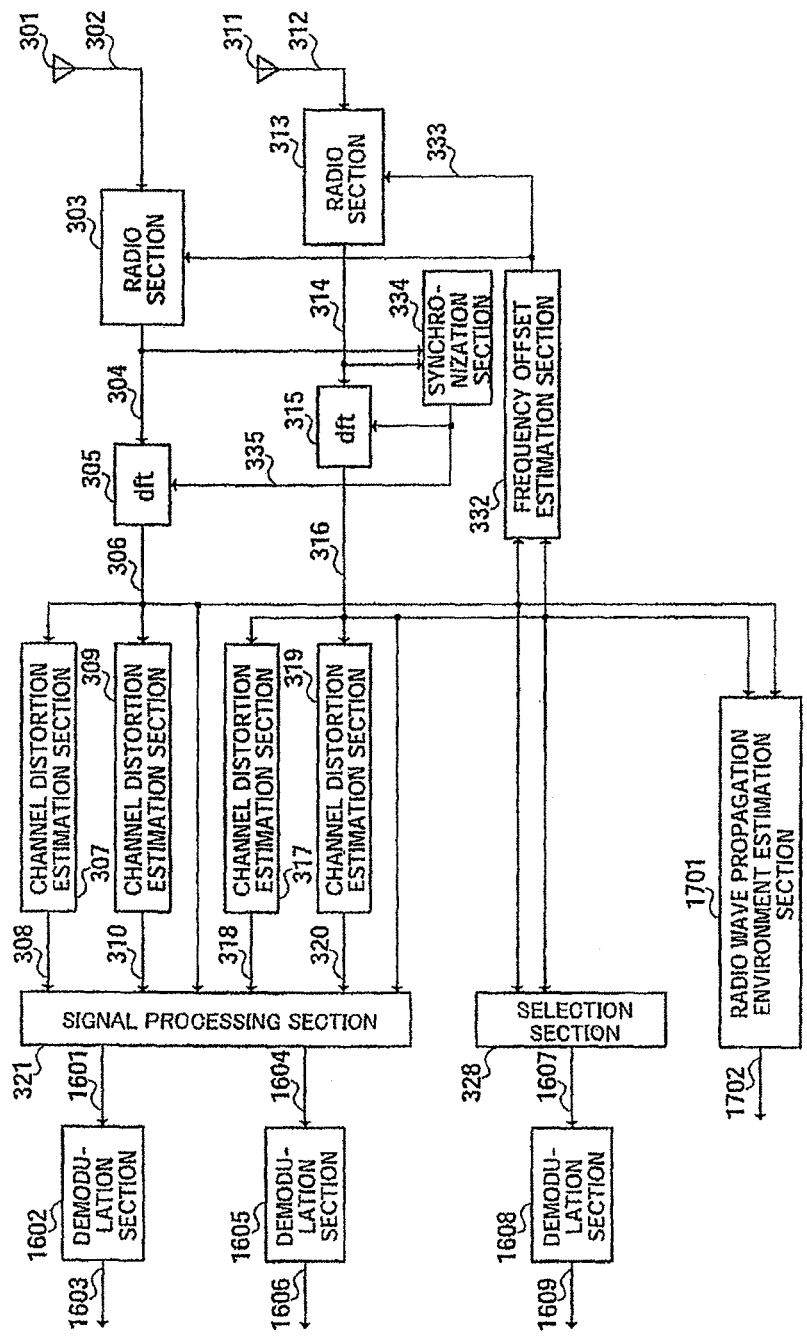
FIG. 18 is a block diagram showing an example of the configuration of a receiving apparatus of a terminal according to Embodiment 6 of the present invention.

FIG. 18 is a block diagram showing an example of the configuration of a receiving apparatus of a terminal according to Embodiment 6 of the present invention. Parts in FIG. 18 identical to those in FIG. 4 or FIG. 17 are assigned the same reference numerals as in FIG. 4 or FIG. 17, and detailed descriptions thereof are omitted.

A radio wave propagation environment estimation section 1701 estimates the field strength, multipath environment, Doppler frequency, direction of arrival, channel fluctuation, interference intensity, polarized wave state, and delay profile of received signals received by antenna 301 and antenna 311 from parallel signals 306 and 316, and outputs this information as radio wave propagation environment information 1702.

Radio wave propagation environment information 1702 estimated by radio wave propagation environment estimation section 1701 of the receiving apparatus in FIG. 18 corresponds to radio wave propagation environment information 602 in FIG. 6, and is input to information generation section 604.

Information generation section 604 generates transmit digital signal 605 from data 601, radio wave propagation environment information 602, and request information 603 that a user or communication terminal considers necessary, such as transmission speed, modulation method, and received data quality, for example. By this means, a terminal transmits a signal containing the radio wave propagation environment when the terminal receives a modulated signal transmitted from the base station, and request information requested by the user or terminal.

Also, information generation section 604 has data 601, radio wave propagation environment information 602, and request information 603 that a user or communication terminal considers necessary, such as transmission speed, modulation method, and received data quality, as input, determines and requests a communication method from radio wave propagation environment information 602 and request information 603, and outputs transmit digital signal 605. At this time, information on the requested communication method is included in transmit digital signal 605. Here, "communication method" is information as to whether communication is performed by means of a multiplex signal or whether communication is performed by means of a non-multiplexed signal.

A description will now be given of the means of setting the communication method at the start of communication.

In FIG. 16, considering reception quality with respect to the radio wave propagation environment, the quality of time 11 through 18 channel A information symbols is good in comparison with time 3 through 10 channel A information symbols and channel B information symbols.

Therefore, when a terminal and base station start communicating, the base station maintains data quality by transmitting information to the terminal in time 11 through 18 channel A information symbols, thereby providing system stability.

Alternatively, when a terminal and base station start communicating, the base station first transmits estimation symbols 103 as shown in FIG. 16 to the terminal, the terminal receives the initially transmitted estimation symbols 103, estimates the radio wave propagation environment, and transmits radio wave propagation environment estimation information and request information. Then, based on the radio wave propagation environment information and request information from the terminal, the base station selects either transmission of information by means of time 11 through 18 channel A information symbols or transmission of information by means of time 3 through 10 channel A information symbols and channel B information symbols, and starts communication. By this means, data quality can be maintained and therefore system stability is achieved.

Alternatively, when a terminal and base station start communicating, the base station first transmits estimation symbols 103 as shown in FIG. 9 and FIG. 10 to the terminal, the terminal receives the initially transmitted estimation symbols 103, estimates the radio wave propagation environment, takes radio wave propagation environment estimation information and request information into consideration, selects either transmission of information by means of time 11 through 18 channel A information symbols or transmission of information by means of time 3 through 10 channel A information symbols and channel B information symbols, and makes a request to the base station.

Based on the request from the terminal, the base station selects either transmission of information by means of time 11 through 18 channel A information symbols or transmission of information by means of time 3 through 10 channel A information symbols and channel B information symbols, and starts communication. By this means, data quality can be maintained and therefore system stability is achieved.

Thus, according to a transmitting apparatus and receiving apparatus of this embodiment, when a base station performs communication with a plurality of terminals, by assigning a non-multiplexed frame in base station transmit frames in communication with a terminal whose reception status is poor, and assigning a multiplexed frame in communication with a terminal whose reception quality is good, it is possible for a terminal to achieve compatibility between data transmission speed and received data quality.

In FIG. 3, FIG. 16, and FIG. 18, the use of multiplex frames and non-multiplexed frames with two channels and two antennas has been illustrated as an example, but the present invention is not limited to this. For example, it is possible to implement the present invention similarly with multiplex frames using three channels and three antennas, multiplex frames using two channels and two of three antennas, and frames that cause the existence of non-multiplexed frames. Also, the frame configurations are not limited to those in FIG. 2. Furthermore, an example has been described in which OFDM is used as the communication method, but it is possible to implement the present invention similarly with a multicarrier method with regard to time-unit and frequency-unit assignment, or a single-carrier method with regard to time-unit assignment. Moreover, a spread spectrum communication method may be used as the method for each carrier in a multicarrier system. Thus, it is possible to implement the present invention similarly with OFDM-CDM.

Furthermore, there are also cases where one antenna is composed of a plurality of antennas.

Embodiment 7

In Embodiment 7 of the present invention, a description is given of coding and pilot symbol configuration methods in a communication method whereby modulated signals of a plurality of channels are transmitted from a plurality of antennas at the same frequency, and an associated transmitting apparatus and receiving apparatus.

Figure 19:
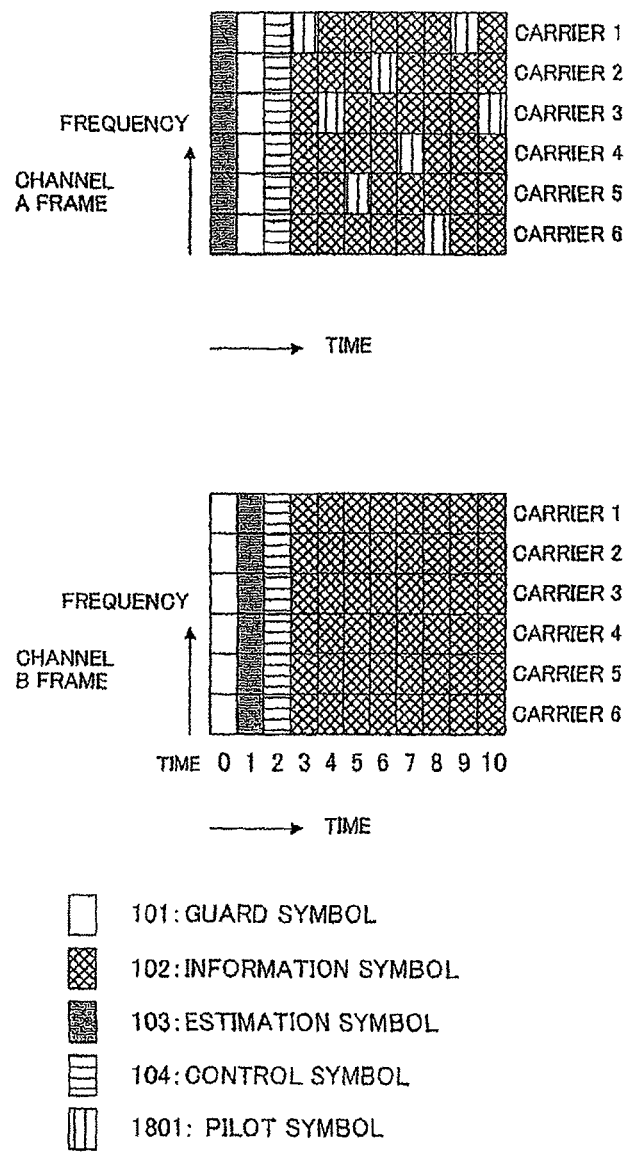
FIG. 19 is a block diagram showing an example of the transmit signal frame configuration transmitted by a base station according to Embodiment 7 of the present invention.

FIG. 19 is a block diagram showing an example of the transmit signal frame configuration transmitted by a base station according to Embodiment 7 of the present invention. In FIG. 19, the vertical axis indicates frequency and the horizontal axis indicates time.

In this case, pilot symbols 1801 are inserted in a regular manner in a channel A signal by being placed at predetermined positions in a frame. A receiving apparatus separates a channel A signal and a channel B signal by means of these pilot symbols 1801, and can then demodulate channel A information symbols 102 by estimating channel A frequency offset and channel distortion.

At this time, pilot symbols are not inserted in a channel B signal. Performing coding on channel A or making a channel A signal a pilot at this time makes it possible for the receiving apparatus to demodulate channel B information symbols 102.

Figure 20:
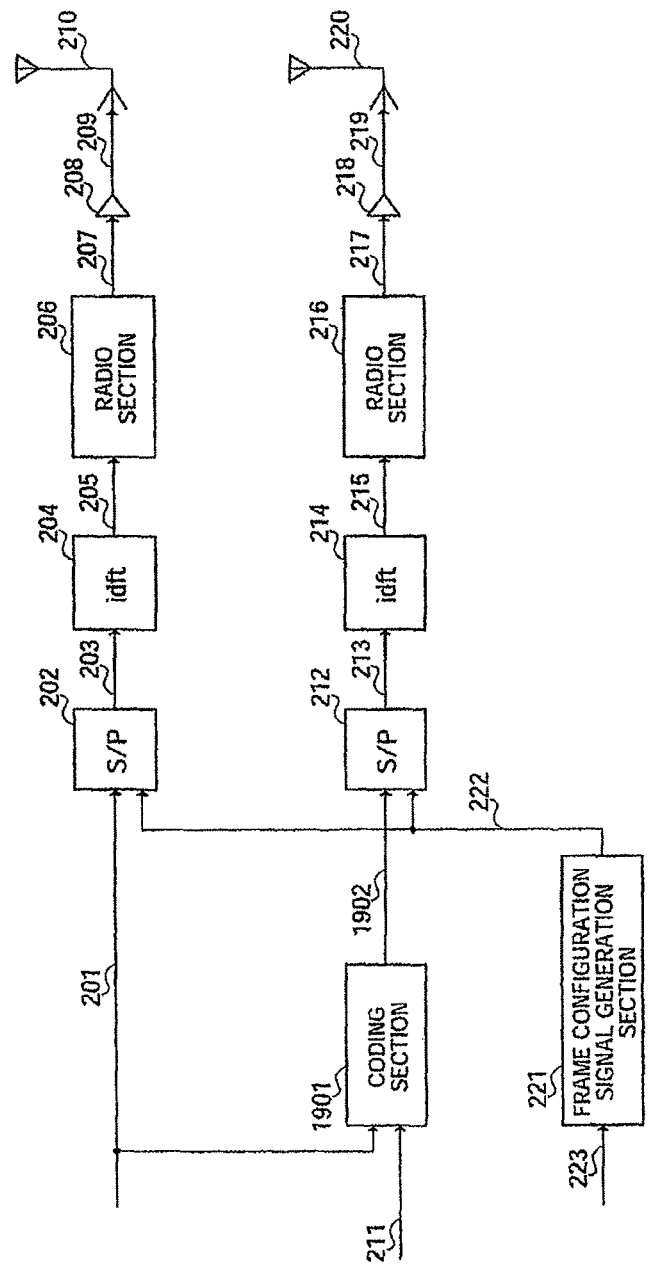
FIG. 20 is a block diagram showing an example of the configuration of a transmitting apparatus according to Embodiment 7 of the present invention.

FIG. 20 is a block diagram showing an example of the configuration of a transmitting apparatus according to Embodiment 7 of the present invention. Parts in FIG. 20 identical to those in FIG. 3 are assigned the same reference numerals as in FIG. 3, and detailed descriptions thereof are omitted.

A coding section 1901 codes channel B transmit digital signal 211 on the basis of channel A transmit digital signal 201, and outputs a post-coding transmit digital signal 1902 to serial/parallel conversion section 212.

Then serial/parallel conversion section 212 converts post-coding transmit digital signal 1902 to parallel data arranged in accordance with frame configuration signal 222, and outputs post-conversion parallel signal 213 to inverse discrete Fourier transform section 204. Specifically, serial/parallel conversion section 212 configures a frame with the configuration shown in FIG. 19.

Figure 21:
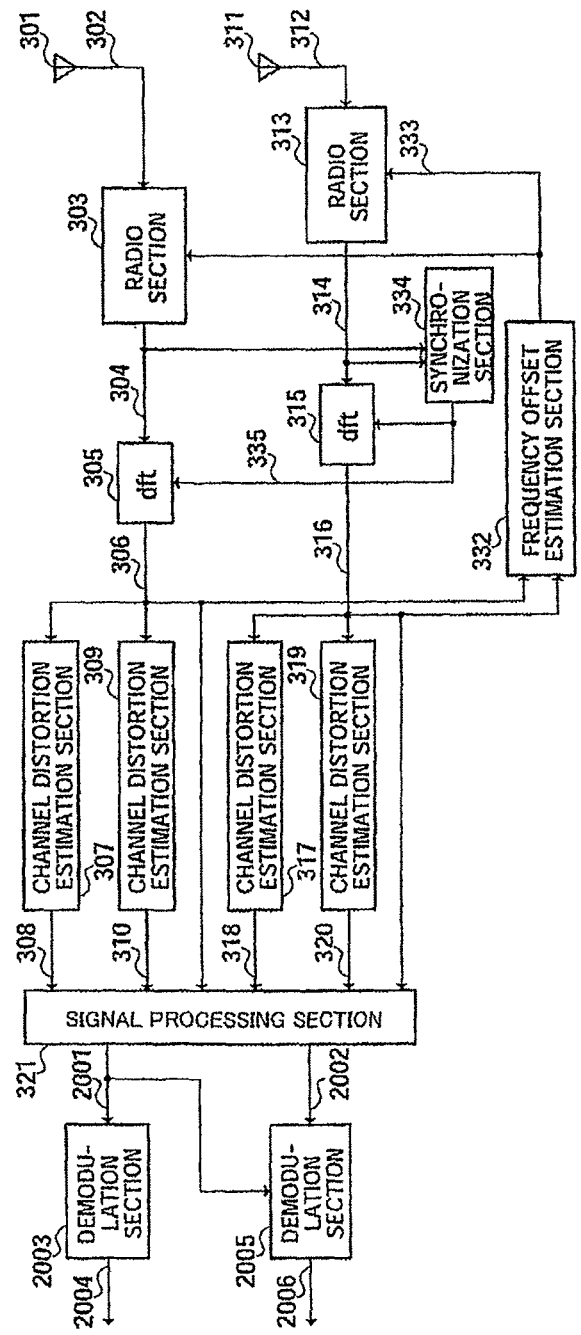
FIG. 21 is a block diagram showing an example of the configuration of a receiving apparatus according to Embodiment 7 of the present invention.

The configuration of a receiving apparatus will now be described. FIG. 21 is a block diagram showing an example of the configuration of a receiving apparatus according to Embodiment 7 of the present invention. Parts in FIG. 21 identical to those in FIG. 4 are assigned the same reference numerals as in FIG. 4, and detailed descriptions thereof are omitted.

A demodulation section 2003 demodulates separated channel A parallel signal 2001, and outputs a channel A received digital signal 2004.

A demodulation section 2005 demodulates separated channel B parallel signal 2002 using channel A parallel signal 2001, and outputs a channel B received digital signal 2006.

The operations whereby a channel B signal is decoded and demodulated based on a channel A signal using the above transmitting apparatus and receiving apparatus will now be described.

FIGS. 22A through 22H are drawings showing examples of the signal point arrangement in the I-Q plane when a channel B signal undergoes differential encoding with respect to a channel A signal. In FIGS. 22A through 22H, channel A and channel B signals are subjected to QPSK (Quadrature Phase Shift Keying) modulation.

The signal point when information '00' is transmitted in channel A carrier 1 time 4 is positioned as shown in FIG. 22A. At this time, differential encoding is performed for channel B carrier 1 time 4 with respect to channel A carrier 1 time 4, and therefore when information '00', 01', '11', and '10' is transmitted, the signal points are positioned as shown in FIG. 22B. That is to say, the position of a symbol received in channel A is made the reference position when a channel B symbol is demodulated (in other words, the channel B information '00' symbol position).

Similarly, the signal point when information '01' is transmitted in channel A carrier 1 time 4 is positioned as shown in FIG. 22C. At this time, differential encoding is performed for channel B carrier 1 time 4 with respect to channel A carrier 1 time 4, and therefore when information '00', '01', '11', and '10' is transmitted, the signal points are positioned as shown in FIG. 22D.

Similarly, the signal point when information '11' is transmitted in channel A carrier 1 time 4 is positioned as shown in FIG. 22E. At this time, differential encoding is performed for channel B carrier 1 time 4 with respect to channel A carrier 1 time 4, and therefore when information '00', '01', '11', and '10' is transmitted, the signal points are positioned as shown in FIG. 22F.

Similarly, the signal point when information '10 is transmitted in channel A carrier 1 time 4 is positioned as shown in FIG. 22O. At this time, differential encoding is performed for channel B carrier 1 time 4 with respect to channel A carrier 1 time 4, and therefore when information '00', '01', '11', and '10' is transmitted, the signal points are positioned as shown in FIG. 22H.

Next, an example of the coding operation with BPSK modulation will be described. FIGS. 23A through 23D are drawings showing examples of the signal point arrangement in the I-Q plane when a channel B signal undergoes differential encoding with respect to a channel A signal. In FIGS. 23A through 23D, channel A and channel B signals are subjected to BPSK modulation.

Figure 23A:
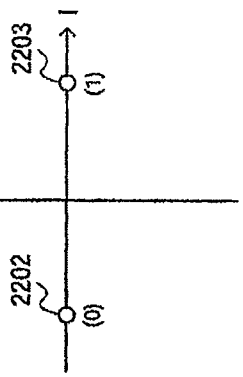
FIG. 23A is a drawing showing an example of the signal point arrangement in the I-Q plane when a channel B signal undergoes differential encoding with respect to a channel A signal.
Figure 23B:
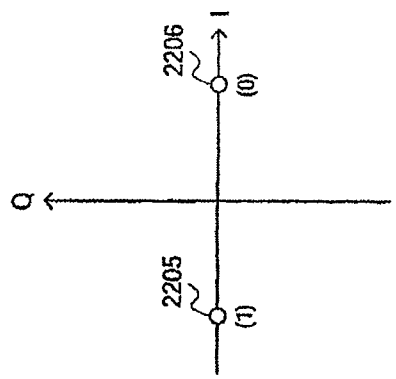
FIG. 23B is a drawing showing an example of the signal point arrangement in the I-Q plane when a channel B signal undergoes differential encoding with respect to a channel A signal.

The signal point when information '1' is transmitted in channel A carrier 1 time 4 is positioned at 2201 as shown in FIG. 23A. At this time, differential encoding is performed for channel B carrier 1 time 4 with respect to channel A carrier 1 time 4, and therefore when information '0' is transmitted, the signal point is positioned at 2202 as shown in FIG. 23B, and when information '1' is transmitted, the signal point is positioned at 2203. That is to say, the position of a symbol received in channel A is made the reference position when a channel B symbol is demodulated (in other words, the channel B information '1' symbol position).

Figure 23C:
FIG. 23C is a drawing showing an example of the signal point arrangement in the I-Q plane when a channel B signal undergoes differential encoding with respect to a channel A signal.
Figure 23D:
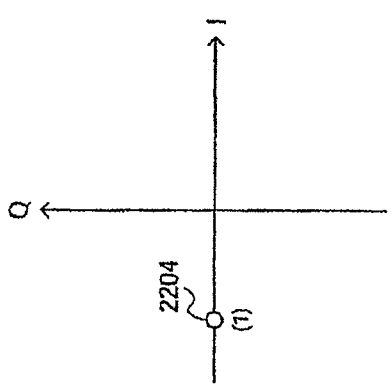
FIG. 23D is a drawing showing an example of the signal point arrangement in the I-Q plane when a channel B signal undergoes differential encoding with respect to a channel A signal.

In contrast to this, the signal point when information '0' is transmitted in channel A carrier 1 time 4 is positioned at 2204 as shown in FIG. 23C. At this time, differential encoding is performed for channel B carrier 1 time 4 with respect to channel A carrier 1 time 4, and therefore when information '0' is transmitted, the signal point is positioned at 2206 as shown in FIG. 23D, and when information '1' is transmitted, the signal point is positioned at 2205.

An example will now be described in which a channel A signal constituting the coding reference is a BPSK signal, and a channel B signal coded based on channel A is a QPSK signal. FIGS. 24A through 24D are drawings showing examples in which channel B M-ary modulation (here, QPSK modulation) 1-Q plane signal point arrangement is performed based on channel A PSK modulation (here, BPSK (Binary Phase Shift Keying) modulation). The channel A and channel B modulation methods are assumed to be different at this time. Another feature is that the channel A modulation method is PSK modulation.

The signal point when information '0' is transmitted in channel A carrier 1 time 4 is positioned as shown in FIG. 24A. At this time, for channel B carrier 1 time 4, the signal point arrangement for information '00', '01', '11', and '10' is determined with respect to the channel A carrier 1 time 4 signal point position. The signal point arrangement at this time is as shown in FIG. 24B. That is to say, a point whose phase is advanced by 45 degrees from the position of a symbol received in channel A is made the reference position when a channel B symbol is demodulated (in other words, the channel B information '00' symbol position).

Similarly, the signal point when information '1' is transmitted in channel A carrier 1 time 4 is positioned as shown in FIG. 24C. At this time, for channel B carrier 1 time 4, the signal point arrangement for information '00', '01', '11', and '10' is determined with respect to the channel A carrier 1 time 4 signal point position. The signal point arrangement at this time is as shown in FIG. 24D.

An example will now be described in which a channel A signal constituting the coding reference is a BPSK signal, and a channel B signal coded based on channel A is a 16QAM signal. FIGS. 25A through 25D are drawings showing examples in which channel B M-ary modulation (here, 16QAM (16 Quadrature Amplitude Modulation)) I-Q plane signal point arrangement is performed based on channel A PSK modulation (here, BPSK modulation). In FIGS. 25A through 25D, the channel A and channel B modulation methods are assumed to be different. Another feature is that the channel A modulation method is PSK modulation.

Figures 25A, 25B, 25C, 25D:
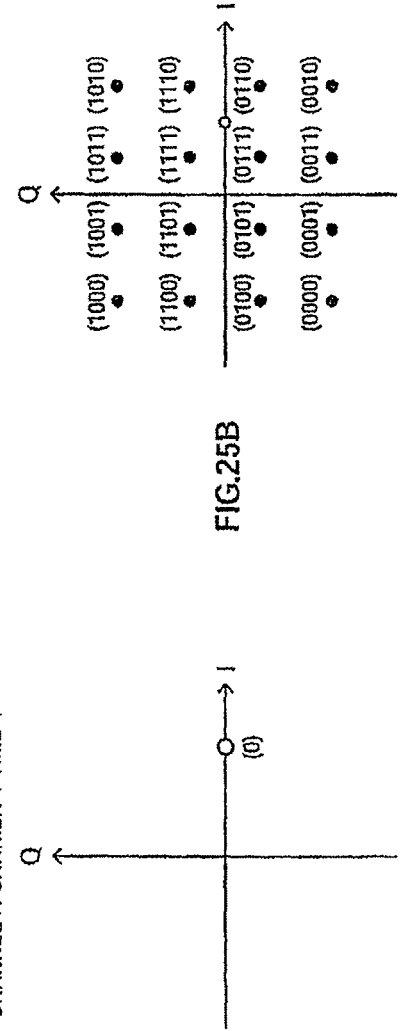
FIG. 25A is a drawing showing an example in which channel B M-ary modulation I-Q plane signal point arrangement is performed based on channel A PSK modulation.
FIG. 25B is a drawing showing an example in which channel B M-ary modulation I-Q plane signal point arrangement is performed based on channel A PSK modulation.
FIG. 25C is a drawing showing an example in which channel B M-ary modulation I-Q plane signal point arrangement is performed based on channel A PSK modulation.
FIG. 25D is a drawing showing an example in which channel B M-ary modulation I-Q plane signal point arrangement is performed based on channel A PSK modulation.

The signal point when information '0' is transmitted in channel A carrier 1 time 4 is positioned as shown in FIG. 25A. At this time, for channel B carrier 1 time 4, the signal point arrangement for 4-bit information '0000', . . . , '1111' is determined based on the position of the signal point received at channel A carrier 1 time 4. The signal point arrangement at this time is as shown in FIG. 25B.

Similarly, the signal point when information '1' is transmitted in channel A carrier 1 time 4 is positioned as shown in FIG. 25C. At this time, for channel B carrier 1 time 4, the signal point arrangement for 4-bit information '0000', . . . , '1111' is determined based on the position of the signal point received at channel A carrier 1 time 4. The signal point arrangement at this time is as shown in FIG. 25D.

FIGS. 26A through 26D are drawings showing examples in which channel B M-ary modulation (here, 16QAM) I-Q plane signal point arrangement is performed based on channel A PSK modulation (here, QPSK modulation). The channel A and channel B modulation methods are assumed to be different at this time. Another feature is that the channel A modulation method is PSK modulation.

Figure 26A:
FIG. 26A is a drawing showing an example in which channel B M-ary modulation I-Q plane signal point arrangement is performed based on channel A PSK modulation.

When information '00' is transmitted in channel A carrier 1 time 4, for channel B carrier 1 time 4 the signal point arrangement for 4-bit information '0000', . . . , '1111' is determined with respect to channel A carrier 1 time 4 signal point position 2501. The signal point arrangement at this time is as shown in FIG. 26A.

Figure 26B:
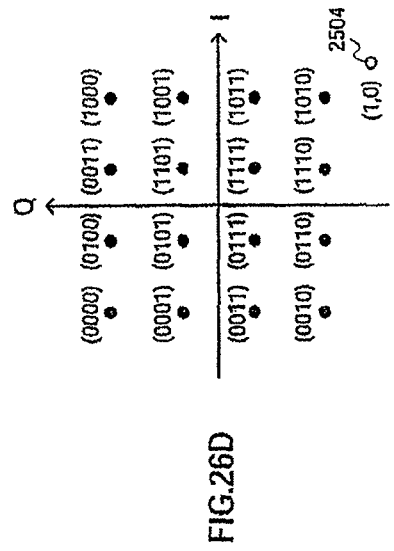
FIG. 26B is a drawing showing an example in which channel B M-ary modulation I-Q plane signal point arrangement is performed based on channel A PSK modulation.

When information '01' is transmitted in channel A carrier 1 time 4, for channel B carrier 1 time 4 the signal point arrangement for 4-bit information '0000', . . . , '1111' is determined with respect to channel A carrier 1 time 4 signal point position 2502. The signal point arrangement at this time is as shown in FIG. 26B.

Figure 26C:
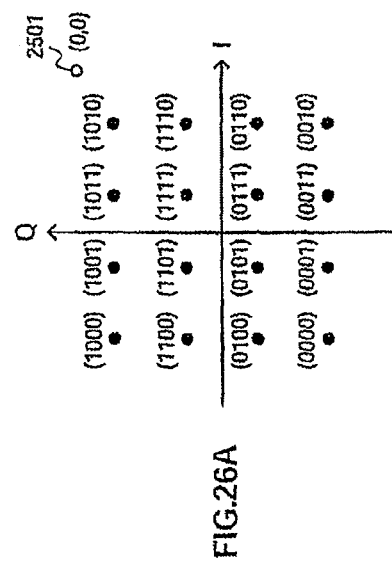
FIG. 26C is a drawing showing an example in which channel B M-ary modulation I-Q plane signal point arrangement is performed based on channel A PSK modulation.

When information '11' is transmitted in channel A carrier 1 time 4, for channel B carrier 1 time 4 the signal point arrangement for 4-bit information '0000', . . . , '1111' is determined with respect to channel A carrier 1 time 4 signal point position 2503. The signal point arrangement at this time is as shown in FIG. 26C.

Figure 26D:
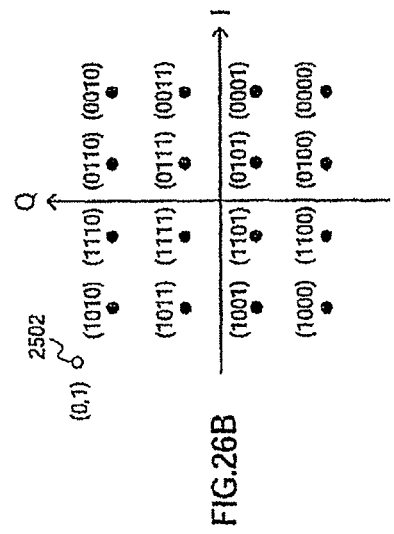
FIG. 26D is a drawing showing an example in which channel B M-ary modulation I-Q plane signal point arrangement is performed based on channel A PSK modulation.

When information '10' is transmitted in channel A carrier 1 time 4, for channel B carrier 1 time 4 the signal point arrangement for 4-bit information '0000', . . . , '1111' is determined with respect to channel A carrier 1 time 4 signal point position 2504. The signal point arrangement at this time is as shown in FIG. 26D.

Figure 27:
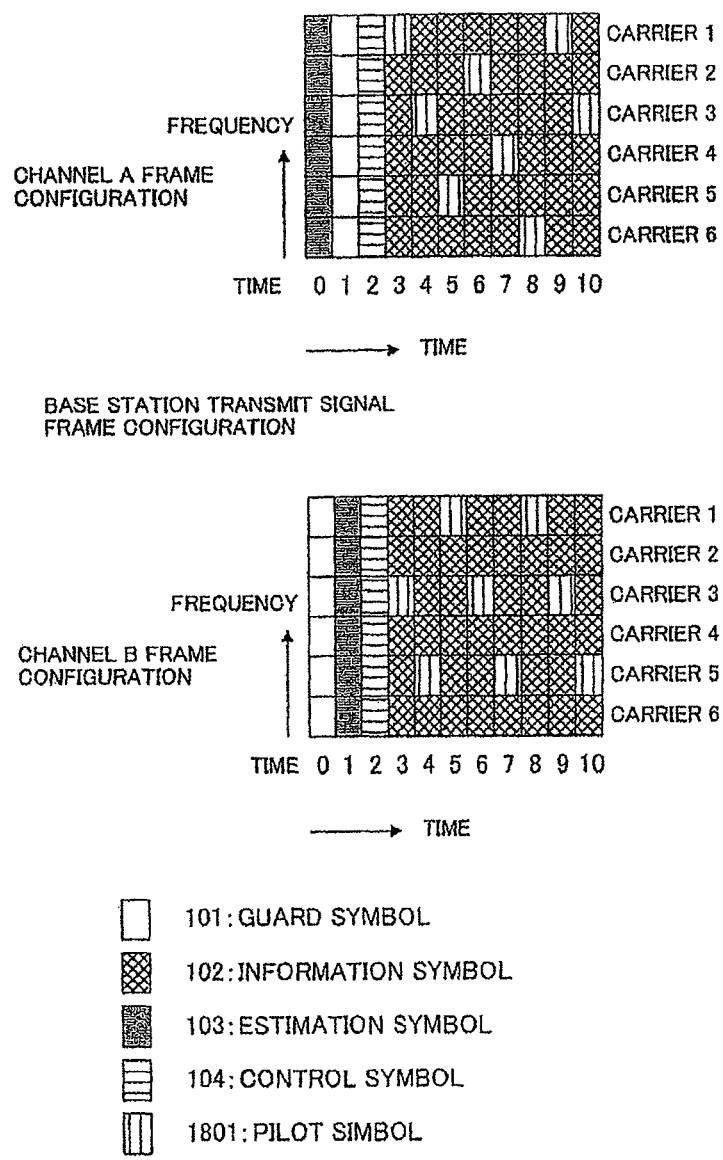
FIG. 27 is a drawing showing an example of base station transmit signal frame configurations of this embodiment.

FIG. 27 is a drawing showing an example of base station transmit signal frame configurations of this embodiment.

In FIG. 27, pilot symbols 1801 are inserted in a regular fashion in both channel A and channel B.

At this time, estimation symbols 103 are symbols used by the receiver to separate channel A and channel B, and channel A pilot symbols 1801 are symbols for estimating channel A signal channel distortion, frequency offset, and suchlike distortion components in the channel A demodulation section after channel A and channel B signal separation in the receiver.

Similarly, channel B pilot symbols 1801 are symbols for estimating channel B signal channel distortion, frequency offset, and suchlike distortion components in the channel B demodulation section after channel A and channel B signal separation in the receiver.

In FIG. 27, estimation symbols 103 for when channel A and channel B signal separation is performed are not multiplexed in channel A and channel B. Another feature is that aforementioned pilot symbols 1801 are multiplexed.

In the case in FIG. 27, both estimation symbols 103 and pilot symbols 1801 are, for example, known symbols (known pilots). However, their roles differ in the receiver. Estimation symbols 103 are used to perform signal processing that separates channel A and channel B multiplexed signals.

Then, when channel A information symbols are demodulated, channel A pilot symbols 1801 and channel B pilot symbols 1801 are used to estimate channel distortion, frequency offset, and phase and amplitude in the I-Q plane.

Similarly, when channel B information symbols are demodulated, channel A pilot symbols 1801 and channel B pilot symbols 1801 are used to estimate channel distortion, frequency offset, and phase and amplitude in the I-Q plane.

Then a modulated signal is generated according to FIG. 27 frame configuration information contained in frame configuration signal 222 output from frame configuration signal generation section 221 in FIG. 3.

Figure 28:
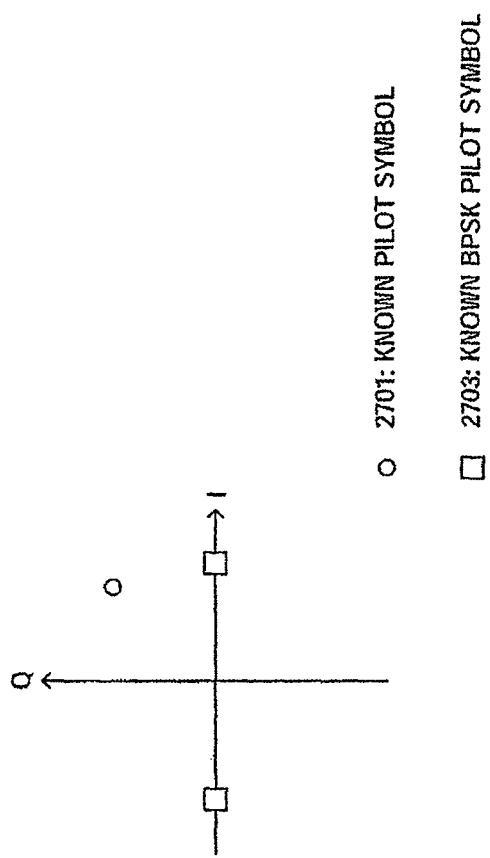
FIG. 28 is a drawing showing an example of pilot symbol signal point arrangement in the I-Q plane according to this embodiment.

Next, the arrangement of pilot symbols according to this embodiment will be described. FIG. 28 is a drawing showing an example of pilot symbol signal point arrangement in the I-Q plane according to this embodiment.

In FIG. 28, reference numeral 2701 indicates a known pilot symbol, and denotes signal point positioning at a specific location. Reference numeral 2702 indicates known BPSK pilot symbols, which are BPSK modulated and positioned in a regular fashion.

Figure 29:
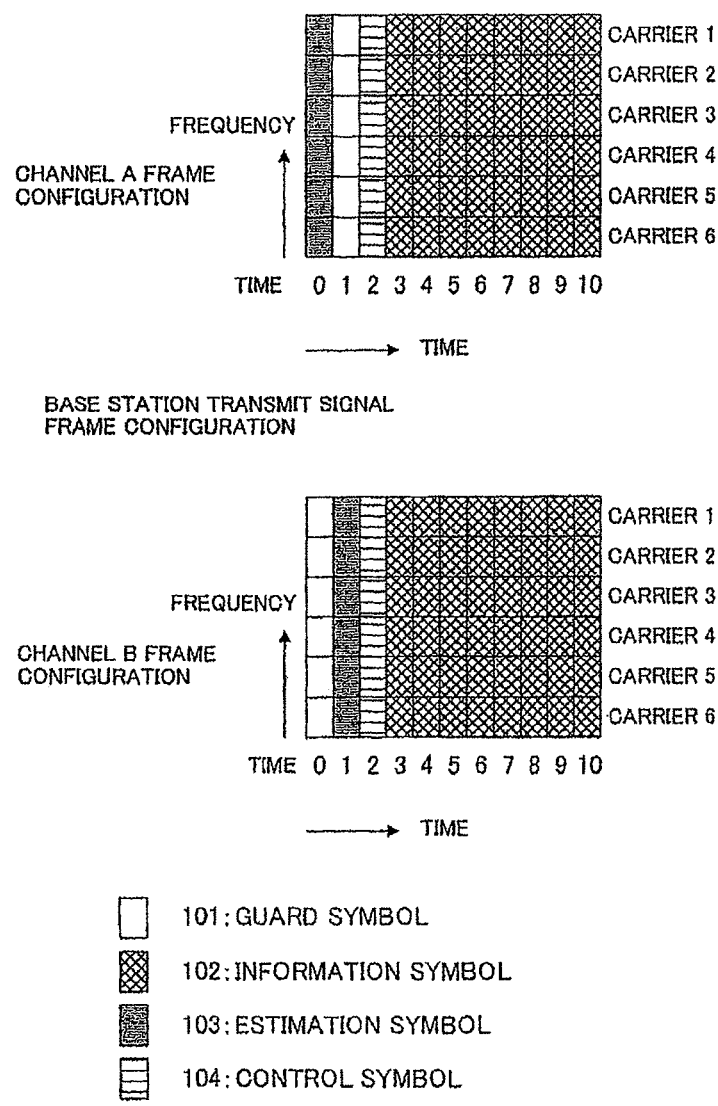
FIG. 29 is a drawing showing an example of base station transmit signal frame configurations according to this embodiment.

FIG. 29 is a drawing showing an example of base station transmit signal frame configurations according to this embodiment. In FIG. 29, the vertical axis indicates frequency and the horizontal axis indicates time. A feature in FIG. 29 is that pilot symbols are not inserted for estimating channel distortion, frequency offset, and suchlike distortion after channel A and B separation. Another feature is that the channel A modulation method is PSK modulation.

At this time, channel A undergoes differential encoding on the frequency axis or time axis. Then in channel B, information bits are assigned for channel A signal point arrangement.

A description will now be given of the method of performing differential encoding of channel A and channel B, and the method of performing channel B signal point arrangement based on a channel A signal point, with the frame configurations in FIG. 29.

In FIG. 29, channel A is PSK modulated, and is subjected to differential encoding with, for example, an adjacent symbol on the frequency axis or time axis. Consequently, it is not necessary to insert pilot symbols. Then channel A and channel B undergo differential encoding as in FIG. 22 or FIG. 23, for example. Alternatively, channel B signal points are arranged on the basis of a channel A signal point as in FIG. 24, FIG. 25, or FIG. 26.

By coding in this way, in the receiver it is possible to estimate channel distortion, frequency offset, and phase in the I-Q plane—that is, to make pilot symbols—by means of a channel A signal when a channel B signal is demodulated.

FIG. 20 and FIG. 21 show examples of the configurations of a transmitting apparatus and receiving apparatus in this case. At this time, points of difference in operation when transmitting or receiving a FIG. 19 frame are that, in FIG. 20, channel A transmit digital signal 201 undergoes differential encoding, and in channel A demodulation section 2003 in FIG. 21, differential detection (differentially coherent detection) is performed, and channel A received digital signal 2004 is output.

Figure 30:
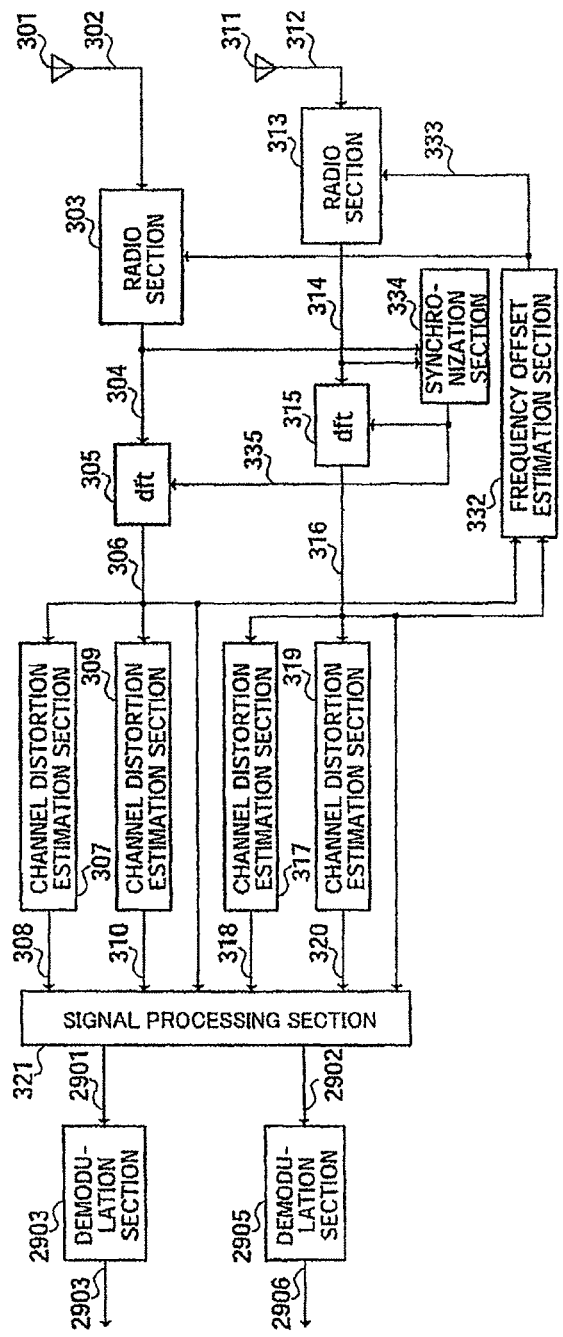
FIG. 30 is a drawing showing an example of the configuration of a receiving apparatus according to this embodiment.

FIG. 30 is a drawing showing an example of the configuration of a receiving apparatus according to this embodiment. Parts in FIG. 30 identical to those in FIG. 4 are assigned the same reference numerals as in FIG. 4, and detailed descriptions thereof are omitted.

A demodulation section 2903 demodulates a separated channel A parallel signal 2901, and outputs a received digital signal 2904.

A demodulation section 2905 demodulates a separated channel B parallel signal 2902, and outputs a received digital signal 2906.

Figure 31:
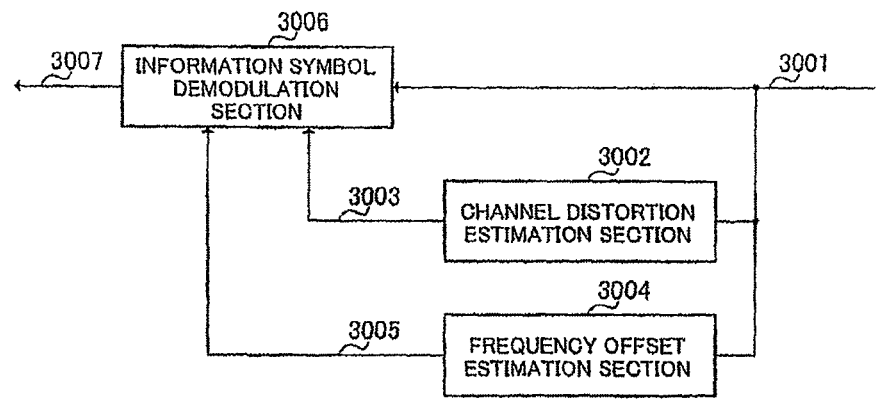
FIG. 31 is a block diagram showing an example of a demodulation section of this embodiment.

FIG. 31 is a block diagram showing an example of a demodulation section of this embodiment. Specifically, FIG. 31 shows the configuration of the channel B demodulation section as an example of the configuration of channel A and channel B demodulation sections according to this embodiment.

A channel distortion estimation section 3002 estimates channel distortion from a channel B parallel signal 3001, and outputs a channel distortion estimation signal 3003 to an information symbol demodulation section 3006.

A frequency offset estimation section 3004 estimates frequency offset from channel B parallel signal 3001, and outputs a frequency offset estimation signal 3005 to information symbol demodulation section 3006.

Using channel distortion estimation signal 3003 and frequency offset estimation signal 3005, information symbol demodulation section 3006 demodulates channel B parallel signal 3001 and outputs a received digital signal 3007.

Figure 32:
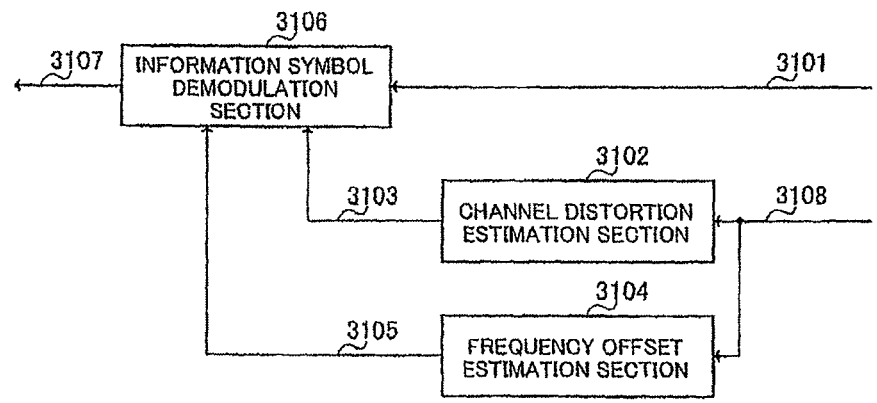
FIG. 32 is a block diagram showing an example of a demodulation section of this embodiment.

FIG. 32 is a block diagram showing an example of a demodulation section of this embodiment. Specifically, FIG. 32 shows the configuration of the channel B demodulation section as an example of the configuration of channel A and channel B demodulation sections according to this embodiment.

A channel distortion estimation section 3102 estimates channel distortion from a channel A parallel signal 3108, and outputs a channel distortion estimation signal 3103 to an information symbol demodulation section 3106.

A frequency offset estimation section 3104 estimates frequency offset from channel A parallel signal 3108, and outputs a frequency offset estimation signal 3105 to information symbol demodulation section 3106.

Using channel distortion estimation signal 3103 and frequency offset estimation signal 3105, information symbol demodulation section 3106 demodulates channel B parallel signal 3101 and outputs a channel B received digital signal 3107.

Figure 33:
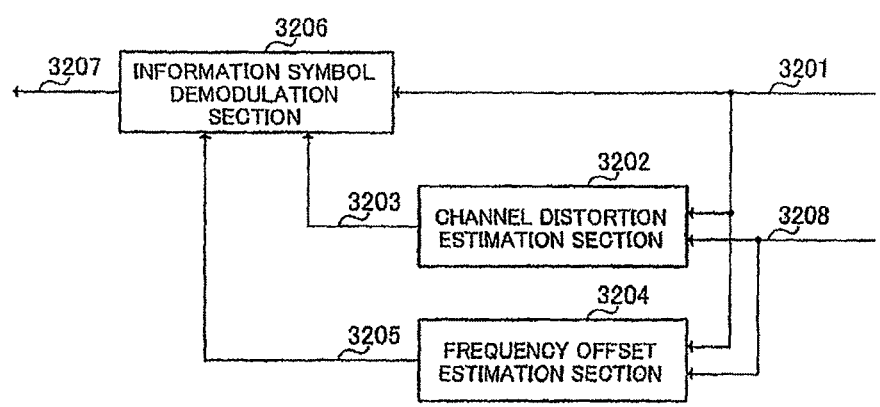
FIG. 33 is a block diagram showing an example of a demodulation section of this embodiment.

FIG. 33 is a block diagram showing an example of a demodulation section of this embodiment. Specifically, FIG. 33 shows the configuration of the channel B demodulation section as an example of the configuration of channel A and channel B demodulation sections according to this embodiment.

A channel distortion estimation section 3202 estimates channel distortion from a channel B parallel signal 3201 and channel A parallel signal 3208, and outputs a channel distortion estimation signal 3203 to an information symbol demodulation section 3206.

A frequency offset estimation section 3204 estimates frequency offset from channel B parallel signal 3201 and channel A parallel signal 3208, and outputs a frequency offset estimation signal 3205 to information symbol demodulation section 3206.

Using channel distortion estimation signal 3203 and frequency offset estimation signal 3205, information symbol demodulation section 3206 demodulates channel B parallel signal 3201 and outputs a channel B received digital signal 3207.

Figure 34:
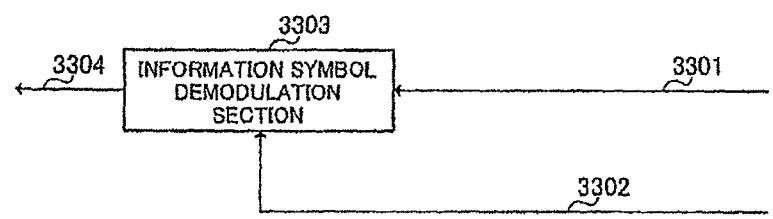
FIG. 34 is a block diagram showing an example of a demodulation section of this embodiment.

FIG. 34 is a block diagram showing an example of a demodulation section of this embodiment. Specifically, FIG. 34 shows the configuration of the channel B demodulation section as an example of the configuration of channel A and channel B demodulation sections according to this embodiment.

Using a channel A parallel signal 3302, an information symbol demodulation section 3303 demodulates a channel B parallel signal 3301 and outputs a channel B received digital signal 3304.

Figure 35:
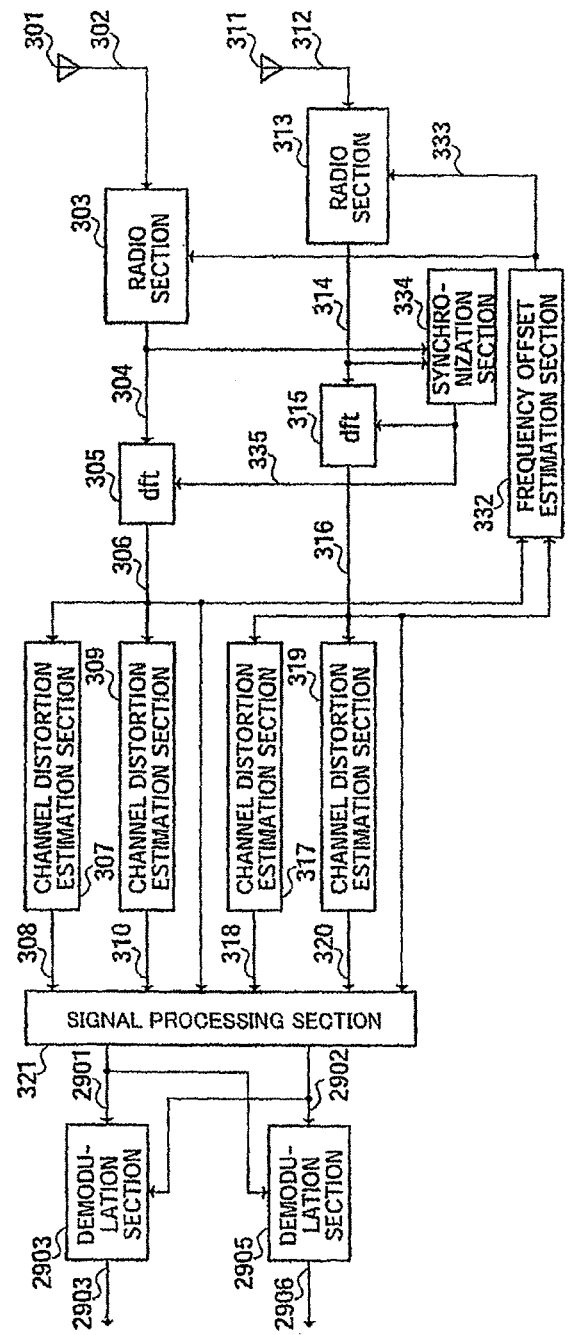
FIG. 35 is a block diagram showing an example of the configuration of a receiving apparatus according to this embodiment.

FIG. 35 is a block diagram showing an example of the configuration of a receiving apparatus according to this embodiment. Parts in FIG. 35 identical to those in FIG. 4 or FIG. 30 are assigned the same reference numerals as in FIG. 4 or FIG. 30, and detailed descriptions thereof are omitted.

Features of FIG. 35 are that separated channel A parallel signal 2901 and separated channel B parallel signal 2902 are input to channel A demodulation section 2903, and that channel A demodulation is performed by means of separated channel A parallel signal 2901 and separated channel B parallel signal 2902.

Similarly, features are that separated channel A parallel signal 2901 and separated channel B parallel signal 2902 are input to channel B demodulation section 2905, and that channel B demodulation is performed by means of separated channel A parallel signal 2901 and separated channel B parallel signal 2902.

In FIG. 35, the example of the channel A and channel B demodulation sections is as shown in FIG. 33. That is to say, demodulation section 2903 and demodulation section 2905 have the configuration of the demodulation section in FIG. 33. Here, channel A demodulation section 2903 will be described as an example.

Channel distortion estimation section 3202 extracts pilot symbols inserted in channel A and channel B from channel A parallel signal 3201 corresponding to separated channel A parallel signal 2901 in FIG. 35, and channel B parallel signal 3208 (FIG. 27) corresponding to separated channel B parallel signal 2902 in FIG. 35, estimates channel distortion, and outputs channel distortion estimation signal 3203 to information symbol demodulation section 3206.

Similarly, frequency offset estimation section 3204 extracts pilot symbols inserted in channel A and channel B from channel A parallel signal 3201 corresponding to separated channel A parallel signal 2901 in FIG. 35, and channel B parallel signal 3208 (FIG. 27) corresponding to separated channel B parallel signal 2902 in FIG. 35, estimates frequency offset, and outputs frequency offset estimation signal 3205 to information symbol demodulation section 3206.

Then, using channel distortion estimation signal 3203 and frequency offset estimation signal 3205, information symbol demodulation section 3206 eliminates frequency offset, channel distortion, and suchlike distortion from channel A parallel signal 3201, performs demodulation, and outputs channel A received digital signal 3007.

By estimating channel distortion and frequency offset by using channel A and channel B pilot symbols in this way, estimation precision is improved, and reception sensitivity characteristics are improved.

The above description refers to the configuration in FIG. 33 in which a channel distortion estimation section and frequency offset estimation section are provided, but the present invention can be similarly implemented with a configuration in which only one or the other is provided.

Figure 36:
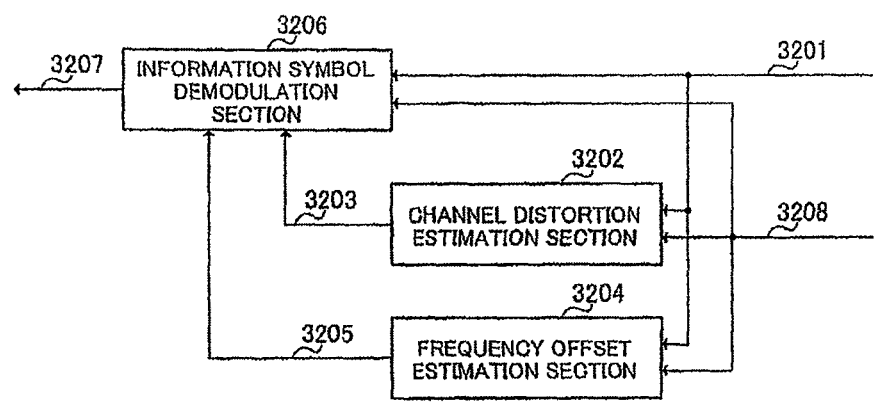
FIG. 36 is a block diagram showing an example of a demodulation section of this embodiment.

FIG. 36 is a block diagram showing an example of a demodulation section of this embodiment. Specifically, FIG. 36 shows the configuration of the channel B demodulation section as an example of the configuration of channel A and channel B demodulation sections according to this embodiment. Parts in FIG. 36 identical to those in FIG. 33 are assigned the same reference numerals as in FIG. 33, and detailed descriptions thereof are omitted.

A demodulation section of a receiving apparatus of this embodiment will now be described. FIG. 31 is a block diagram showing the configuration of a receiving apparatus of this embodiment. Specifically, FIG. 31 is a block diagram showing the detailed configuration of demodulation section 2003 in FIG. 21.

In FIG. 31, channel distortion estimation section 3002 extracts pilot symbols—for example, pilot symbols 1801 inserted in channel A in FIG. 19—from channel A parallel signal 3001 corresponding to separated channel A parallel signal 2001 in FIG. 21, and estimates channel distortion.

Similarly, frequency offset estimation section 3004 extracts pilot symbols—for example, pilot symbols 1801 inserted in channel A in FIG. 19—from channel A parallel signal 3001, and estimates frequency offset.

Then, using channel distortion estimation signal 3003 and frequency offset estimation signal 3005, information symbol demodulation section 3006 eliminates frequency offset, channel distortion, and suchlike distortion from channel A parallel signal 3001, and performs demodulation.

Channel B demodulation section 2005 has separated channel A parallel signal 2001 and separated channel B parallel signal 2002 as input, demodulates channel B information symbols 102 in FIG. 19, and outputs channel B received digital signal 2006. Drawings showing the detailed configuration of channel B demodulation section 2005 at this time are FIG. 34 and FIG. 36.

In FIG. 34, information symbol demodulation section 3303 has as input channel A parallel signal 3302 corresponding to separated channel A parallel signal 2001 in FIG. 21, and channel B parallel signal 3301 corresponding to separated divided channel B parallel signal 2002 in FIG. 21, and performs differential detection (differentially coherent detection).

In FIG. 36, channel distortion estimation section 3202 extracts pilot symbols—for example, channel A pilot symbols 1801 in FIG. 19—from channel A parallel signal 3208 corresponding to separated channel A parallel signal 2001 in FIG. 21, and estimates channel distortion.

Similarly, frequency offset estimation section 3204 extracts pilot symbols—for example, channel A pilot symbols 1801 in FIG. 19—from channel A parallel signal 3208 corresponding to separated channel A parallel signal 2001 in FIG. 21, and estimates frequency offset.

Then, using channel distortion estimation signal 3203 and frequency offset estimation signal 3205, information symbol demodulation section 3206 eliminates frequency offset, channel distortion, and suchlike distortion from channel A parallel signal 3208 and channel B parallel signal 3201, performs differential detection (differentially coherent detection) on the channel B parallel signal and channel A parallel signal, and outputs a channel B received digital signal 3207.

Thus, according to a transmitting apparatus and receiving apparatus of this embodiment, a channel B signal undergoes differential encoding by means of a channel A signal, and pilot symbols are not inserted in channel B, with the result that transmission speed is improved compared with a system in which pilot symbols are inserted in channel B.

The method of differential encoding for channel A and channel B is not limited to this. For example, differential encoding may be performed only for certain specific symbols. Also, it is not necessary for channel A and channel B differentially coded symbols to be symbols of the same carrier or the same time. Furthermore, a description has been given using BPSK and QPSK as examples of differential encoding, but this is not a limitation, and in the case of PSK modulation, in particular, the present invention is easy to implement. The channel used as a reference when performing differential encoding must transmit constantly, and this channel is suitable for the transmission of control information, such as communication conditions and channel configuration information, for example.

The above description refers to configurations in FIG. 32 and FIG. 36 in which a channel distortion estimation section and frequency offset estimation section are provided, but the present invention can be similarly implemented with a configuration in which only one or the other is provided.

A transmitting apparatus and receiving apparatus are not limited to the configurations in FIG. 20 and FIG. 21. Also, the use of multiplex frames and non-multiplexed frames with two channels and two antennas has been described as an example, but the present invention is not limited to this. For example, it is possible to implement the present invention similarly with multiplex frames using three channels and three antennas, and multiplex frames using two channels and two of three antennas. In this case, when using 3-channel multiplexing, if the additional channel is designated channel C, channel C is differentially coded with channel A. Also, the frame configurations are not limited to those in FIG. 19. Furthermore, an example has been described in which OFDM is used as the communication method, but it is possible to implement the present invention similarly with a multicarrier method, a spread spectrum communication method, or a single-carrier method. Moreover, a spread spectrum communication method may be used as the method for each carrier in a multicarrier system. Thus, it is possible to implement the present invention similarly with OFDM-CDM.

Furthermore, there are also cases where one antenna is composed of a plurality of antennas.

Next, a case will be described in which channel B is coded based on a channel A signal.

The coding method of channel A and channel B is not limited to this. For example, coding may be performed only for certain specific symbols. Also, it is not necessary for channel A and channel B coded symbols to be symbols of the same carrier or the same time. Furthermore, a description has been given using BPSK and QPSK as examples of differential encoding, but this is not a limitation, and in the case of PSK modulation, in particular, the present invention is easy to implement. The channel used as a reference when coding must transmit constantly, and this channel is suitable for the transmission of control information, such as communication conditions and channel configuration information, for example.

The above description refers to a configuration in FIG. 36 in which a channel distortion estimation section and frequency offset estimation section are provided, but the present invention can be similarly implemented with a configuration in which only one or the other is provided.

A transmitting apparatus and receiving apparatus are not limited to the configurations in FIG. 20 and FIG. 21. Also, the use of multiplex frames and non-multiplexed frames with two channels and two antennas has been described as an example, but the present invention is not limited to this. For example, it is possible to implement the present invention similarly with multiplex frames using three channels and three antennas, and multiplex frames using two channels and two of three antennas. In this case, when using 3-channel multiplexing, if the additional channel is designated channel C, channel C is coded with channel A. Also, the frame configurations are not limited to those in FIG. 19. Furthermore, an example has been described in which OFDM is used as the communication method, but it is possible to implement the present invention similarly with a multicarrier method, a spread spectrum communication method, or a single-carrier method. Moreover, a spread spectrum communication method may be used as the method for each carrier in a multicarrier system. Thus, it is possible to implement the present invention similarly with OFDM-CDM (Orthogonal Frequency Division Multiplexing-Code Division Multiplexing).

Furthermore, there are also cases where one antenna is composed of a plurality of antennas.

In the above description, the coding method of channel A and channel B is not limited to this, and, for example, coding may be performed only for certain specific symbols. Also, it is not necessary for channel A and channel B coded symbols to be symbols of the same carrier or the same time. Furthermore, a description has been given using BPSK and QPSK as examples of differential encoding, but this is not a limitation, and in the case of PSK modulation, in particular, the present invention is easy to implement. The channel used as a reference when coding must transmit constantly, and this channel is suitable for the transmission of control information, such as communication conditions and channel configuration information, for example.

A transmitting apparatus and receiving apparatus are not limited to the configurations in FIG. 20 and FIG. 21. Also, the use of multiplex frames and non-multiplexed frames with two channels and two antennas has been described as an example, but the present invention is not limited to this. For example, it is possible to implement the present invention similarly with multiplex frames using three channels and three antennas, and multiplex frames using two channels and two of three antennas. In this case, when using 3-channel multiplexing, if the additional channel is designated channel C, channel C is coded with channel A. Also, the frame configurations are not limited to those in FIG. 29. Furthermore, an example has been described in which OFDM is used as the communication method, but it is possible to implement the present invention similarly with a multicarrier method, a spread spectrum communication method, or a single-carrier method. Moreover, a spread spectrum communication method may be used as the method for each carrier in a multicarrier system. Thus, it is possible to implement the present invention similarly with OFDM-CDM.

Furthermore, there are also cases where one antenna is composed of a plurality of antennas.

As described above, channel A is differentially coded on the frequency axis or time axis, a channel A and channel B signal is coded by means of a channel A signal, and pilot symbols are not inserted in channel A or channel B, with the result that transmission speed is improved compared with a system in which pilot symbols are inserted in channel A and channel B.

The method of inserting pilot symbols in channel A and channel B will now be described using FIG. 3, FIG. 27, FIG. 30, FIG. 33, and FIG. 35.

A transmitting apparatus and receiving apparatus are not limited to the configurations in FIG. 3 and FIG. 35. Also, the use of multiplex frames and non-multiplexed frames with two channels and two antennas has been described as an example, but the present invention is not limited to this. For example, it is possible to implement the present invention similarly with multiplex frames using three channels and three antennas, and multiplex frames using two channels and two of three antennas. In this case, when using 3-channel multiplexing, estimating channel distortion and frequency offset using pilot symbols of three channels enables estimation precision to be improved. Also, the frame configurations are not limited to those in FIG. 27. Furthermore, an example has been described in which OFDM is used as the communication method, but it is possible to implement the present invention similarly with a multicarrier method, a spread spectrum communication method, or a single-carrier method. Moreover, a spread spectrum communication method may be used as the method for each carrier in a multicarrier system. Thus, it is possible to implement the present invention similarly with OFDM-CDM.

Furthermore, there are also cases where one antenna is composed of a plurality of antennas.

Thus, according to a transmitting apparatus and receiving apparatus of this embodiment, estimation precision is improved by estimating frequency offset and channel distortion using channel A and channel B pilots, as a result of which channel A and channel B demodulate reception sensitivity are improved.

Embodiment 8

In Embodiment 8 of the present invention, a description is given of a transmitting apparatus provided with one transmission baseband frequency source and one radio section frequency source, and a receiving apparatus provided with one reception baseband frequency source and one radio section frequency source, in a transmission method whereby modulated signals of a plurality of channels are transmitted from a plurality of antennas in the same frequency band.

Figure 37:
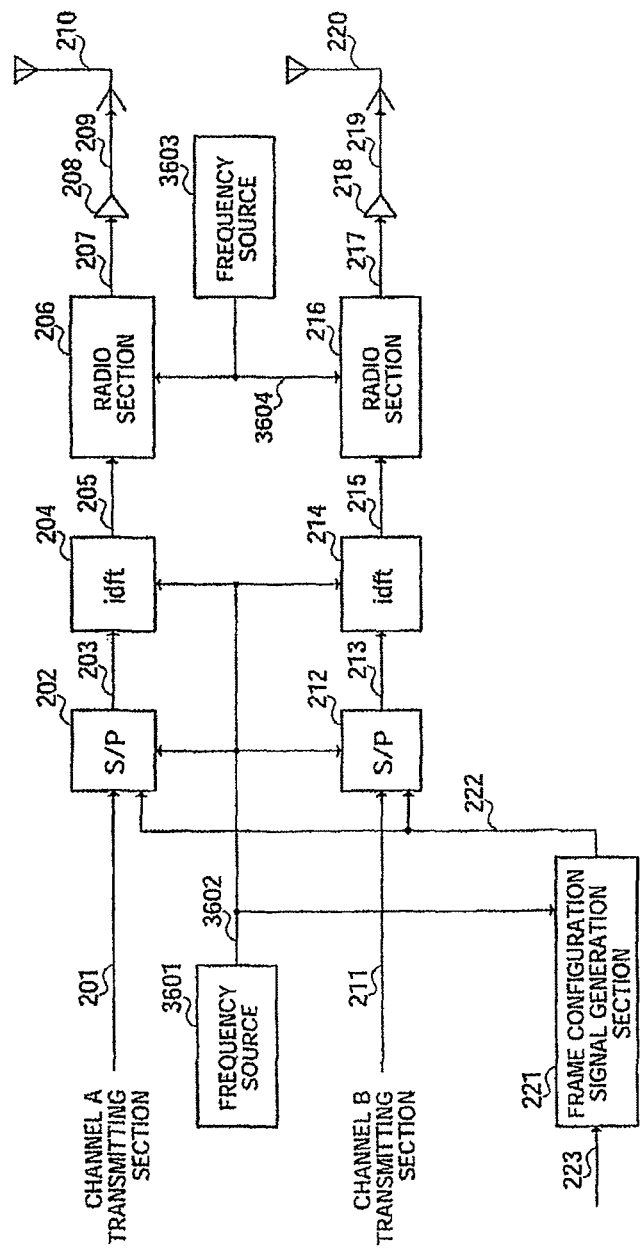
FIG. 37 is a block diagram showing an example of the configuration of a transmitting apparatus according to Embodiment 8 of the present invention.

FIG. 37 is a block diagram showing an example of the configuration of a transmitting apparatus according to Embodiment 8 of the present invention. Parts in FIG. 37 identical to those in FIG. 3 are assigned the same reference numerals as in FIG. 3, and detailed descriptions thereof are omitted.

A frequency source 3601 generates a transmission baseband signal operating frequency signal 3602, and outputs operating frequency signal 3602 to serial/parallel conversion section 202, inverse discrete Fourier transform section 204, serial/parallel conversion section 212, inverse discrete Fourier transform section 214, and frame configuration signal generation section 221.

A frequency source 3603 generates a radio section operating frequency signal 3604, and outputs operating frequency signal 3604 to radio section 206 and radio section 216.

The operation of the transmitting apparatus in FIG. 37 will now be described. In FIG. 37, transmission baseband frequency source 3601 generates operating frequency signal 3602.

Then serial/parallel conversion sections 202 and 212, and inverse discrete Fourier transform sections 204 and 214, perform signal processing in synchronization with operating frequency signal 3602.

Similarly, radio section frequency source 3603 generates operating frequency signal 3604.

Then radio sections 206 and 216 perform frequency conversion of post-inverse-discrete-Fourier-transform signals 205 and 215 in synchronization with operating frequency signal 3604, and output transmit signals 207 and 217.

Thus, according to a transmitting apparatus of this embodiment, frequency sources can be reduced compared with a case in which a frequency source is provided individually for each antenna. Also, sharing frequency sources in the transmitting apparatus enables channel A and channel B signal frequency synchronization and time synchronization to be performed easily in the receiving apparatus. This is because, since frequency sources are shared by channel A and channel B, individual synchronization is not necessary.

Figure 38:
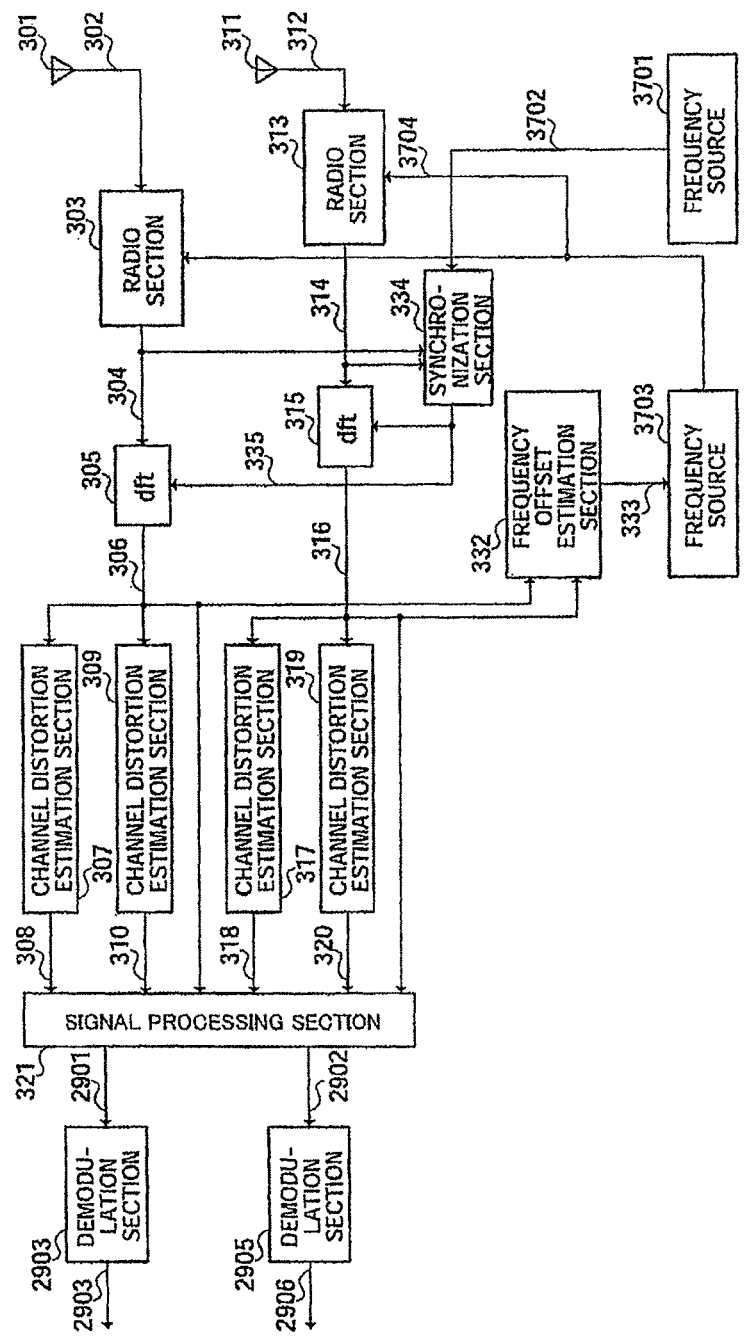
FIG. 38 is a block diagram showing an example of the configuration of a receiving apparatus according to Embodiment 8 of the present invention.

The receiving side will now be described. FIG. 38 is a block diagram showing an example of the configuration of a receiving apparatus according to Embodiment 8 of the present invention. Parts in FIG. 38 identical to those in FIG. 4 are assigned the same reference numerals as in FIG. 4, and detailed descriptions thereof are omitted.

A frequency source 3701 generates a reception baseband operating frequency signal 3702, and outputs operating frequency signal 3702 to synchronization section 334.

A frequency source 3703 generates a radio section operating frequency signal 3704, and outputs radio section operating frequency signal 3704 to radio section 303 and radio section 313.

The operation of the receiving apparatus in FIG. 38 will now be described.

Reception baseband frequency source 3701 generates operating frequency signal 3702.

Synchronization section 334 compares operating frequency signal 3702 and the synchronization timing acquired by means of received quadrature baseband signals 304 and 314, and generates timing signal 335

Using frequency offset estimation signal 333, frequency source 3703 controls the frequency so as to be synchronized with the transmitting apparatus, and generates operating frequency signal 3704.

Radio sections 303 and 313 perform frequency conversion of received signals 302 and 312 respectively based on operating frequency signal 3704.

Thus, according to a receiving apparatus of this embodiment, frequency sources can be reduced compared with a case in which a frequency source is provided individually for each antenna. Also, channel A and channel B signal frequency synchronization and time synchronization can be performed easily.

A transmitting apparatus and receiving apparatus are not limited to the configurations in FIG. 37 and FIG. 38. Also, the use of multiplex frames and non-multiplexed frames with two channels and two antennas has been described as an example, but the present invention is not limited to this.

For example, it is possible to implement the present invention similarly with multiplex frames using three channels and three antennas, and multiplex frames using two channels and two of three antennas. Also, an example has been described in which OFDM is used as the communication method, but it is possible to implement the present invention similarly with a multicarrier method, a spread spectrum communication method, or a single-carrier method. Moreover, a spread spectrum communication method may be used as the method for each carrier in a multicarrier system. Thus, it is possible to implement the present invention similarly with OFDM-CDM.

Furthermore, there are also cases where one antenna is composed of a plurality of antennas.

By using a transmitting apparatus provided with one transmission baseband frequency source and one radio section frequency source, and a receiving apparatus provided with one reception baseband frequency source and one radio section frequency source, in a transmission method whereby modulated signals of a plurality of channels are transmitted from a plurality of antennas in the same frequency band, as described above, frequency sources can be reduced compared with a case in which a frequency source is provided individually for each antenna in the transmitting apparatus. Also, sharing frequency sources in the transmitting apparatus enables channel A and channel B signal frequency synchronization and time synchronization to be performed easily in the receiving apparatus.

Embodiment 9

In Embodiment 9 of the present invention, a description is given of a communication method whereby the communication method is switched between a communication method in which signals of a plurality of channels are transmitted from a plurality of antennas and a communication method in which a signal of one channel is transmitted, according to the environment, and the configurations of an associated transmitting apparatus and receiving apparatus.

Figure 39:
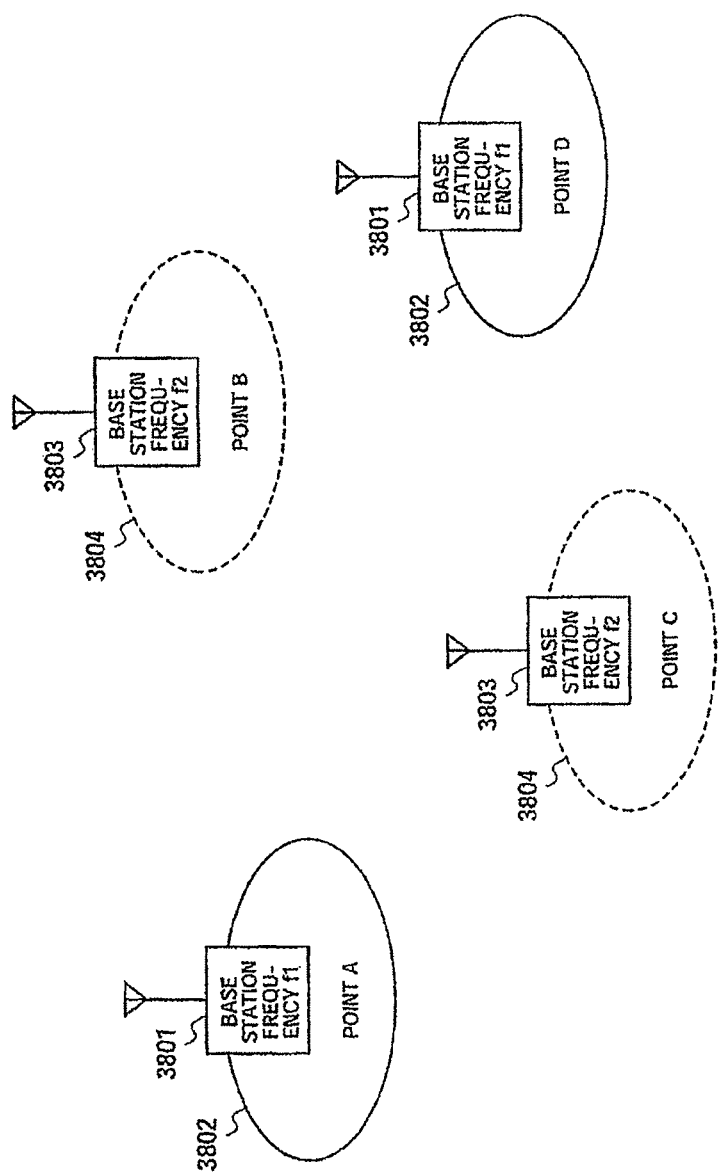
FIG. 39 is a drawing showing an example of base station arrangement according to Embodiment 9 of the present invention.

FIG. 39 is a drawing showing an example of base station arrangement according to Embodiment 9 of the present invention. In FIG. 39, base station 3801 transmits a modulated signal at frequency f1, and the corresponding communication limit is indicated by reference numeral 3802. Similarly, base station 3803 transmits a modulated signal at frequency f2, and the corresponding communication limit is indicated by reference numeral 3804.

In FIG. 39, it is assumed that base station 3801 that transmits a modulated signal at frequency f1 and base station 3803 that transmits a modulated signal at frequency f2 are installed at almost the same location.

A base station apparatus and communication terminal of this embodiment adaptively switch between signals of a communication method whereby signals of a plurality of channels are multiplexed using a plurality of antennas and a signal of a single channel according to the radio wave propagation environment and communication area.

Base station 3801 transmits signals with the frame configurations shown in FIG. 9 at frequency f1.

Base station 3803 transmits signals with the frame configuration shown in FIG. 10 at frequency f2. Frequency f1 and frequency f2 are arranged as shown in FIG. 11.

It is here assumed that base station 3801 is configured as shown in FIG. 3, and that signals of a plurality of channels are multiplexed and transmitted from a plurality of antennas.

Here, for example, signals of two channels are multiplexed and transmitted using frame configurations such as shown in FIG. 9.

Figure 40:
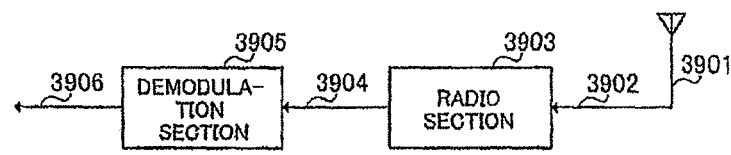
FIG. 40 is a block diagram showing the configuration of a base station receiving apparatus according to Embodiment 9 of the present invention.

The receiving apparatus of base station 3801 will now be described in detail. FIG. 40 is a block diagram showing the configuration of a base station receiving apparatus according to Embodiment 9 of the present invention. FIG. 40 shows one example of the configuration of a receiving apparatus of base station 3801 and base station 3803. In FIG. 40, a radio section 3903 converts a received signal 3902 received by a receiving antenna 3901, and outputs a received quadrature baseband signal 3904 to a demodulation section 3905.

Demodulation section 3905 demodulates received quadrature baseband signal 3904, and outputs a received digital signal 3906.

Figure 41:
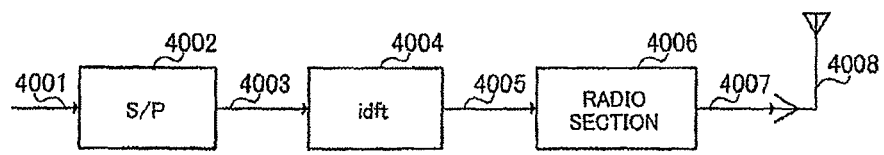
FIG. 41 is a block diagram showing the configuration of a base station transmitting apparatus according to Embodiment 9 of the present invention.

The transmitting apparatus of base station 3801 will now be described in detail. FIG. 41 is a block diagram showing the configuration of a base station transmitting apparatus according to Embodiment 9 of the present invention. FIG. 41 shows one example of the configuration of a transmitting apparatus of base station 3803 according to this embodiment. In FIG. 41, a serial/parallel conversion section 4002 configures a frame from a transmit digital signal 4001, and outputs a parallel signal 4003 to an inverse discrete Fourier transform section 4004.

Inverse discrete Fourier transform section 4004 performs inverse Fourier transform processing of parallel signal 4003, and outputs a post-inverse-Fourier-transform signal 4005 to a radio section 4006.

Radio section 4006 converts post-inverse-Fourier-transform signal 4005 to radio frequency, and a transmit signal 4007 is output as a radio wave from an antenna 4008.

Figure 42:
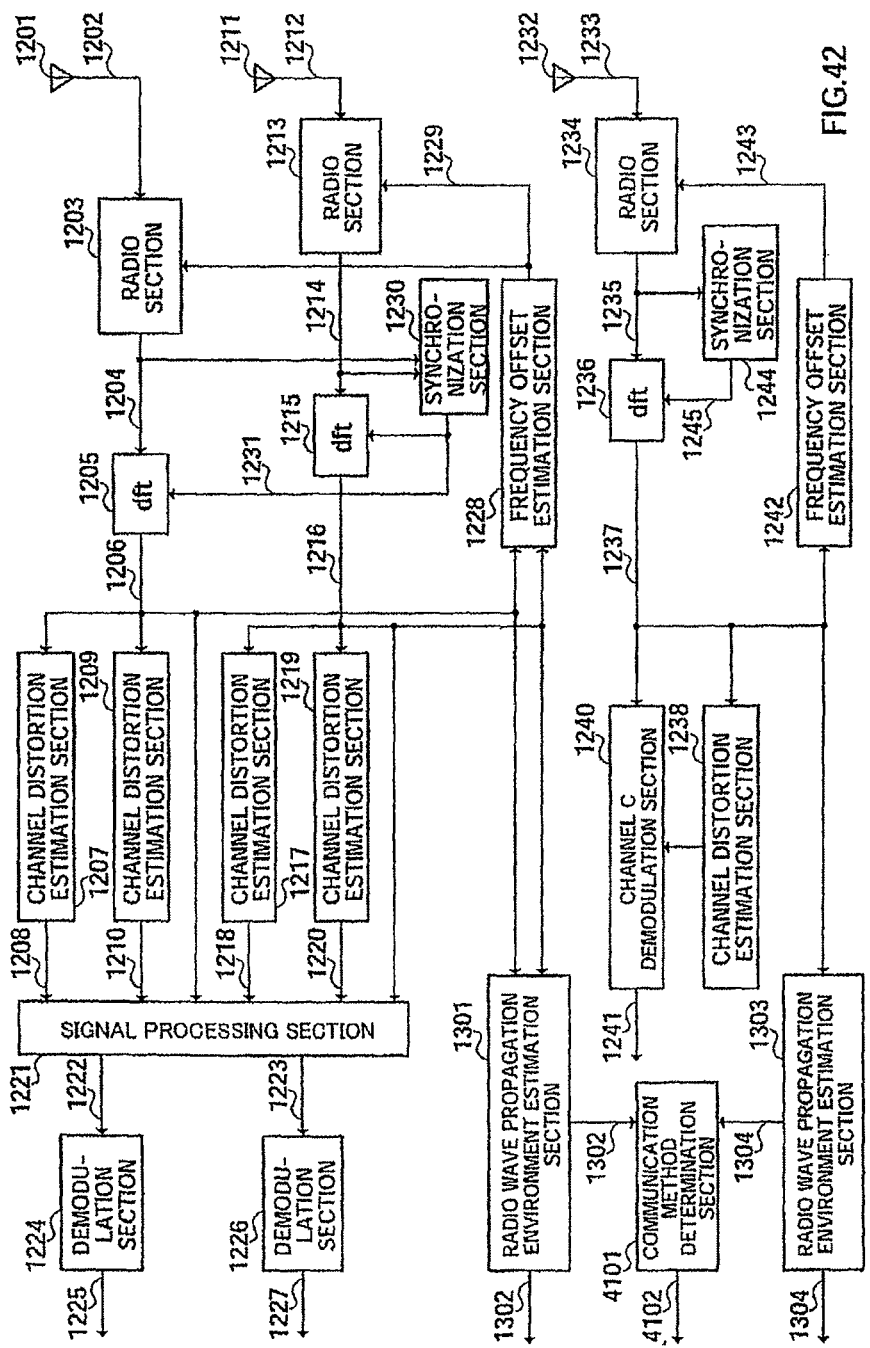
FIG. 42 is a drawing showing an example of the configuration of a terminal receiving apparatus according to Embodiment 9 of the present invention.

FIG. 42 is a drawing showing an example of the configuration of a terminal receiving apparatus according to Embodiment 9 of the present invention. Parts in FIG. 42 identical to those in FIG. 13 or FIG. 14 are assigned the same reference numerals as in FIG. 13 or FIG. 14, and detailed descriptions thereof are omitted. The receiving apparatus in FIG. 42 comprises a receiving section for demodulating frequency f1 channel A and channel B via two antennas, and a receiving section for demodulating frequency f2 channel C.

Radio wave propagation environment estimation section 1301 estimates the radio wave propagation environments of frequency f1 channel A and channel B multiplex signals, and outputs a radio wave propagation environment estimation signal 1302.

Radio wave propagation environment estimation section 1303 estimates the radio wave propagation environment of a frequency f2 channel C signal, and outputs a radio wave propagation environment estimation signal 1304.

A communication method determination section 4101 decides upon either communication by means of frequency f1—that is, with base station 3801—or communication by means of frequency f2—that is, with base station 3803—based on radio wave propagation environment estimation signals 1302 and 1304.

Figure 43:
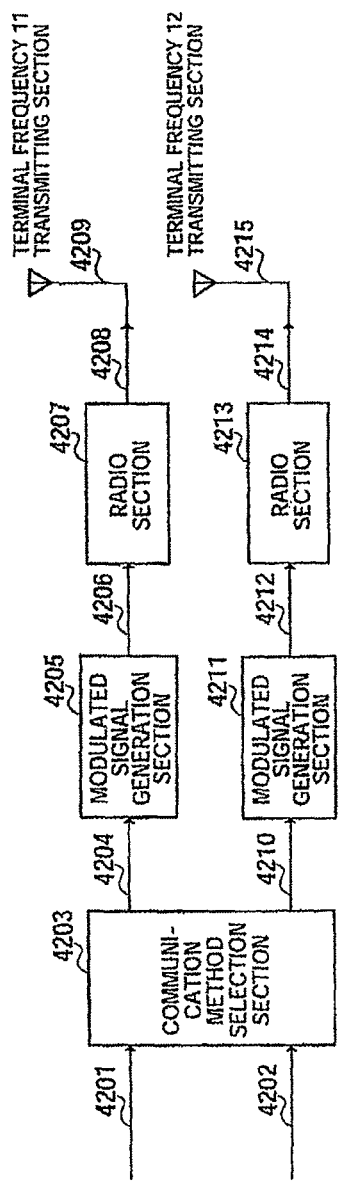
FIG. 43 is a drawing showing an example of the configuration of a terminal transmitting apparatus according to Embodiment 9 of the present invention.

FIG. 43 is a drawing showing an example of the configuration of a terminal transmitting apparatus according to Embodiment 9 of the present invention. The transmitting apparatus in FIG. 43 comprises a frequency f1 modulated signal transmitting section and a frequency f2 modulated signal transmitting section.

A communication method selection section 4203 has a determined communication method signal 4202 as input, and outputs a transmit digital signal 4201 to a modulated signal generation section 4205 or modulated signal generation section 4211 according to the communication method contained in determined communication method signal 4202. That is to say, when transmitting by means of frequency f1, communication method selection section 4203 outputs transmit digital signal 4201 to modulated signal generation section 4205 as a frequency f1 transmit digital signal 4204, and when transmitting by means of frequency f2, communication method selection section 4203 outputs transmit digital signal 4201 to modulated signal generation section 4211 as a frequency f2 transmit digital signal 4210.

Modulated signal generation section 4205 modulates frequency f1 transmit digital signal 4204, and outputs a transmit quadrature baseband signal 4206 to a radio section 4207.

Radio section 4207 converts transmit quadrature baseband signal 4206 to radio frequency f1, and a frequency f1 modulated signal 4208 is transmitted as a radio wave from an antenna 4209.

Modulated signal generation section 4211 modulates frequency f2 transmit digital signal 4210, and outputs a transmit quadrature baseband signal 4212 to a radio section 4213.

Radio section 4213 converts transmit quadrature baseband signal 4212 to radio frequency f2, and a frequency f2 modulated signal 4214 is transmitted as a radio wave from an antenna 4215.

Figure 44:
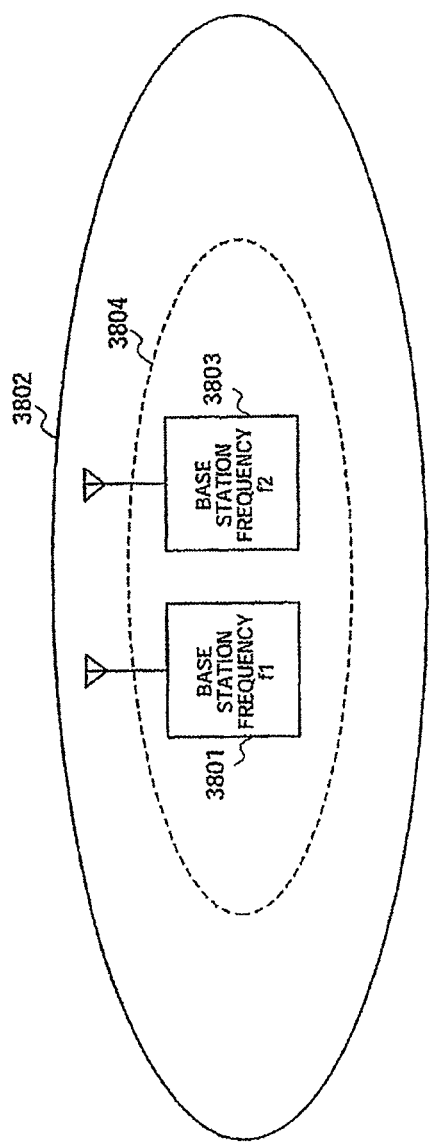
FIG. 44 is a drawing showing an example of base station arrangement according to Embodiment 9 of the present invention.

FIG. 44 is a drawing showing an example of base station arrangement according to Embodiment 9 of the present invention. Parts in FIG. 44 identical to those in FIG. 39 are assigned the same reference numerals as in FIG. 39, and detailed descriptions thereof are omitted.

As in FIG. 39, at point A and point D, a modulated signal transmitted by base station 3801 that transmits a frequency f1 modulated signal can be received, and at point B and point C, a modulated signal transmitted by base station 3803 that transmits a frequency f2 modulated signal can be received.

At this time, it is assumed that a terminal is at point A or D, for example. Then, a signal whereby it is known that a frequency f1 signal is present is output as radio wave propagation environment estimation signal 1302 by radio wave propagation environment estimation section 1301 of the terminal receiving apparatus in FIG. 42, and a signal indicating that a frequency f2 signal is not present is output as radio wave propagation environment estimation signal 1304 by radio wave propagation environment estimation section 1303.

It is also assumed that a terminal is at point B or C. Then, a signal whereby it is known that a frequency f1 signal is not present is output as radio wave propagation environment estimation signal 1302 by radio wave propagation environment estimation section 1301 of the terminal receiving apparatus in FIG. 42, and a signal indicating that a frequency f2 signal is present is output as radio wave propagation environment estimation signal 1304 by radio wave propagation environment estimation section 1303.

Communication method determination section 4101 has above-described radio wave propagation environment estimation signals 1302 and 1304 as input, decides upon communication by frequency f1 or f2 for which a modulated signal is present, and outputs the decision as a determined communication method signal 4102.

When there is a base station 3801 that transmits a frequency f1 modulated signal and a base station 3803 that transmits a frequency f2 modulated signal, as in FIG. 44, a signal whereby it is known that a frequency f1 signal is present is output as radio wave propagation environment estimation signal 1302 by radio wave propagation environment estimation section 1301, and a signal indicating that a frequency f2 signal is present is also output as radio wave propagation environment estimation signal 1304 by radio wave propagation environment estimation section 1303.

Communication method determination section 4101 in FIG. 42 has above-described radio wave propagation environment estimation signals 1302 and 1304 as input, selects a communication method with a high transmission speed, for example, and outputs determined communication method signal 4102. If the occupied frequency bands of f1 and f2 modulated signals are equal at this time, since the communication speed is higher with frequency f1 whereby signals of a plurality of channels are transmitted by a plurality of antennas, the frequency f1 communication method is selected as the preferred method.

If a terminal wishes to select an error-tolerant communication method, the frequency f2 communication method is selected as the preferred method.

The configurations of the above transmitting apparatus and receiving apparatus are not limited to the configurations in FIG. 3, FIG. 40, FIG. 41, FIG. 42, or FIG. 43. Also, in the frame configurations in FIG. 9, multiplex frames with two channels and two antennas have been illustrated, but the present invention is not limited to this. For example, it is possible to transmit multiplex frames using three channels and three antennas. Also, an example has been described in which OFDM is used as the communication method, but it is possible to implement the present invention similarly with a multicarrier method, a spread spectrum communication method, or a single-carrier method. For example, OFDM may be used as a communication method whereby signals of a plurality of channels are transmitted by a plurality of antennas, and a spread spectrum communication method as a non-multiplexed signal communication method. Moreover, a spread spectrum communication method may be used as the method for each carrier in a multicarrier system. Thus, it is possible to implement the present invention similarly with OFDM-CDM.

Furthermore, there are also cases where one antenna is composed of a plurality of antennas.

Thus, according to a transmitting apparatus and receiving apparatus of this embodiment, by having a terminal switch the communication method to be selected, giving priority to transmission speed or giving priority to error tolerance, by using a communication method whereby the communication method is switched between a communication method in which signals of a plurality of channels are transmitted from a plurality of antennas and a communication method in which a signal of one channel is transmitted, it is possible for a terminal to perform communication as desired. Also, according to a transmitting apparatus and receiving apparatus of this embodiment, by switching the communication method according to the radio wave propagation environment, it is possible to achieve compatibility between data transmission speed and received data quality.

Embodiment 10

In Embodiment 10 of the present invention, a description is given of a communication method whereby a radio communication apparatus that receives information on the number of antennas provided from a communicating party, is provided with a plurality of antennas, and has a function that transmits a plurality of channels, transmits modulated signals of a number of channels in accordance with information on the number of antennas.

Figure 45:
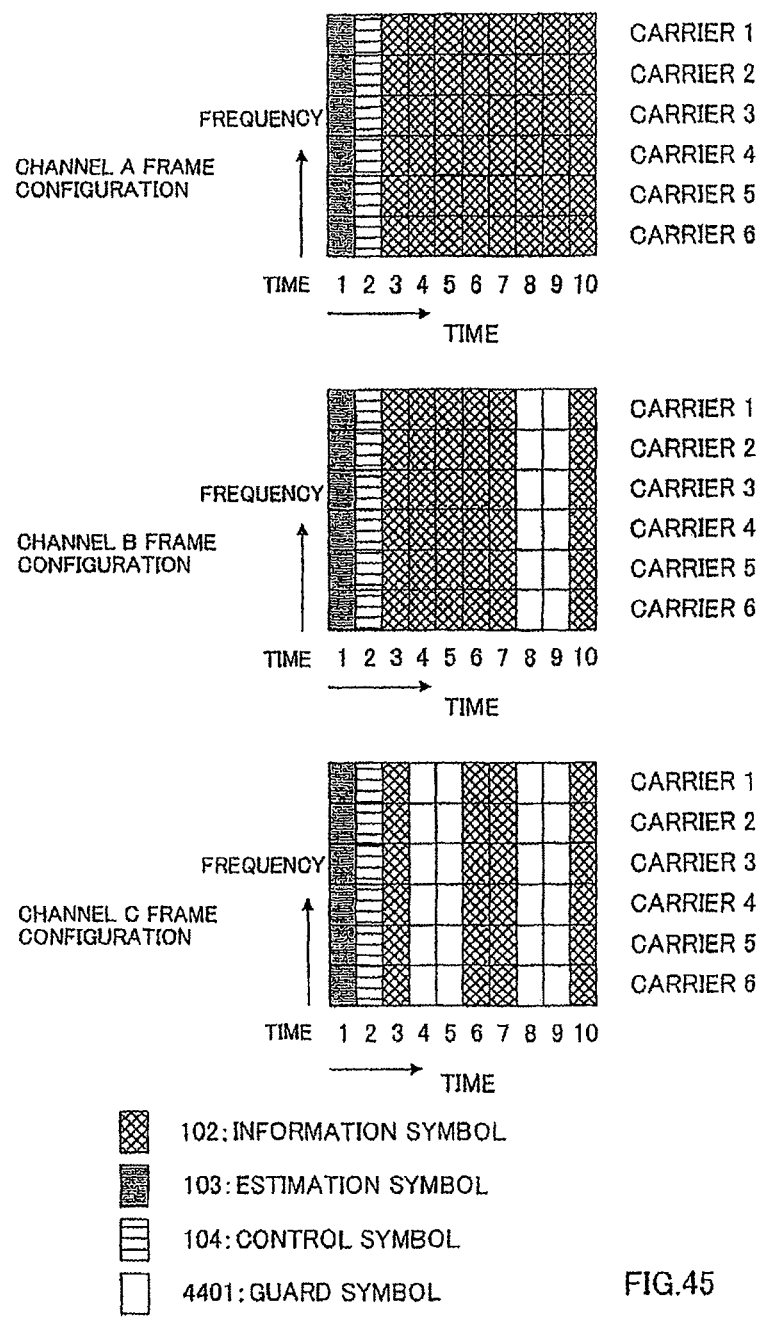
FIG. 45 is a drawing showing an example of base station frame configurations according to Embodiment 10 of the present invention.

FIG. 45 is a drawing showing an example of base station frame configurations according to Embodiment 10 of the present invention. Parts in FIG. 45 identical to those in FIG.

2 are assigned the same reference numerals as in FIG. 2, and detailed descriptions thereof are omitted. In FIG. 45, reference numeral 4401 indicates a guard symbol, where there is no modulated symbol. Also, in FIG. 45, modulated signals of to 3 channels are transmitted.

Figure 46:
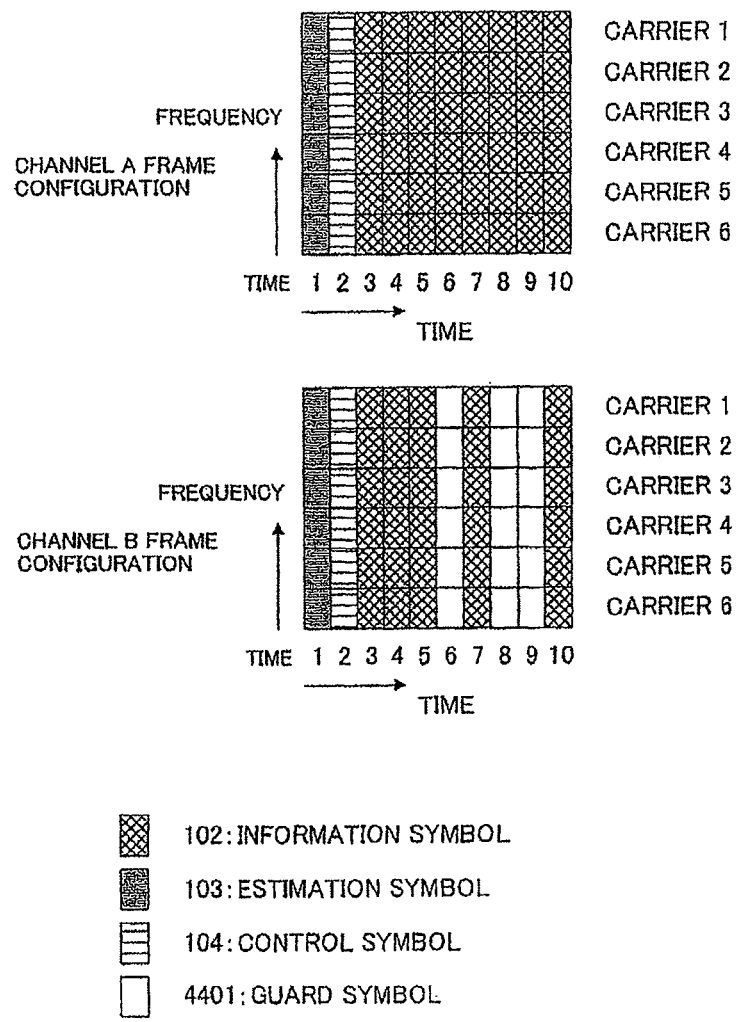
FIG. 46 is a drawing showing an example of base station frame configurations according to Embodiment 10 of the present invention.

FIG. 46 is a drawing showing an example of base station frame configurations according to Embodiment 10 of the present invention. Parts in FIG. 46 identical to those in FIG. 2 or FIG. 45 are assigned the same reference numerals as in FIG. 2 or FIG. 45, and detailed descriptions thereof are omitted. In FIG. 45, modulated signals of to 2 channels are transmitted.

Figure 47:
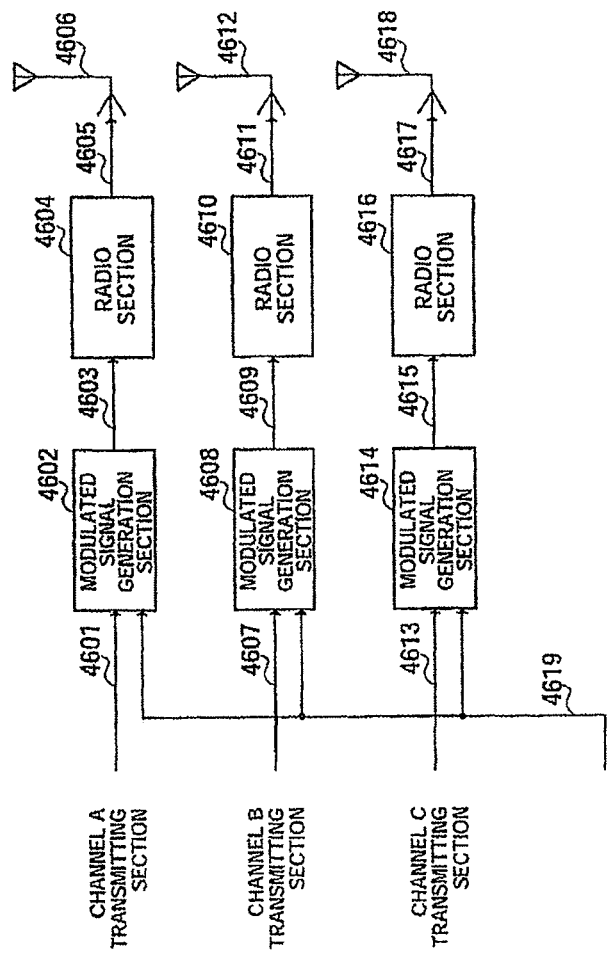
FIG. 47 is a drawing showing an example of the configuration of a base station transmitting apparatus according to Embodiment 10 of the present invention.

FIG. 47 is a drawing showing an example of the configuration of a base station transmitting apparatus according to Embodiment 10 of the present invention. In FIG. 47, a modulated signal generation section 4602 modulates a channel A transmit digital signal 4601, configures a frame indicated by a frame configuration signal 4619, and outputs a modulated signal 4603 with a frame configuration in accordance with frame configuration signal 4619 to a radio section 4604.

Radio section 4604 converts modulated signal 4603 to radio frequency, and a transmit signal 4605 is output as a radio wave from an antenna 4606.

A modulated signal generation section 4608 modulates a channel B transmit digital signal 4607, configures a frame indicated by frame configuration signal 4619, and outputs a modulated signal 4609 with a frame configuration in accordance with frame configuration signal 4619 to a radio section 4610.

Radio section 4610 converts modulated signal 4609 to radio frequency, and a transmit signal 4611 is output as a radio wave from an antenna 4612.

A modulated signal generation section 4614 modulates a channel C transmit digital signal 4613, configures a frame indicated by frame configuration signal 4619, and outputs a modulated signal 4615 with a frame configuration in accordance with frame configuration signal 4619 to a radio section 4616.

Radio section 4616 converts modulated signal 4615 to radio frequency, and a transmit signal 4617 is output as a radio wave from an antenna 4618.

By this means, modulated signals of three channels are multiplexed and transmitted at the same frequency.

Figure 48:
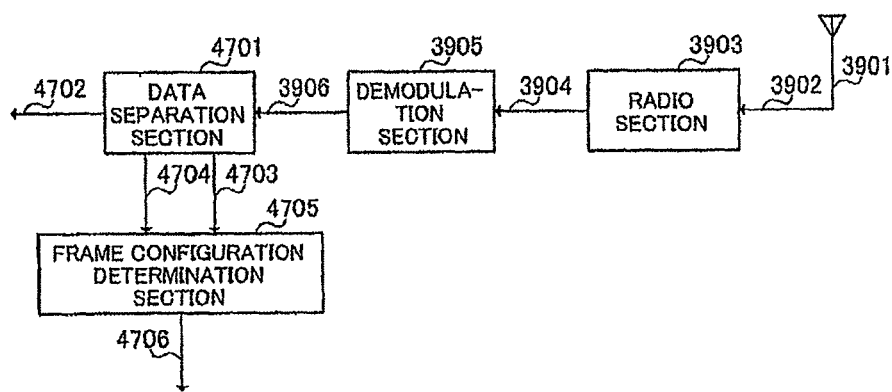
FIG. 48 is a drawing showing an example of the configuration of a base station receiving apparatus according to Embodiment 10 of the present invention.

FIG. 48 is a drawing showing an example of the configuration of a base station receiving apparatus according to Embodiment 10 of the present invention. Parts in FIG. 48 identical to those in FIG. 40 are assigned the same reference numerals as in FIG. 40, and detailed descriptions thereof are omitted.

A data separation section 4701 separates a received digital signal 3906 into receive data, antenna information, and radio wave propagation environment estimation information, outputs receive data 4702, and outputs an antenna information signal 4703 and radio wave propagation environment estimation signal 4704 to a frame configuration determination section 4705.

Frame configuration determination section 4705 determines the frame configuration based on antenna information signal 4703 and radio wave propagation environment estimation signal 4704, and outputs a frame configuration signal 4706.

Figure 49:
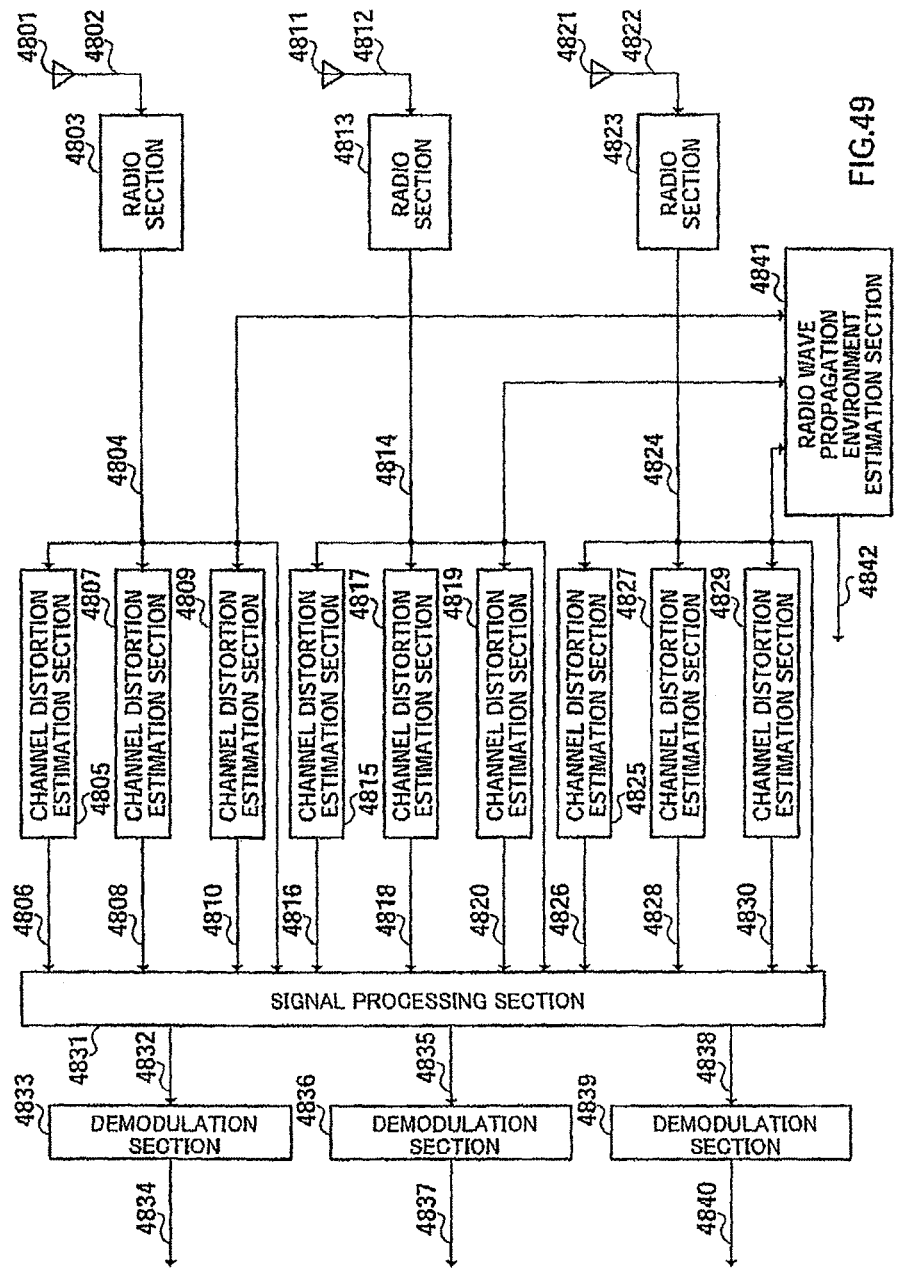
FIG. 49 is a drawing showing an example of the configuration of a terminal receiving apparatus according to Embodiment 10 of the present invention.

FIG. 49 is a drawing showing an example of the configuration of a terminal receiving apparatus according to Embodiment 10 of the present invention. In FIG. 49, a radio section 4803 converts a received signal 4802 received by an antenna 4801 to baseband frequency, and outputs a received quadrature baseband signal 4804 to a channel distortion estimation section 4805, channel distortion estimation section 4807, and channel distortion estimation section 4809.

Channel distortion estimation section 4805 outputs a channel A channel distortion estimation signal 4806 from received quadrature baseband signal 4804 to a signal processing section 4831.

Channel distortion estimation section 4807 outputs a channel B channel distortion estimation signal 4808 from received quadrature baseband signal 4804 to signal processing section 4831.

Channel distortion estimation section 4809 outputs a channel C channel distortion estimation signal 4810 from received quadrature baseband signal 4804 to signal processing section 4831.

A radio section 4813 converts a received signal 4812 received by an antenna 4811 to baseband frequency, and outputs a received quadrature baseband signal 4814 to a channel distortion estimation section 4815, channel distortion estimation section 4817, and channel distortion estimation section 4819.

Channel distortion estimation section 4815 has received quadrature baseband signal 4814 as input, and outputs a channel A channel distortion estimation signal 4816 to signal processing section 4831.

Channel distortion estimation section 4817 has received quadrature baseband signal 4814 as input, and outputs a channel B channel distortion estimation signal 4818 to signal processing section 4831.

Channel distortion estimation section 4819 has received quadrature baseband signal 4814 as input, and outputs a channel C channel distortion estimation signal 4820 to signal processing section 4831.

A radio section 4823 has a received signal 4822 received by an antenna 4821 as input, and outputs a received quadrature baseband signal 4824 to a channel distortion estimation section 4825, channel distortion estimation section 4827, and channel distortion estimation section 4829.

Channel distortion estimation section 4825 has received quadrature baseband signal 4824 as input, and outputs a channel A channel distortion estimation signal 4826 to signal processing section 4831.

Channel distortion estimation section 4827 has received quadrature baseband signal 4824 as input, and outputs a channel B channel distortion estimation signal 4828 to signal processing section 4831.

Channel distortion estimation section 4829 has received quadrature baseband signal 4824 as input, and outputs a channel C channel distortion estimation signal 4830 to signal processing section 4831.

Signal processing section 4831 has received quadrature baseband signals 4804, 4814, and 4824, channel A channel distortion estimation signals 4806, 4816, and 4826, channel B channel distortion estimation signals 4808, 4818, and 4828, and channel C channel distortion estimation signals 4810, 4820, and 4830 as input, performs inverse matrix computations, and outputs a channel A received quadrature baseband signal 4832 to a demodulation section 4833, a channel B received quadrature baseband signal 4835 to a demodulation section 4836, and a channel C received quadrature baseband signal 4838 to a demodulation section 4839.

Demodulation section 4833 demodulates channel A received quadrature baseband signal 4832, and outputs a received digital signal 4834.

Demodulation section 4836 demodulates channel B received quadrature baseband signal 4835, and outputs a received digital signal 4837.

Demodulation section 4839 demodulates channel C received quadrature baseband signal 4838, and outputs a received digital signal 4840.

A radio wave propagation environment estimation section 4841 estimates the radio wave propagation environment from received quadrature baseband signals 4804, 4814, and 4824, and outputs a radio wave propagation environment estimation signal 4842.

Figure 50:
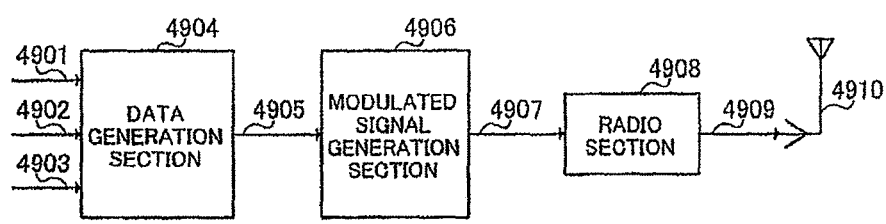
FIG. 50 is a drawing showing an example of the configuration of a terminal transmitting apparatus according to Embodiment 10 of the present invention.

FIG. 50 is a drawing showing an example of the configuration of a terminal transmitting apparatus according to Embodiment 10 of the present invention. In FIG. 50, a data generation section 4904 generates a transmit digital signal 4905 from transmit data 4901, antenna information 4902, which is information on the number of antennas the terminal has for receiving, and radio wave propagation environment estimation signal 4903, and outputs transmit digital signal 4905 to a modulated signal generation section 4906.

Modulated signal generation section 4906 modulates transmit digital signal 4905, and outputs a transmit quadrature baseband signal 4907 to a radio section 4908.

Radio section 4908 converts transmit quadrature baseband signal 4907 to radio frequency, and a transmit signal 4909 is output as a radio wave from an antenna 4910.

Figure 51:
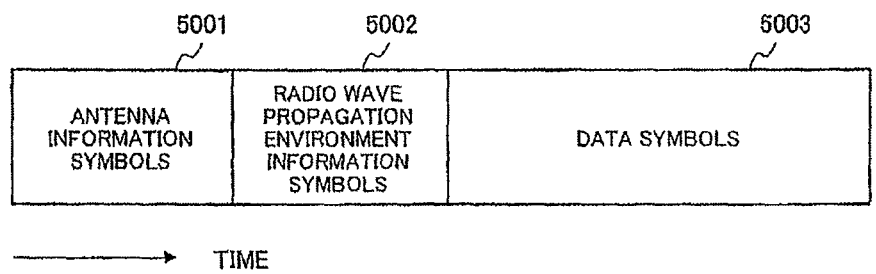
FIG. 51 is a drawing showing an example of the frame configuration of a modulated signal transmitted by a terminal according to Embodiment 10 of the present invention.

FIG. 51 is a drawing showing an example of the frame configuration of a modulated signal transmitted by a terminal according to Embodiment 10 of the present invention. In FIG. 51, reference numeral 5001 indicates antenna information symbols, reference numeral 5002 indicates radio wave propagation environment symbols, and reference numeral 5003 indicates data symbols.

Figure 52:
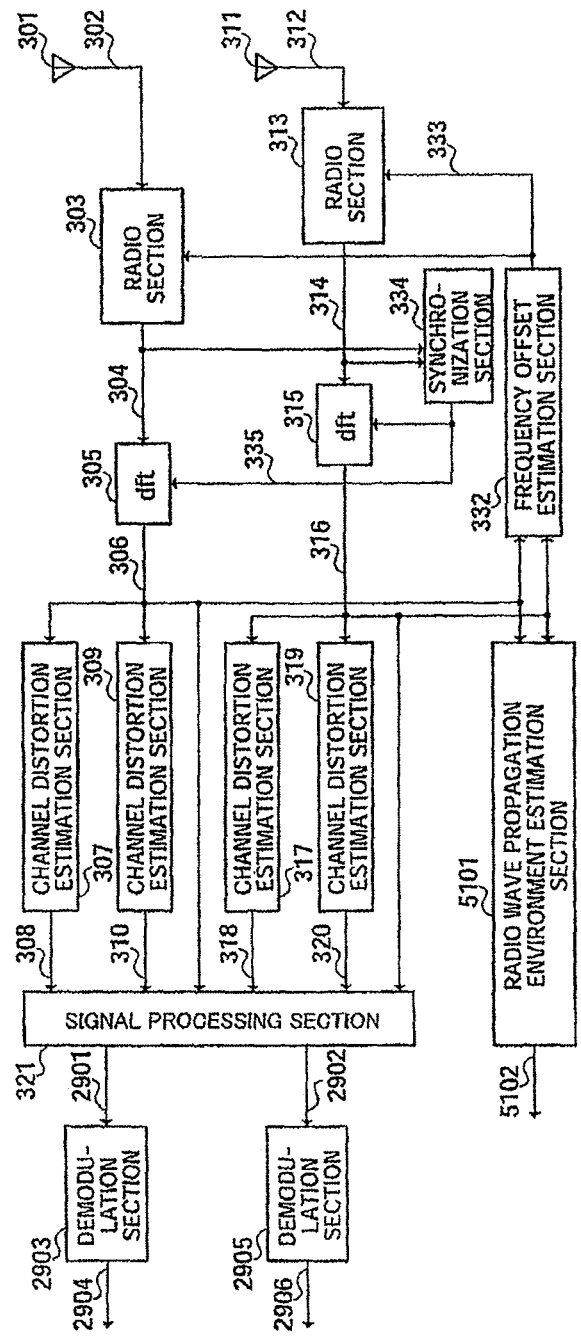
FIG. 52 is a drawing showing an example of the configuration of a terminal receiving apparatus according to Embodiment 10 of the present invention.

FIG. 52 is a drawing showing an example of the configuration of a terminal receiving apparatus according to Embodiment 10 of the present invention. Parts in FIG. 52 identical to those in FIG. 4 or FIG. 30 are assigned the same reference numerals as in FIG. 4 or FIG. 30, and detailed descriptions thereof are omitted.

In FIG. 52, a radio wave propagation environment estimation section 5101 estimates the radio wave propagation environment from post-Fourier-transform signals 306 and 316, and outputs a radio wave propagation environment estimation signal 5102.

Using FIG. 45, FIG. 46, FIG. 47, FIG. 48, FIG. 49, FIG. 50, FIG. 51, and FIG. 52, a description will now be given of a communication method whereby a radio communication apparatus that receives information on the number of antennas provided from a communicating party, is provided with a plurality of antennas, and has a function that transmits a plurality of channels, transmits modulated signals of a number of channels in accordance with information on the number of antennas.

The configuration of a terminal that can receive three channels is described below.

FIG. 49 shows a terminal receiving apparatus that can receive signals of channels A, B, and C. FIG. 50 shows the terminal transmitting apparatus, in which data generation section 4904 has, as input, transmit data 4901, antenna information 4902, which is information indicating that three antennas are provided or that 3-channel multiplex signals can be received, and a radio wave propagation environment estimation signal 4903, and outputs transmit digital signal 4905 in accordance with the frame configuration in FIG. 51. At this time, radio wave propagation environment estimation signal 4903 in FIG. 50 corresponds to radio wave propagation environment estimation signal 4842 in FIG. 49.

FIG. 52 shows a terminal receiving apparatus that can receive signals of channels A and B. FIG. 50 shows the terminal transmitting apparatus, in which data generation section 4904 has, as input, transmit data 4901, antenna information 4902, which is information indicating that two antennas are provided or that 2-channel multiplex signals can be received, and a radio wave propagation environment estimation signal 4903, and outputs transmit digital signal 4905 in accordance with the frame configuration in FIG. 51. At this time, radio wave propagation environment estimation signal 4903 in FIG. 50 corresponds to radio wave propagation environment estimation signal 5102 in FIG. 52.

The configuration of a base station will now be described.

FIG. 48 shows a base station receiving apparatus. At this time, it is assumed that, for example, communication is being performed with a terminal capable of demodulating channels A, B, and C as shown in FIG. 49. Data separation section 4701 has a received digital signal as input, separates data transmitted from the terminal with the frame configuration in FIG. 51, and outputs receive data 4702, antenna information signal 4703, and radio wave propagation environment estimation signal 4704. Here, antenna information signal 4703 is information indicating that three antennas are provided or that 3-channel multiplex signals can be received.

Frame configuration determination section 4705 has antenna information signal 4703 and radio wave propagation environment estimation signal 4704 as input, determines frame configurations based on antenna information signal 4703 and radio wave propagation environment estimation signal 4704, and outputs frame configuration signal 4706. Here, the frame configurations based on antenna information signal 4703 indicating that three antennas are provided or that 3-channel multiplex signals can be received are as shown in FIG. 45.

In FIG. 45, since the terminal that is the communicating party can receive three channels, when radio wave propagation environment estimation signal 4704 indicates that the radio wave propagation environment is good, signals of three channels are multiplexed and transmitted, as at times 3, 6, 7, and 10, for example. When the radio wave propagation environment is fair, signals of two channels are multiplexed and transmitted, as at times 4 and 5. When the radio wave propagation environment is poor, a signal of one channel is transmitted, as at times 8 and 9.

The base station transmitting apparatus in FIG. 47 transmits modulated signals based on FIG. 45 frame configurations contained in frame configuration signal 4619.

Next, the situation when communication is performed with a terminal capable of modulating channels A and B will be described.

In the base station receiving apparatus in FIG. 48, data separation section 4701 has a received digital signal as input, separates data transmitted from the terminal with the frame configuration in FIG. 51, and outputs receive data 4702, antenna information signal 4703, and radio wave propagation environment estimation signal 4704. Here, antenna information signal 4703 is information indicating that two antennas are provided or that 2-channel multiplex signals can be received.

Frame configuration determination section 4705 has antenna information signal 4703 and radio wave propagation environment estimation signal 4704 as input, determines frame configurations based on antenna information signal 4703 and radio wave propagation environment estimation signal 4704, and outputs frame configuration signal 4706. Here, the frame configurations based on antenna information signal 4703 indicating that two antennas are provided or that 2-channel multiplex signals can be received are as shown in FIG. 46.

In FIG. 46, since the terminal that is the communicating party can receive two channels, when radio wave propagation environment estimation signal 4704 indicates that the radio wave propagation environment is good, signals of two channels are multiplexed and transmitted, as at times 3, 4, 5, 7, and 10, for example. When the radio wave propagation environment is poor, a signal of one channel is transmitted, as at times 6, 8, and 9.

The base station transmitting apparatus in FIG. 47 transmits modulated signals based on FIG. 46 frame configurations contained in frame configuration signal 4619.

The configurations of the transmitting apparatus and receiving apparatus above are not limited to the configurations in FIG. 47, FIG. 48, FIG. 49, FIG. 50, or FIG. 52. Also, in FIG. 47, a configuration has been illustrated that has three antennas and is capable of multiplexing three channels, but the present invention is not limited to this. Furthermore, an example has been described in which OFDM is used as the communication method, but it is possible to implement the present invention similarly with a multicarrier method, a spread spectrum communication method, or a single-carrier method. Moreover, a spread spectrum communication method may be used as the method for each carrier in a multicarrier system. Thus, it is possible to implement the present invention similarly with OFDM-CDM.

Furthermore, there are also cases where one antenna is composed of a plurality of antennas.

Thus, according to a transmitting apparatus and receiving apparatus of this embodiment, by dynamically changing the number of multiplex channels by using a communication method whereby a radio communication apparatus that receives information on the number of antennas provided from a communicating party, is provided with a plurality of antennas, and has a function that transmits a plurality of channels, transmits modulated signals of a number of channels in accordance with information on the number of antennas, it is possible to achieve compatibility between data transmission speed and received data quality.

Embodiment 11

In Embodiment 11 of the present invention, a description is given of a communication method whereby, in a communication method in which modulated signals of a plurality of channels are transmitted from a plurality of antennas, the first channel is used as a pilot channel, the pilot channel modulation method is changed to one or another PSK modulation method according to the radio wave propagation environment or the like, and the modulation method for other than the first channel is changed to one or another modulation method according to the radio wave propagation environment or the like.

Using FIG. 3, FIG. 19, FIG. 27, FIG. 29, FIG. 48, FIG. 50, and FIG. 52, a description will now be given of a communication method whereby, in a communication method in which modulated signals of a plurality of channels are transmitted from a plurality of antennas, the first channel is used as a pilot channel, the pilot channel modulation method is changed to one or another PSK modulation method according to the radio wave propagation environment or the like, and the modulation method for other than the first channel is changed to one or another modulation method according to the radio wave propagation environment or the like.

The configuration of a terminal receiving apparatus is as shown in FIG. 52, in which radio wave propagation environment estimation section 5101 estimates the radio wave propagation environment from post-Fourier-transform signals 306 and 316, and outputs a radio wave propagation environment estimation signal.

The configuration of a terminal transmitting apparatus is as shown in FIG. 50, in which data generation section 4904 has transmit data 4901, antenna information 4902, and a radio wave propagation environment estimation signal 4903 as input, and configures and outputs transmit digital signal 4905 in accordance with the frame configuration in FIG. 51. At this time, radio wave propagation environment estimation signal 4903 corresponds to radio wave propagation environment estimation signal 5102 in FIG. 52.

The configuration of a base station receiving apparatus is as shown in FIG. 48, in which data separation section 4701 separates received digital signal 3906 into receive data 4702, antenna information signal 4703, and radio wave propagation environment estimation signal 4704 in accordance with the frame configuration in FIG. 51, and outputs receive data 4702, antenna information signal 4703, and radio wave propagation environment estimation signal 4704. Frame configuration determination section 4705 has antenna information signal 4703 and radio wave propagation environment estimation signal 4704 as input, and changes the modulation method in accordance with radio wave propagation environment estimation signal 4704, for example.

At this time, if channel A is a pilot channel in the FIG. 19, FIG. 27, or FIG. 29 frame configurations, a modulation method change is performed only for channel B. This is because, when channel B is demodulated, it is demodulated based on a channel A signal, and therefore it is preferable for the channel A modulation method to be fixed.

Alternatively, the modulation methods to which a change can be made for channel B are not limited, but the modulation method to which a change can be made for channel A is limited to a PSK method. This is because PSK modulation has no amplitude fluctuations, and it is therefore possible to demodulate channel B.

Also, communication control can be performed accurately by transmitting important information for performing communication control by means of channel A PSK modulation. For example, it is possible to use PSK modulation only for channel A for this purpose, transmit data by means of channel B, and change the modulation method in order to achieve compatibility between data transmission speed and received data quality.

The configurations of the transmitting apparatus and receiving apparatus above are not limited to the configurations in FIG. 3, FIG. 48, FIG. 50, or FIG. 52. Also, in the frame configurations in FIG. 19, FIG. 27, multiplex frames with two channels and two antennas have been illustrated, but the present invention is not limited to this. For example, it is possible for the transmitting apparatus to transmit multiplex frames using three channels and three antennas. Also, an example has been described in which OFDM is used as the communication method, but it is possible to implement the present invention similarly with a multicarrier method, a spread spectrum communication method, or a single-carrier method, and a spread spectrum communication method may be used as the method for each carrier in a multicarrier system. Thus, it is possible to implement the present invention similarly with OFDM-CDM.

Furthermore, there are also cases where one antenna is composed of a plurality of antennas.

Thus, according to a transmitting apparatus and receiving apparatus of this embodiment, by changing the modulation method according to the radio wave propagation environment by using a communication method whereby, in a communication method in which modulated signals of a plurality of channels are transmitted from a plurality of antennas, the first channel is used as a pilot channel, the pilot channel modulation method is changed to one or another PSK modulation method according to the radio wave propagation environment or the like, and the modulation method for other than the first channel is changed to one or another modulation method according to the radio wave propagation environment or the like, it is possible to achieve compatibility between data transmission speed and received data quality.

Embodiment 12

In Embodiment 12 of the present invention, a description is given of a method whereby an antenna to be used for transmission is selected based on radio wave propagation environment estimation information from the communicating party, and a method whereby an antenna to be used for reception by the communicating party is determined based on radio wave propagation environment information from the communicating party, and reported to the communicating party.

Figure 53:
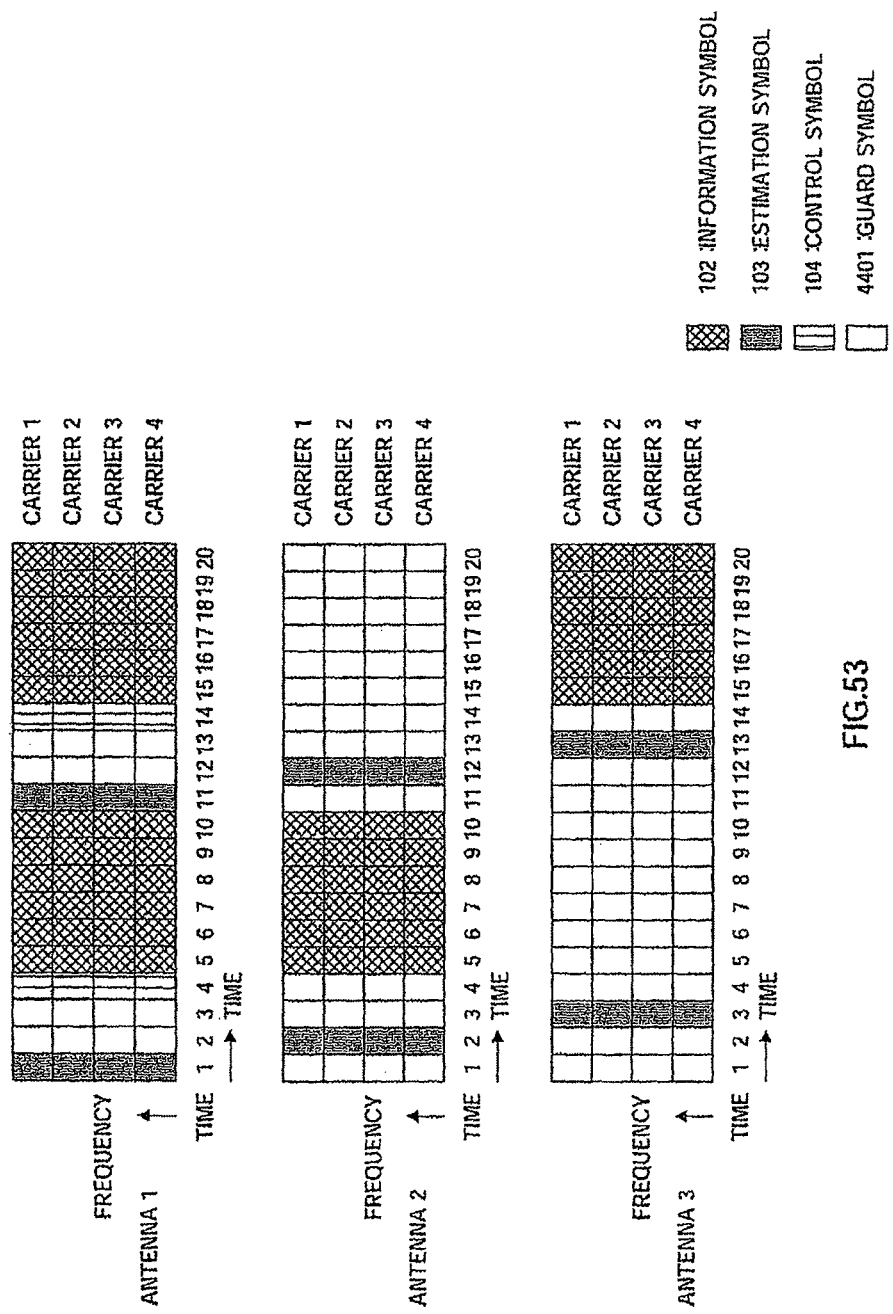
FIG. 53 is a block diagram showing an example of base station transmit signal frame configurations according to Embodiment 12 of the present invention.

FIG. 53 is a block diagram showing an example of base station transmit signal frame configurations according to Embodiment 12 of the present invention. Parts in FIG. 53 identical to those in FIG. 2 or FIG. 45 are assigned the same reference numerals as in FIG. 2 or FIG. 45, and detailed descriptions thereof are omitted.

Figure 54:
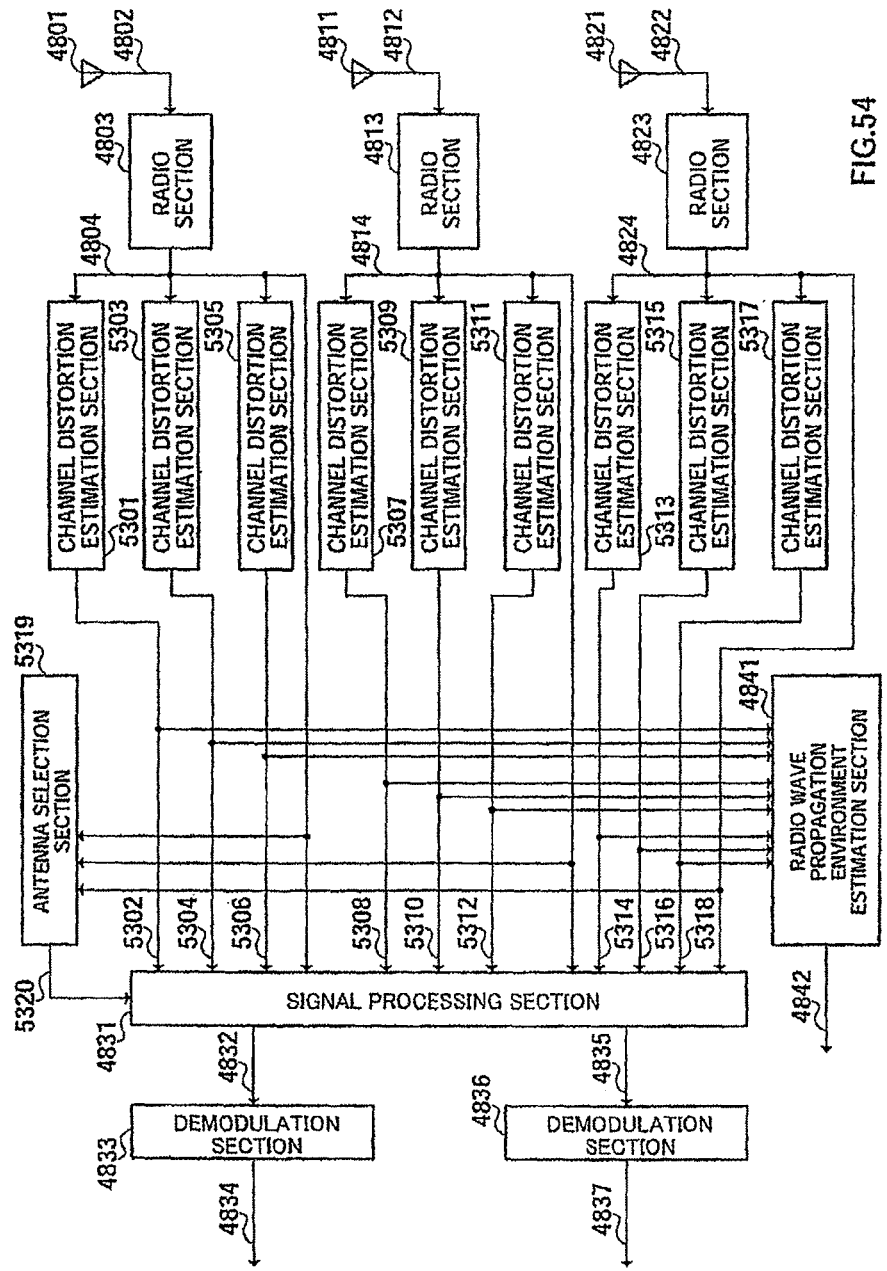
FIG. 54 is a drawing showing an example of the configuration of a terminal receiving apparatus according to Embodiment 12 of the present invention.

FIG. 54 is a drawing showing an example of the configuration of a terminal receiving apparatus according to Embodiment 12 of the present invention. Parts in FIG. 54 identical to those in FIG. 49 are assigned the same reference numerals as in FIG. 49, and detailed descriptions thereof are omitted.

Using received quadrature baseband signal 4804, a channel distortion estimation section 5301 estimates channel distortion of a transmit signal transmitted from transmitting antenna 1, and outputs a transmitting antenna 1 channel distortion estimation signal 5302 to a radio wave propagation environment estimation section 4841.

Using received quadrature baseband signal 4804, a channel distortion estimation section 5303 estimates channel distortion of a transmit signal transmitted from transmitting antenna 2, and outputs a transmitting antenna 2 channel distortion estimation signal 5304 to radio wave propagation environment estimation section 4841.

Using received quadrature baseband signal 4804, a channel distortion estimation section 5305 estimates channel distortion of a transmit signal transmitted from transmitting antenna 3, and outputs a transmitting antenna 3 channel distortion estimation signal 5306 to radio wave propagation environment estimation section 4841.

Using received quadrature baseband signal 4814, a channel distortion estimation section 5307 estimates channel distortion of a transmit signal transmitted from transmitting antenna 1, and outputs a transmitting antenna 1 channel distortion estimation signal 5308 to radio wave propagation environment estimation section 4841.

Using received quadrature baseband signal 4814, a channel distortion estimation section 5309 estimates channel distortion of a transmit signal transmitted from transmitting antenna 2, and outputs a transmitting antenna 2 channel distortion estimation signal 5310 to radio wave propagation environment estimation section 4841.

Using received quadrature baseband signal 4814, a channel distortion estimation section 5311 estimates channel distortion of a transmit signal transmitted from transmitting antenna 3, and outputs a transmitting antenna 3 channel distortion estimation signal 5312 to radio wave propagation environment estimation section 4841.

Using received quadrature baseband signal 4824, a channel distortion estimation section 5313 estimates channel distortion of a transmit signal transmitted from transmitting antenna 1, and outputs a transmitting antenna 1 channel distortion estimation signal 5314 to radio wave propagation environment estimation section 4841.

Using received quadrature baseband signal 4824, a channel distortion estimation section 5315 estimates channel distortion of a transmit signal transmitted from transmitting antenna 2, and outputs a transmitting antenna 2 channel distortion estimation signal 5316 to radio wave propagation environment estimation section 4841.

Using received quadrature baseband signal 4824, a channel distortion estimation section 5317 estimates channel distortion of a transmit signal transmitted from transmitting antenna 3, and outputs a transmitting antenna 3 channel distortion estimation signal 5318 to radio wave propagation environment estimation section 4841.

Radio wave propagation environment estimation section 4841 estimates the radio wave propagation environment from transmitting antenna 1 channel distortion estimation signals 5302, 5308, and 5314, transmitting antenna 2 channel distortion estimation signals 5304, 5310, and 5316, and transmitting antenna 3 channel distortion estimation signals 5306, 5312, and 5318, and outputs the result as radio wave propagation environment estimation information signal 4842.

An antenna selection section 5319 has received quadrature baseband signals 4804, 4814, and 4824 as input, selects input from an antenna to be used for demodulation, and outputs this as antenna selection signal 5320.

Figure 55:
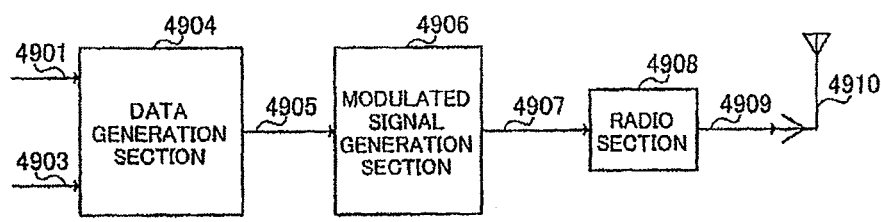
FIG. 55 is a drawing showing an example of the configuration of a terminal transmitting apparatus according to Embodiment 11 of the present invention.

FIG. 55 is a drawing showing an example of the configuration of a terminal transmitting apparatus according to Embodiment 11 of the present invention. Parts in FIG. 55 identical to those in FIG. 50 are assigned the same reference numerals as in FIG. 50, and detailed descriptions thereof are omitted.

Figure 56:
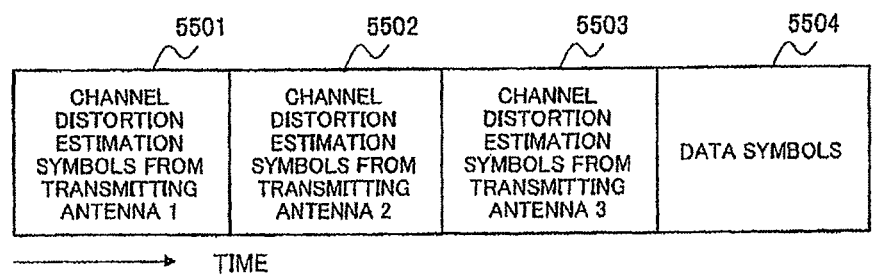
FIG. 56 is a drawing showing an example of the frame configuration of a modulated signal transmitted by a terminal according to this embodiment.

FIG. 56 is a drawing showing an example of the frame configuration of a modulated signal transmitted by a terminal according to this embodiment. In FIG. 56, reference numeral 5501 indicates channel distortion estimation symbols from transmitting antenna 1, reference numeral 5502 indicates channel distortion estimation symbols from transmitting antenna 2, reference numeral 5503 indicates channel distortion estimation symbols from transmitting antenna 3, and reference numeral 5504 indicates data symbols.

Figure 57:
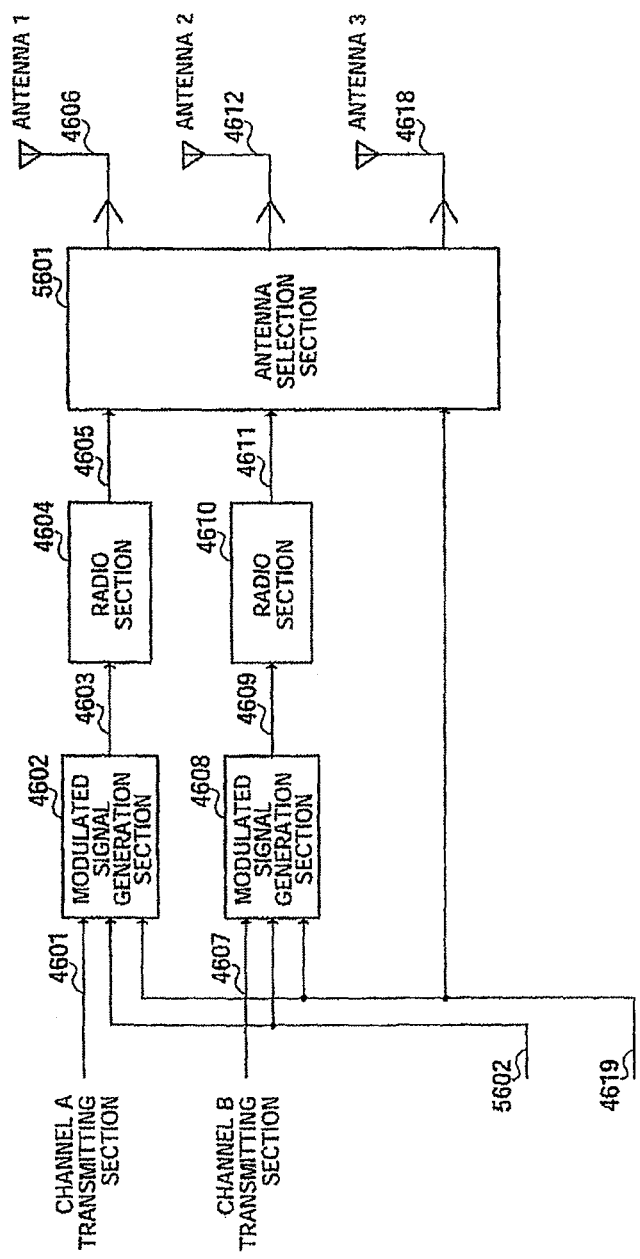
FIG. 57 is a drawing showing an example of the configuration of a base station transmitting apparatus according to Embodiment 11 of the present invention.

FIG. 57 is a drawing showing an example of the configuration of a base station transmitting apparatus according to Embodiment 11 of the present invention. Parts in FIG. 57 identical to those in FIG. 47 are assigned the same reference numerals as in FIG. 47, and detailed descriptions thereof are omitted. Reference numeral 5602 indicates antenna information used by a terminal for reception.

An antenna selection section 5601 outputs transmit signals 4605 and 4611 as radio waves from antenna 4606, 4612, or 4618, in accordance with the frame configuration indicated by frame configuration signal 4619.

Figure 58:
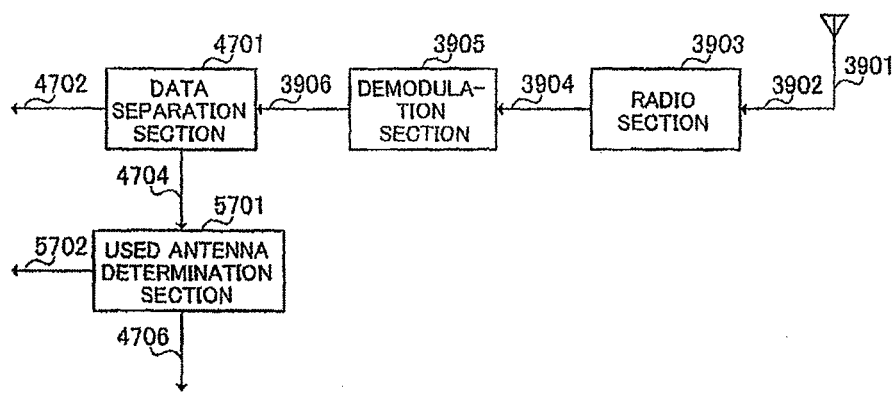
FIG. 58 is a drawing showing an example of the configuration of a base station receiving apparatus according to Embodiment 11 of the present invention.

FIG. 58 is a drawing showing an example of the configuration of a base station receiving apparatus according to Embodiment 11 of the present invention. A used antenna determination section 5701 has radio wave propagation environment estimation signal 4704 as input, and outputs frame configuration signal 4706 and antenna information 5702 used by a terminal for reception.

Figure 59:
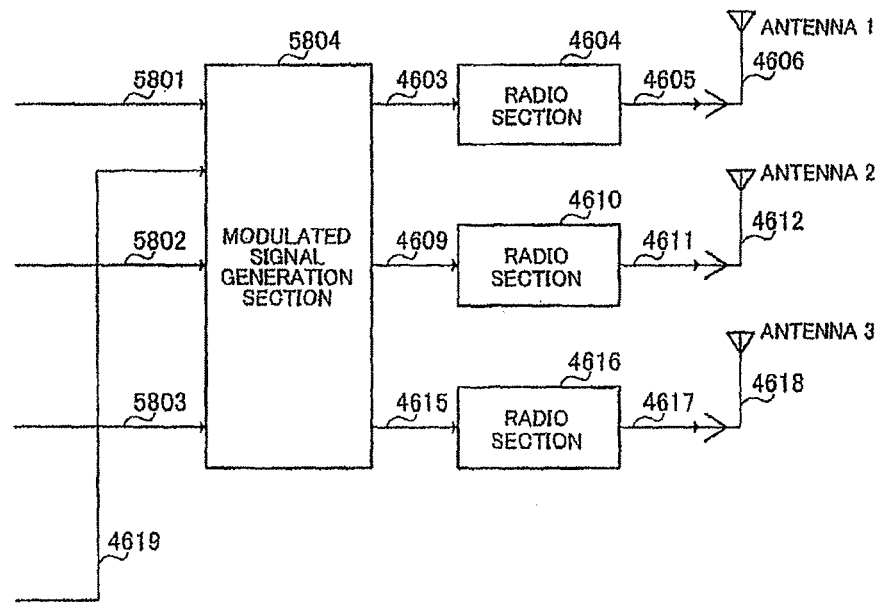
FIG. 59 is a drawing showing an example of the configuration of a base station transmitting apparatus according to Embodiment 11 of the present invention.

FIG. 59 is a drawing showing an example of the configuration of a base station transmitting apparatus according to Embodiment 11 of the present invention. Parts in FIG. 59 identical to those in FIG. 47 are assigned the same reference numerals as in FIG. 47, and detailed descriptions thereof are omitted.

In FIG. 59, a modulated signal generation section 5804 has a channel A transmit digital signal 5801, channel B transmit digital signal 5802, antenna information 5803 used by a terminal for reception, and frame configuration information 4619 as input, and generates and outputs transmit quadrature baseband signals 4603, 4609, and 4615 in accordance with frame configuration information 4619.

Using FIG. 53, FIG. 54, FIG. 55, FIG. 56, FIG. 57, FIG. 58, and FIG. 59, a description will now be given of a method whereby an antenna to be used for transmission is selected based on radio wave propagation environment estimation information from the communicating party, and a method whereby an antenna to be used for reception by the communicating party is determined based on radio wave propagation environment information from the communicating party, and reported to the communicating party.

For example, in order to estimate the radio wave propagation environment in a terminal receiving apparatus, the base station transmitting apparatus in FIG. 57 or FIG. 59 transmits estimation symbols 103 as in times 1, 2, and 3, and times 11, 12, and 13, in FIG. 53.

Then, transmitting antenna 1 channel distortion estimation section 5301 of the terminal receiving apparatus in FIG. 54 has received quadrature baseband signal 4804 as input, estimates channel distortion of a signal transmitted from antenna 1—that is, antenna 4606—in FIG. 47 from time 1 and 11 estimation symbols 103, and outputs transmitting antenna 1 channel distortion estimation signal 5302.

Similarly, transmitting antenna 1 channel distortion estimation section 5307 of the receiving apparatus has received quadrature baseband signal 4814 as input, estimates channel distortion of a signal transmitted from antenna 1—that is, antenna 4606—in FIG. 47 from time 1 and 11 estimation symbols 103, and outputs transmitting antenna 1 channel distortion estimation signal 5208.

Similarly, transmitting antenna 1 channel distortion estimation section 5313 of the receiving apparatus has received quadrature baseband signal 4824 as input, estimates channel distortion of a signal transmitted from antenna 1—that is, antenna 4606—in FIG. 47 from time 1 and 11 estimation symbols 103, and outputs transmitting antenna 1 channel distortion estimation signal 5214.

Transmitting antenna 2 channel distortion estimation section 5303 of the receiving apparatus has received quadrature baseband signal 4804 as input, estimates channel distortion of a signal transmitted from antenna 2—that is, antenna 4612—in FIG. 47 from time 2 and 12 estimation symbols 103, and outputs transmitting antenna 2 channel distortion estimation signal 5304.

Similarly, transmitting antenna 2 channel distortion estimation section 5309 of the receiving apparatus has received quadrature baseband signal 4814 as input, estimates channel distortion of a signal transmitted from antenna 2—that is, antenna 4612—in FIG. 47 from time 2 and 12 estimation symbols 103, and outputs transmitting antenna 2 channel distortion estimation signal 5310.

Similarly, transmitting antenna 2 channel distortion estimation section 5315 of the receiving apparatus has received quadrature baseband signal 4824 as input, estimates channel distortion of a signal transmitted from antenna 2—that is, antenna 4612—in FIG. 59 from time 2 and 12 estimation symbols 103, and outputs transmitting antenna 2 channel distortion estimation signal 5316.

Transmitting antenna 3 channel distortion estimation section 5305 of the receiving apparatus has received quadrature baseband signal 4804 as input, estimates channel distortion of a signal transmitted from antenna 3—that is, antenna 4618—in FIG. 59 from time 3 and 13 estimation symbols 103, and outputs transmitting antenna 3 channel distortion estimation signal 5306.

Similarly, transmitting antenna 3 channel distortion estimation section 5311 of the receiving apparatus has received quadrature baseband signal 4814 as input, estimates channel distortion of a signal transmitted from antenna 3—that is, antenna 4618—in FIG. 59 from time 3 and 13 estimation symbols 103, and outputs transmitting antenna 3 channel distortion estimation signal 5312.

Similarly, transmitting antenna 3 channel distortion estimation section 5317 of the receiving apparatus has received quadrature baseband signal 4824 as input, estimates channel distortion of a signal transmitted from antenna 3—that is, antenna 4618—in FIG. 59 from time 3 and 13 estimation symbols 103, and outputs transmitting antenna 3 channel distortion estimation signal 5318.

Then, radio wave propagation environment estimation section 4841 has transmitting antenna 1 channel distortion estimation signals 5302, 5308, and 5314, transmitting antenna 2 channel distortion estimation signals 5304, 5310, and 5316, and transmitting antenna 3 channel distortion estimation signals 5306, 5312, and 5318 as input, and outputs radio wave propagation environment estimation signal 4842.

FIG. 55 shows a terminal transmitting apparatus, in which data generation section 4904 has transmit data 4901 and radio wave propagation environment estimation signal 4903 as input, and outputs transmit digital signal 4905 in accordance with the frame configuration in FIG. 56. At this time, radio wave propagation environment estimation signal 4903 corresponds to radio wave propagation environment estimation signal 4842 in FIG. 54.

FIG. 58 shows a base station receiving apparatus, in which data separation section 4701 has transmit digital signal 4905 in accordance with the frame configuration in FIG. 56 as input, separates this into data and a radio wave propagation environment estimation signal, and outputs receive data 4702 and radio wave propagation environment estimation signal 4704.

Used antenna determination section 5701 has radio wave propagation environment estimation signal 4704 as input, determines an antenna to be used by the base station for transmitting a modulated signal based on radio wave propagation environment estimation signal 4704, and outputs this as frame configuration signal 4706. An antenna used by a terminal for reception is determined based on the kind of frame configurations in FIG. 53 and radio wave propagation environment estimation signal 4704, for example, and antenna information 5702 used by a terminal for reception is output.

FIG. 59 shows an example of the configuration of a base station transmitting apparatus, in which modulated signal generation section 5804 has channel A transmit digital signal 5801, channel B transmit digital signal 5802, antenna information 5803 used by a terminal for reception, and frame configuration information 4619 as input, and outputs transmit quadrature baseband signals 4603, 4609, and 4615—for example, transmitting antenna information used by a terminal for reception at time 4 antenna 1 in FIG. 53, and transmitting modulated signals from antenna 1 and antenna 2 in times 5 to 10. At this time, frame configuration signal 4619 corresponds to frame configuration signal 4706 in FIG. 58, and antenna information 5803 used by a terminal for reception corresponds to antenna information 5702 used by a terminal for reception in FIG. 58.

FIG. 57 shows a base station transmitting apparatus configuration that differs from that in FIG. 59. In FIG. 57, antenna selection section 5601 has transmit signals 4605 and 4611, and frame configuration signal 4619, as input, and selects output by antenna 1, antenna 2, or antenna 3, in accordance with FIG. 53 frame configurations, and transmit signals 4605 and 4611 are output as radio waves from antenna 1, antenna 2, or antenna 3.

The configurations of the transmitting apparatus and receiving apparatus above are not limited to the configurations in FIG. 48, FIG. 54, FIG. 55, FIG. 57, or FIG. 59. Also, in the frame configurations in FIG. 53, FIG. 27, multiplex frames with two channels and three antennas have been illustrated, but the present invention is not limited to this. For example, it is possible for the present invention to be similarly implemented with a transmitting apparatus transmitting multiplex frames using three channels and four antennas. Also, an example has been described in which OFDM is used as the communication method, but it is possible to implement the present invention similarly with a multicarrier method, a spread spectrum communication method, or a single-carrier method, and a spread spectrum communication method may be used as the method for each carrier in a multicarrier system. Thus, it is possible to implement the present invention similarly with OFDM-CDM. Moreover, an example of communication between one base station and one terminal has been described, but it is possible to implement the present invention similarly for one base station and n terminals.

Furthermore, there are also cases where one antenna is composed of a plurality of antennas.

Thus, according to a transmitting apparatus and receiving apparatus of this embodiment, data received data quality is improved by selecting a transmitting/receiving antenna with the best multiplex signal separation precision by using a method whereby an antenna to be used for transmission is selected based on radio wave propagation environment estimation information from the communicating party, and a method whereby an antenna to be used for reception by the communicating party is determined based on radio wave propagation environment information from the communicating party, and reported to the communicating party.

Embodiment 13

In Embodiment 13 of the present invention, a description is given of a pilot symbol transmission method in a MIMO (Multi-Input Multi-Output) system in which modulated signals of a plurality of channels are transmitted from a plurality of antennas at the same frequency, and are received by a plurality of antennas and demodulated.

In a MIMO system, when channel state information (CSI) is known not only in the receiving station but also on the transmitting side, a communication method can be implemented whereby the transmitting station transmits a signal vectored using a transmission channel signature vector to the receiving station from a transmitting array antenna, and the receiving station detects the transmit signal using a reception channel signature vector corresponding to the transmission channel signature vector from a received signal at a receiving array antenna, and demodulates the signal.

In particular, as a communication mode in which a plurality of channels are configured and multiplex transmission of signals is performed in the communication space, there is an eigenmode that uses a channel matrix singular vector or eigen vector. This eigenmode is a method that uses these singular vectors or eigen vectors as aforementioned channel signature vectors. A channel matrix here is a matrix that has complex channel coefficients of a combination of all or some of the antenna elements of the transmitting array antenna and antenna elements of the receiving array antenna as elements.

As a method whereby the transmitting station obtains downlink channel state information, with TDD, in which carriers of the same frequency are used in a radio channel uplink and downlink, it is possible to perform estimating or measuring of channel state information in the transmitting station using the uplink from the transmitting station by means of channel reciprocity. On the other hand, with FDD, in which carriers of different frequencies are used in the uplink and downlink, it is possible to obtain accurate downlink CSI in the transmitting station by estimating or measuring downlink channel state information in the receiving station.

A feature of the eigenmode is that, particularly when a MIMO system radio channel is handled as a narrowband flat fading process, MIMO system channel capacity can be maximized. For example, in a radio communication system that uses OFDM, it is usual for design to be carried out so that guard intervals are inserted in order to eliminate inter-symbol interference due to multipath delayed waves, and each OFDM subcarrier is a flat fading process. Therefore, when an OFDM signal is transmitted in a MIMO system, by using the eigenmode it is possible, for example, to transmit a plurality of signals multiplexed spatially in each subcarrier.

As a communication method that uses a MIMO system, several methods have been proposed whereby, in contrast to the eigenmode in which downlink channel state information is known in the transmitting station and receiving station, channel state information for a radio channel is known only in the receiving station. BLAST, for example, is known as a method whereby signals are transmitted and are multiplexed spatially for the same purpose as with the eigenmode. Also, transmission diversity using space-time coding, for example, is known as a method whereby the degree of signal multiplexing is sacrificed—that is, as a method not for increasing capacity but whereby a so-called antenna space diversity effect is obtained. While the eigenmode is a beam space mode whereby a signal is transmitted vectored by a transmitting array antenna—in other words, a signal is transmitted mapped onto beam space—BLAST and space diversity can be thought of as antenna element modes since mapping is performed onto antenna elements.

In Embodiment 13 of the present invention, a description has been given of a transmission method for a pilot signal for demodulation in a case where, in a MIMO system, a transmitting station transmits modulated signals to a receiving station mainly using an eigenmode, but the effect described later herein can be obtained in a similar way when another method that unitizes an antenna element mode is used.

Figure 60:
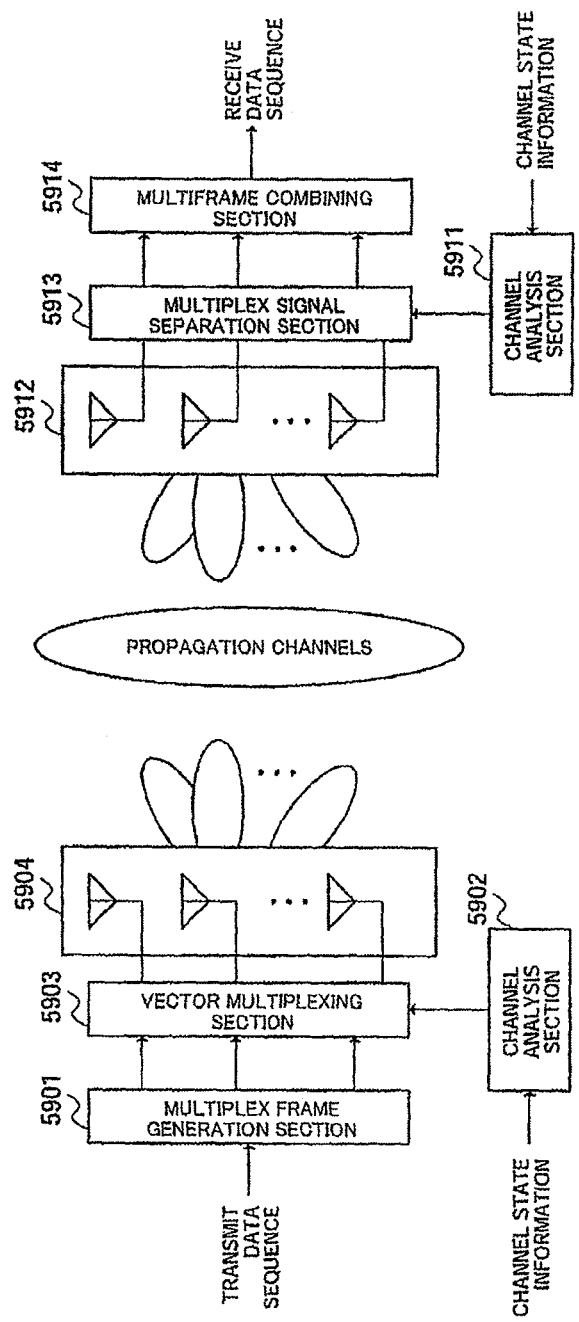
FIG. 60 is a drawing showing a sample configuration of a channel multiplexing communication system using a beam space mode typified by an eigenmode in a MIMO system.

FIG. 60 is a drawing showing a sample configuration of a channel multiplexing communication system using a beam space mode typified by an eigenmode in a MIMO system. In the transmitting station, a multiplex frame generation section 5901 has a transmit data sequence as input, and generates a plurality of transmit frames for mapping onto multiplex channels. Based on channel state information comprising estimation results for propagation channels between the transmitting station and receiving station, a transmission channel analysis section 5902 calculates a plurality of transmission channel signature vectors for configuring multiplex channels. A vector multiplexing section 5903 multiplies individual transmit frames by the respective channel signature vectors and combines them, and then transmits the resulting signals to the receiving station from a transmitting array antenna 5904.

In the receiving station, a reception channel analysis section 5911 calculates a plurality of reception channel signature vectors for separating multiplexed transmit signals based on channel state information comprising estimation results for propagation channels between the transmitting station and receiving station. A multiplex signal separation section 5913 has received signals from a receiving array antenna 5912 as input, multiplies these by the respective channel signature vectors, and generates a plurality of obtained received signal frames. A multiframe combining section 5914 gathers together the signals mapped onto the multiplex channels, and composes a receive data sequence.

In a communication method of the present invention, a symbol of one channel is transmitted at a first frequency, and symbols of a plurality of channels modulated by means of a different modulation method are multiplexed and transmitted at a second frequency.

In a communication method of the present invention, information on propagation path conditions estimated by a communicating party is received, a symbol is transmitted at a first frequency to a first communicating party, and a symbol is transmitted at a second frequency to a communicating party whose propagation path conditions are worse than those of the first communicating party.

A communication method of the present invention is characterized in that a symbol transmitted at a first frequency has a higher degree of importance in communication than a symbol transmitted at a second frequency.

In a communication method of the present invention, first data is transmitted at a first frequency, a difference between second data and first data is generated, and the difference is transmitted at a second frequency.

In a communication method of the present invention, a symbol of one channel is transmitted at a first frequency at the start of communication, and after information on propagation path conditions estimated by a communicating party is received, symbols are transmitted at the first frequency and a second frequency.

In a communication method of the present invention, a known symbol is transmitted at the start of communication, and information on propagation path conditions estimated by a communicating party using that known symbol is received.

A transmitting apparatus of the present invention has a configuration comprising a first modulation section that modulates a signal of a first channel and generates a first symbol, a second modulation section that modulates a signal of a second channel and generates a second symbol, a first transmitting section that transmits the first symbol at a first frequency, and a second transmitting section that multiplexes the first symbol and the second symbol and transmits the multiplexed symbols at a second frequency.

A transmitting apparatus of the present invention has a configuration comprising a receiving section that receives information on propagation path conditions estimated by a communicating party, and a determination section that determines transmission of a symbol by a first transmitting section to a first communicating party and transmission of a symbol by a second transmitting section to a communicating party whose propagation path conditions are worse than those of the first communicating party based on propagation path conditions of a plurality of communicating parties.

A transmitting apparatus of the present invention has a configuration wherein a first transmitting section transmits a symbol of a higher degree of importance in communication than a symbol transmitted by a second transmitting apparatus.

A transmitting apparatus of the present invention has a configuration wherein a first transmitting section transmits a symbol of a first channel at a first frequency at the start of communication, and after information on propagation path conditions estimated by a communicating party is received, a second transmitting section transmits a symbol at a second frequency.

A transmitting apparatus of the present invention has a configuration wherein a first transmitting section transmits a known symbol at the start of communication, and a receiving section receives information on propagation path conditions estimated by a communicating party using that known symbol.

A receiving apparatus of the present invention has a configuration comprising a first receiving section that receives at a first frequency a radio signal in which a symbol of one channel is modulated, a second receiving section that receives at a second frequency a radio signal in which symbols of a plurality of channels modulated by means of a different modulation method are multiplexed, a first demodulation section that demodulates a signal received by means of a first carrier, a second demodulation section that demodulates a signal received by means of a second carrier, and a separation section that separates a signal demodulated by the second demodulation section on a channel-by-channel basis.

A receiving apparatus of the present invention has a configuration comprising an estimation section that estimates propagation path conditions based on a known symbol of a radio signal received by a first receiving section, and a transmitting section that transmits information on propagation path conditions estimated by the estimation section.

In a communication method of the present invention, a symbol of one channel is transmitted at a first time, and symbols of a plurality of channels modulated by means of a different modulation method are multiplexed and transmitted at a second time.

In a communication method of the present invention, information on propagation path conditions estimated by a communicating party is received, a symbol is transmitted at a first time to a first communicating party, and a symbol is transmitted at a second time to a communicating party whose propagation path conditions are worse than those of the first communicating party.

A communication method of the present invention is characterized in that a symbol transmitted at a first time has a higher degree of importance in communication than a symbol transmitted at a second time.

In a communication method of the present invention, first data is transmitted at a first time, a difference between second data and first data is generated, and the difference is transmitted at a second time.

In a communication method of the present invention, a symbol of one channel is transmitted at a first time at the start of communication, and after information on propagation path conditions estimated by a communicating party is received, symbols are transmitted at the first time and a second time.

In a communication method of the present invention, a known symbol is transmitted at the start of communication, and information on propagation path conditions estimated by a communicating party using that known symbol is received.

A transmitting apparatus of the present invention has a configuration comprising a first modulation section that modulates a signal of a first channel and generates a first symbol, a second modulation section that modulates a signal of a second channel and generates a second symbol, a first transmitting section that transmits the first symbol at a first time, and a second transmitting section that multiplexes the first symbol and the second symbol and transmits the multiplexed symbols at a second time.

A transmitting apparatus of the present invention has a configuration comprising a receiving section that receives information on propagation path conditions estimated by a communicating party, and a determination section that determines transmission of a symbol by a first transmitting section to a first communicating party and transmission of a symbol by a second transmitting section to a communicating party whose propagation path conditions are worse than those of the first communicating party based on propagation path conditions of a plurality of communicating parties.

A transmitting apparatus of the present invention has a configuration wherein a first transmitting section transmits a symbol of a higher degree of importance in communication than a symbol transmitted by a second transmitting apparatus.

A transmitting apparatus of the present invention has a configuration wherein a first transmitting section transmits a symbol of a first channel at a first time at the start of communication, and after information on propagation path conditions estimated by a communicating party is received, a second transmitting section transmits a symbol at a second time.

A transmitting apparatus of the present invention has a configuration wherein a first transmitting section transmits a known symbol at the start of communication, and a receiving section receives information on propagation path conditions estimated by a communicating party using that known symbol.

A receiving apparatus of the present invention has a configuration comprising a first receiving section that receives at a first time a radio signal in which a symbol of one channel is modulated, a second receiving section that receives at a second time a radio signal in which symbols of a plurality of channels modulated by means of a different modulation method are multiplexed, a first demodulation section that demodulates a signal received by means of a first carrier, a second demodulation section that demodulates a signal received by means of a second carrier, and a separation section that separates a signal demodulated by the second demodulation section on a channel-by-channel basis.

A receiving apparatus of the present invention has a configuration comprising an estimation section that estimates propagation path conditions based on a known symbol of a radio signal received by a first receiving section, and a transmitting section that transmits information on propagation path conditions estimated by the estimation section.

As is clear from the above description, according to a communication method of the present invention and a transmitting apparatus and receiving apparatus that use that communication method, by transmitting information of a high degree of importance by means of a method whereby one modulated signal of a communication system is transmitted by configuring in accordance with either a method whereby one modulated signal of a communication system is transmitted, or a method whereby a plurality of modulated signals of a communication system are multiplexed and transmitted, by frequency and time, an effect is achieved of enabling a communicating party communicating party to obtain information accurately. Also, by performing communication by frequency or time of a method whereby one modulated signal of a communication system is transmitted, and by frequency or time of a method whereby a plurality of modulated signals of a communication system are multiplexed and transmitted, according to the communication conditions, an effect is achieved of enabling information transmission speed and received data quality to be made compatible.

This application is based on Japanese Patent Application No. 2000-206799 filed on Jul. 16, 2002, and Japanese Patent Application No. 2000-259791 filed on Sep. 5, 2002, entire content of which is expressly incorporated by reference herein.

INDUSTRIAL APPLICABILITY

The present invention is applicable to a radio communication apparatus, base station apparatus, and communication terminal apparatus.

The invention claimed is:

1. A transmission method comprising:
generating a first orthogonal frequency division multiplexing (OFDM) frame signal including a grid of multiple frequency subcarriers and multiple time periods, where an OFDM symbol is transmitted using multiple frequency subcarriers during a time period, and including known reference OFDM symbols assigned to corresponding time-frequency resource elements in the grid, each resource element being defined by a one of the multiple frequency subcarriers and one of the multiple time periods;

generating a second orthogonal frequency division multiplexing (OFDM) frame signal including a grid of multiple frequency subcarriers and multiple time periods and including known reference OFDM symbols assigned to corresponding time-frequency resource elements in the grid, wherein the time-frequency resource elements in the grid assigned to the known reference OFDM symbols in the first OFDM frame signal are different from the time-frequency resource elements in the grid assigned to the known reference OFDM symbols in the second OFDM frame signal;

converting the first OFDM frame signal to a first radio signal and the second OFDM frame signal to a second radio signal; and transmitting the first radio signal from a first antenna and the second radio signal from a second, different antenna.

2. The transmission method according to claim 1, wherein the first and second OFDM frame signals also include OFDM data symbols assigned resource elements different than the resource elements assigned to the known reference OFDM symbols.

3. The transmission method according to claim 2, wherein the known reference OFDM symbols are transmitted at a higher power than the OFDM data symbols.

4. The transmission method according to claim 1, wherein the transmission method is in a multi-input multi-output (MIMO) system.

5. The transmission method according to claim 4, wherein the MIMO system supports closed loop and open loop MIMO modes.

6. The transmission method according to claim 1, wherein the known reference OFDM symbols include pilot OFDM symbols.

7. The transmission method according to claim 1, wherein the known reference OFDM symbols include OFDM symbols used for synchronization.

8. The transmission method according to claim 1, wherein the known reference OFDM symbols include pilot OFDM symbols and OFDM symbols used for synchronization, and wherein the time-frequency resource elements in the grid assigned to the pilot OFDM symbols in the first OFDM frame signal are different from the time-frequency resource elements in the grid assigned to the OFDM synchronization symbols in the first OFDM frame signal.

9. The transmission method according to claim 1, further comprising:
    generating a third orthogonal frequency division multiplexing (OFDM) frame signal including a grid of multiple frequency subcarriers and multiple time periods and including known reference OFDM symbols assigned to corresponding time-frequency resource elements in the grid,
    wherein the time-frequency resource elements in the grid assigned to the known reference OFDM symbols in the third OFDM frame signal are different from the time-frequency resource elements in the grid assigned to the known reference OFDM symbols in the first and second OFDM frame signals;
    converting the third OFDM frame signal to a third radio signal; and
    transmitting the third radio signal from a third, different antenna.

10. A transmission apparatus comprising:
    data processing circuitry configured to generate a first orthogonal frequency division multiplexing (OFDM) frame signal including a grid of multiple frequency subcarriers and multiple time periods, where an OFDM symbol is transmitted using multiple frequency subcarriers during a time period, and including known reference OFDM symbols assigned to corresponding time-frequency resource elements in the grid, each resource element being defined by a one of the multiple frequency subcarriers and one of the multiple time periods;
    data processing circuitry configured to generate a second orthogonal frequency division multiplexing (OFDM) frame signal including a grid of multiple frequency subcarriers and multiple time periods and including known reference OFDM symbols assigned to corresponding time-frequency resource elements in the grid,
    wherein the time-frequency resource elements in the grid assigned to the known reference OFDM symbols in the first OFDM frame signal are different from the time-frequency resource elements in the grid assigned to the known reference OFDM symbols in the second OFDM frame signal;
    radio circuitry configured to convert the first OFDM frame signal to a first radio signal and the second OFDM frame signal to a second radio signal; and
    a transmitter configured to transmit the first radio signal from a first antenna and the second radio signal from a second, different antenna.

11. The transmission apparatus according to claim 10, wherein the first and second OFDM frame signals also include OFDM data symbols assigned resource elements different than the resource elements assigned to the known reference OFDM symbols.

12. The transmission apparatus according to claim 11, wherein the known reference OFDM symbols are transmitted at a higher power than the OFDM data symbols.

13. The transmission apparatus according to claim 10, wherein the transmission apparatus is a multi-input multi-output (MIMO) system.

14. The transmission apparatus according to claim 13, wherein the MIMO system supports closed loop and open loop MIMO modes.

15. The transmission apparatus according to claim 10, wherein the known reference OFDM symbols include pilot OFDM symbols.

16. The transmission apparatus according to claim 10, wherein the known reference OFDM symbols include OFDM symbols used for synchronization.

17. The transmission apparatus according to claim 10, wherein the known reference OFDM symbols include pilot OFDM symbols and OFDM symbols used for synchronization, and wherein the time-frequency resource elements in the grid assigned to the pilot OFDM symbols in the first OFDM frame signal are different from the time-frequency resource elements in the grid assigned to the OFDM synchronization symbols in the first OFDM frame signal.

18. The transmission apparatus according to claim 10, further comprising:
    data processing circuitry configured to generate a third orthogonal frequency division multiplexing (OFDM) frame signal including a grid of multiple frequency subcarriers and multiple time periods and including known reference OFDM symbols assigned to corresponding time-frequency resource elements in the grid,
    wherein the time-frequency resource elements in the grid assigned to the known reference OFDM symbols in the third OFDM frame signal are different from the time-frequency resource elements in the grid assigned to the known reference OFDM symbols in the first and second OFDM frame signals;
    radio circuitry configured to convert the third OFDM frame signal to a third radio signal; and
    a transmitter configured to transmit the third radio signal from a third, different antenna.

* * * * *